United States Patent [19]

Davis

[11] Patent Number: 4,941,201

[45] Date of Patent: Jul. 10, 1990

[54] ELECTRONIC DATA STORAGE AND RETRIEVAL APPARATUS AND METHOD

[75] Inventor: Charles L. Davis, Flower Mound, Tex.

[73] Assignee: Abbott Laboratories, Abbott Park, Ill.

[21] Appl. No.: 333,859

[22] Filed: Apr. 4, 1989

Related U.S. Application Data

[63] Continuation of Ser. No. 818,469, Jan. 13, 1985, abandoned.

[51] Int. Cl.$^5$ .............................................. H04B 5/00
[52] U.S. Cl. .................... 455/41; 128/419 PT; 128/419 PG; 455/605; 340/870.31; 340/870.16
[58] Field of Search ............ 455/68, 41, 5, 11, 20, 455/343, 127, 605; 340/870.31, 870.34, 870.28, 870.39, 870.16, 825.33; 365/191, 192, 226, 228; 128/419 PT, 419 PG, 697; 342/42, 50, 51; 379/55

[56] References Cited

U.S. PATENT DOCUMENTS

| | | | |
|---|---|---|---|
| 3,745,569 | 7/1973 | Works et al. | 343/6.5 |
| 3,859,624 | 1/1975 | Kriofsky et al. | 340/38 |
| 3,949,388 | 4/1976 | Fuller | 340/189 |
| 3,952,750 | 4/1976 | Mirowski et al. | 128/419 |
| 4,121,573 | 10/1978 | Crovella et al. | 128/2.1 |
| 4,196,418 | 4/1980 | Kip et al. | 340/152 |
| 4,232,679 | 11/1980 | Schulman | 128/419 PG |
| 4,277,837 | 7/1981 | Stuckert | 235/380 |
| 4,333,072 | 6/1982 | Beigel | 340/825.54 |
| 4,361,153 | 11/1982 | Slocum et al. | 128/419 PT |
| 4,408,608 | 10/1983 | Daly et al. | 128/421 |
| 4,414,979 | 11/1983 | Hirshorn et al. | 128/419 |
| 4,417,306 | 11/1983 | Citron et al. | 364/415 |
| 4,424,812 | 1/1984 | Lesnick | 128/419 PG |
| 4,494,545 | 1/1985 | Slocum et al. | 128/419 |
| 4,528,987 | 7/1985 | Slocum | 128/696 |
| 4,531,526 | 7/1985 | Genest | 128/630 |
| 4,531,527 | 7/1985 | Reinhold, Jr. et al. | 128/696 |
| 4,533,988 | 8/1985 | Daly et al. | 363/127 |
| 4,561,443 | 12/1985 | Hogrefe et al. | 128/419 PT |
| 4,650,981 | 3/1987 | Foletta | 340/825.33 |
| 4,681,111 | 7/1987 | Silvian | 128/697 |

OTHER PUBLICATIONS

Ko et al., IEEE Transactions on Biomedical Engineering, vol. BME-26, No. 2, pp. 105-109, Feb. 1979.
Kadefors, IEEE Transactions on Biomedical Engineering, vol. BME-23, No. 2, pp. 124-129, Mar. 1976.

Primary Examiner—Benedict V. Safourek
Assistant Examiner—Marianne Huseman
Attorney, Agent, or Firm—Willian Brinks Olds Hofer Gilson & Lione

[57] ABSTRACT

An electronic data storage, transmission and retrieval apparatus and method wherein a combination power and data signal is received by a preferably portable and miniature data storage means which in turn modulates the combination signal in acordance with available data signals. Substantially simultaneous and bi-directional data communication can be achieved between a data link means and a data storage means without physical contact between the devices.

45 Claims, 22 Drawing Sheets

INPUT/OUTPUT GATING LOGIC

DATA LINK DEVICE

LECLK

TECLK

CLK

VER_WINDOW

WRITE_WINDOW

READ_WINDOW

DATA STORAGE DEVICE

VER_PULSE

WRITE_PULSE

READ_PULSE

CLK3

CLK1

ELECTRONIC DATA STORAGE AND RETRIEVAL APPARATUS AND METHOD

This is a continuation of co-pending application Ser. No. 818,469, filed on Jan. 13, 1985, now abandoned.

BACKGROUND OF THE INVENTION

This invention relates in general to electronic data storage, transmission and retrieval apparatus and methods. More particularly, this invention relates to such apparatus and methods wherein combination signals having power and data components are received by a data storage device which in turn modulates the combination signal in accordance with available data signals to achieve bi-directional and substantially simultaneous data transfer.

DESCRIPTION OF THE PRIOR ART

Apparatus and methods for transmitting and receiving data signals to and from portable and preferably miniature elements (whether or not including data storage means) are useful in a wide variety of applications. For example, miniature data storage devices embodied in integrated circuits have been embedded in portable cards (sometimes referred to as "smart cards") for storing medical, financial, personal or other information. The stored information is accessed and updated by means of a companion input/output (I/O) device.

In addition, integrated circuit chips with and without data storage capability have been implanted in various body organs to provide electrical stimulation signals and/or sensory data signals. The transmission of such signals is typically performed contactlessly by means of inductive coupling, which avoids the need for wiring through the skin and consequently reduces the risk of attendant infections. See, for example, U.S. Pat. Nos. 4,494,545 and 4,528,987 to Slocum; U.S. Pat. No. 3,952,750 to Mirowski; and U.S. Pat. No. 4,408,608 to Daly et al.

Further, portable data storage devices in the form of passive magnetic media have been attached to patient identification bands, test tubes, and the like. Data stored in these devices is accessed and updated by means of a companion I/O device having magnetic read and write heads. See, for example, U.S. Pat. No. 3,848,112 to Weichselbaum et al. and U.S. Pat. No. 4,164,320 to Irazoqui.

However, the prior known apparatus and methods have exhibited certain drawbacks and deficiencies which have limited or eliminated their usefulness generally as data communication elements, and particularly as portable data storage and retrieval systems. For example, the few known apparatus that have provided bi-directional communication of data signals between devices have required a substantial number of components to establish multiple data transmission channels. This requirement increases the manufacturing costs of such devices and renders them less suitable for low-cost mass production applications. Also, the additional components increase the power requirements of the devices, rendering the devices less efficient and economical. Further, the inclusion of additional components adversely affects miniaturization of the devices. Also, data transmission rates of the known apparatus and methods have been unduly limited by the inability to simultaneously transmit data bi-directionally.

Further, with respect to passive magnetic media storage devices in particular, another common drawback is the typically low storage densities of such media, which render them unsuitable in applications where both miniaturization and large storage capacities are required.

Still another drawback in those devices in which operating power is derived from signals transmitted by another device is the absence of timing and power regulation means compatible with the objectives of low manufacturing costs, economy of use, and miniaturization. A few such miniature devices have included voltage regulation means in the device itself. However, as already discussed, this adversely effects the manufacturing cost, economy of operation, and miniaturization of the devices.

In addition to the drawbacks noted above, none of the known apparatus have provided certain other features often desirable in data storage and retrieval systems. Such features include, among others, protection against the inadvertent overwriting of currently stored data, automatic verification of received data, selected storage locations only following the transmission of an appropriate access code.

SUMMARY OF THE INVENTION

The present invention is directed to improved electronic data storage, transmission and retrieval apparatus and methods which include improved data communication apparatus and methods. The present invention has as objectives the elimination of certain drawbacks of prior known apparatus, and the provision of certain features which are particularly desirable in data storage and retrieval applications, but which are not found in the prior art apparatus and methods.

According to one aspect of the present invention, combination signals having power and data components are received by a data storage device which in turn modulates the combination signal in accordance with available data signals to achieve bi-directional and simultaneous data transfer.

According to another aspect of the present invention, an improved electronic data storage and retrieval apparatus and method are provided wherein a preferably portable data link means transmits power and data to a preferably portable and miniature data storage means when brought into proximity therewith, and wherein the data link means is capable of simultaneously receiving data information from the data storage means. The data link means generates a combination signal having power and data components and continuously transmits the combination signal to the data storage means. The data storage means receives the combination signal transmitted by the data link means and derives operating power and data signals therefrom. The data storage means stores the derived data signals and modulates the combination signal preferably by varying the load presented to the signal according to stored data signals. The data link means demodulates the combination signal to derive link data signals therefrom.

Such electronic data storage and retrieval apparatus and methods of the present invention have a number of important advantages. For instance, the data storage means derives all of its operating power from the combination signal transmitted by the data link means. Since the data link means transmits the combination signal continuously when in proximity with the data storage means, the data storage means is continuously powered and operative. Unlike certain prior art devices, there are no pauses in communication for the data link means to "refresh" the data storage means power supply and no pauses in powering the data storage means to allow bi-directional communications to occur.

Also, the present invention can provide simultaneous bi-directional data communication between the data link means and the data storage means over a single channel. This is accomplished without the addition of transmitter or other channel establishing components to the data storage means. This feature not only provides a higher rate of communication between the data link means and the data storage means than is possible with known transmission apparatus and methods, but also significantly reduces the number of components of, and consequently the manufacturing cost of the data storage means, rendering it economically feasible for low-cost, mass production applications, as well as for applications requiring micro-miniaturization.

Additionally, communication between the data link means and the data storage means of the present invention is carried out contactlessly. By eliminating the need for a physical electrical connection, cost and size are still further reduced, and reliability is increased.

In addition, in comparison with known devices employing passive magnetic media, the present invention can provide increased storage density and capacity in a much smaller package while maintaining both read and write capabilities.

According to other aspects of the present invention, certain features desirable in data storage and retrieval systems are provided, including the ability to have encrypted data, protection against inadvertently overwriting stored data, and automatic verification of received data. Also, in addition to standard read and write modes, an initialization mode is provided to effect coded access to certain selected storage locations, access to which are otherwise restricted.

These and other advantages of the present invention will become apparent from the following description, which, when taken in conjunction with the accompanying drawings, discloses a presently preferred exemplary embodiment of an electronic data storage and retrieval apparatus of the present invention. It should be understood that this description is illustrative rather than limitative, the scope of the present invention being defined by the appended claims.

BRIEF DESCRIPTION OF THE DRAWINGS

A presently preferred exemplary embodiment of an electronic data storage and retrieval apparatus of the invention summarized above is illustrated in the accompanying drawings, in which.

DETAILED DESCRIPTION OF A PRESENTLY PREFERRED EMBODIMENT OF THE INVENTION

Figure 1:
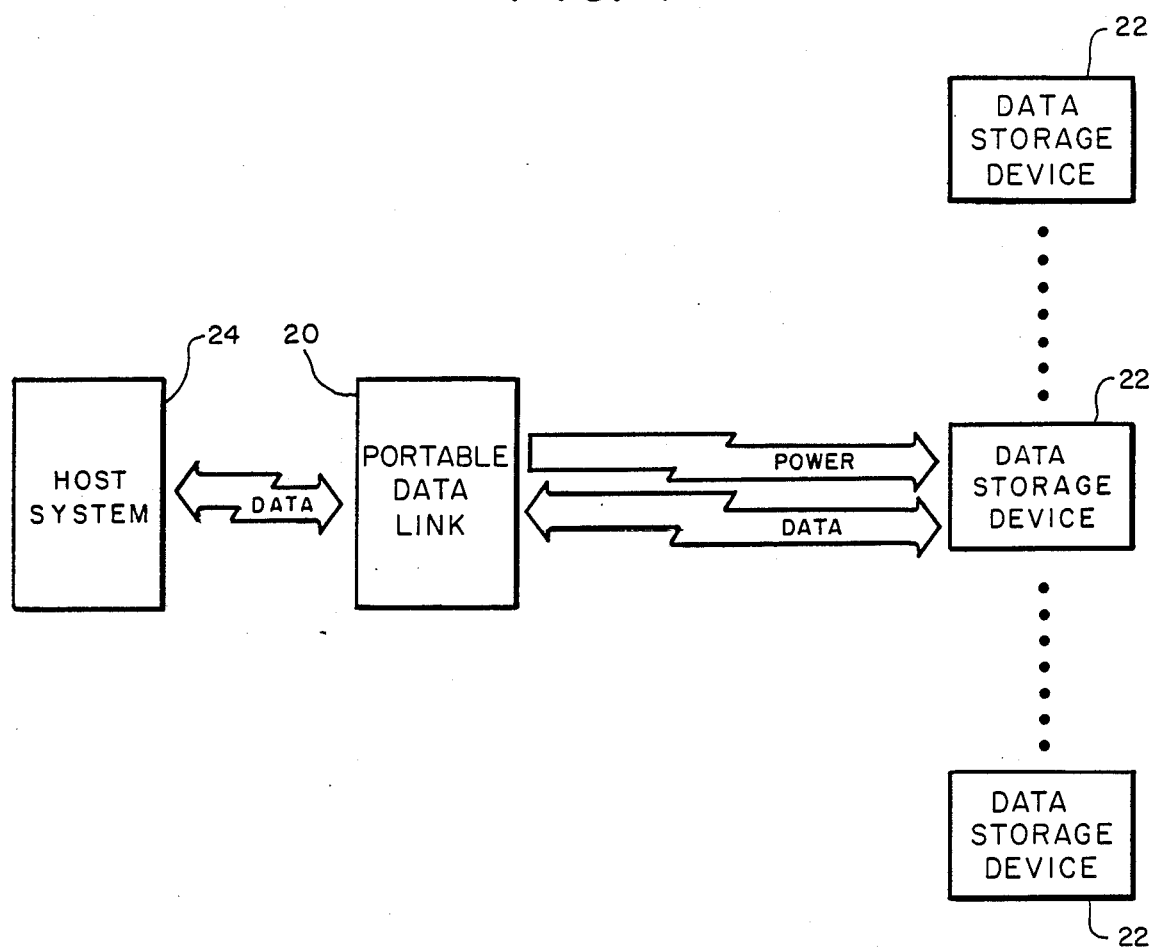
FIG. 1 is a block diagram illustrating the major components of the information storage and retrieval apparatus.

With reference to FIG. 1, a presently preferred embodiment of the data storage and retrieval apparatus of the present invention comprises a data link device 20 and one or more portable data storage devices 22.

The data link device 20 is advantageously embodied in a portable hand-held instrument, and will also find use in stationary apparatus such as automatic blood testing equipment, for example. The data link device 20 includes means to generate and transmit a combination signal having power and data components to individual ones of a plurality of miniature data storage devices 22, one at a time, in a manner to be described. The data link device 20 may also include means for transmitting and receiving data to and from a host system 24, such as a computer, which is not part of the present invention. It may also include means for temporarily storing data.

The data storage devices 22 are preferably miniature portable devices. Each data storage device 22 includes electronic means for receiving a combination signal from a data link device 20, and means for deriving operating power and data signals therefrom. Each data storage device 22 also includes means for sending or reflecting data back to the data link 20, preferably by a method of "impedance-modulation" of the combination signal, which will be described in detail below. The data storage device 22 is preferably capable of "impedance-modulating" the combination signal at the same time it is deriving power and data signals therefrom, to provide simultaneous, bi-directional data communication between the data link device 20 and the data storage device 22. Each data storage device 22 preferably also includes means for storing the derived data signals. The data link device 20 also includes means for demodulating the "impedance-modulated" combination signal to derive data from the data storage device 22 while the data link device 20 is transmitting the combination signal.

In a presently preferred embodiment, communication between a data link device 20 and a data storage device 22 is carried out without physical electrical contact therebetween by means of a magnetic, inductive, or other communication channel or path which is established when the devices are brought into proximity, with or without physical mechanical contact.

Figure 2:
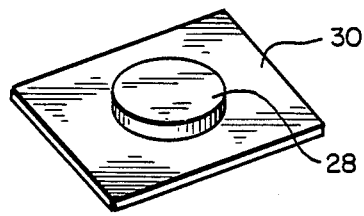
FIG. 2 is a perspective view which illustrates a typical miniature data storage device according to the present invention.

FIG. 2 illustrates a presently preferred embodiment of a typical data storage device 22. The device 22 is embodied within a housing 28, which may in turn be secured to a pad 30. For reasons which will become apparent below, it is preferred that the housing be round in shape and have a somewhat raised profile. An adhesive backing on the pad 30 is used to attached the data storage device 22 to objects or devices with which the data stored therein is associated or related.

Figure 3B:
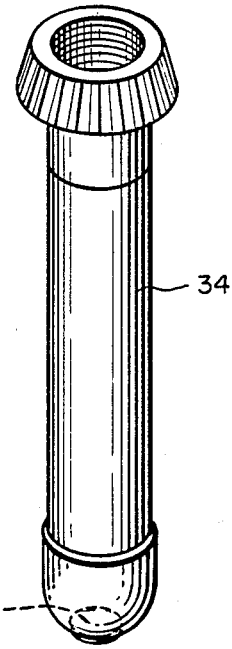
FIG. 3(b) illustrates a miniature data storage device adapted for attachment to a fluid collection vessel such as a test tube or "vacutainer"
Figure 3A:
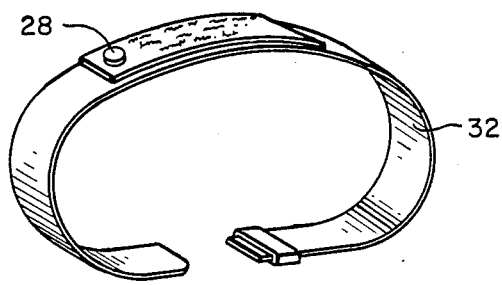
FIG. 3(a) illustrates a miniature data storage device adapted for attachment to a patient identification bracelet.

As illustrated in FIGS. 3(a) and 3(b), housing 28 containing a data storage device 22 can also be attached to a patient identification bracelet 32 or a fluid collection tube 34, such as a "vacutainer",for example. It should be apparent that the data storage device 22 is not limited for use with medical apparatus but may also find utility in a wide variety of other data storage and retrieval and data telemetry applications as well. For example, a data storage device 22 according to the present invention would be advantageously employed in an improved "smart card" for financial or insurance applications. It would also be useful in applications where goods are to be identified and inventory taken automatically, for example in a hospital pharmacy. In addition, the improved data communication aspects of the present invention will find use even without the associated data storage aspects as improvements to many known communication devices including those previously described.

Figure 4A:
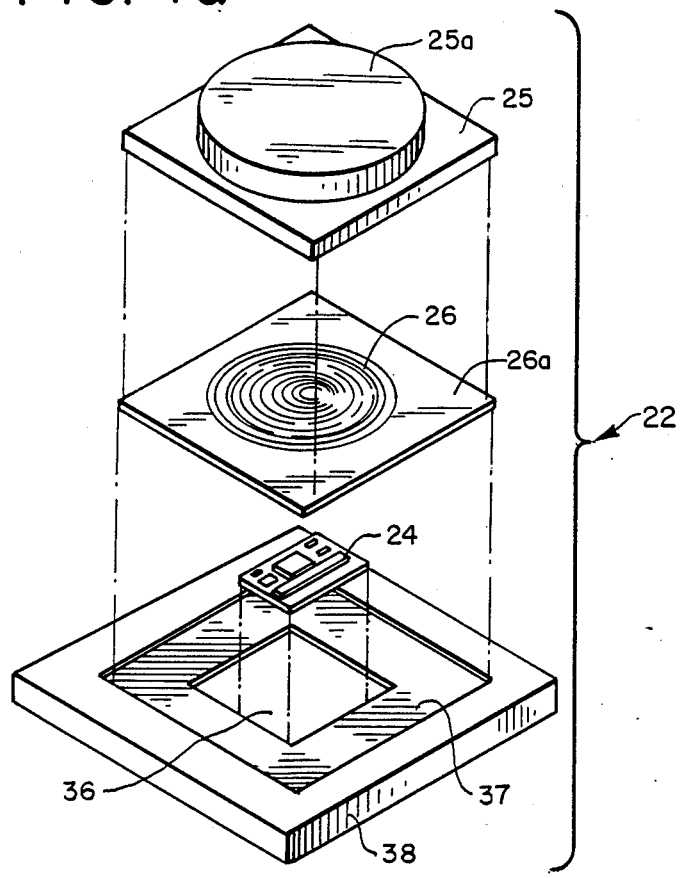
FIG. 4(a) is an exploded perspective view depicting the construction of one embodiment of a data storage device of FIG. 2.

FIG. 4(a) illustrates the details of construction of one preferred embodiment of a data storage device 22. All of the electronic circuits of the data storage device 22 are preferably embodied in an integrated circuit chip 24, preferably of the CMOS variety. Although other forms of integrated circuit logic such as bipolar can also be used, CMOS logic is preferred for its low energy consumption characteristics. As illustrated, a coil 26, which is preferably a flat coil of copper or other suitable electrically conductive material is formed, for example, by conventionally etching one conductive layer of a flexible, laminated sandwich 26a to form what ia commonly known in the art as a "flex-circuit." The coil 26 is electrically connected to the chip 24 by conventional electrical connections (not shown). The chip 24 fits within a recess 36 formed in a housing 38. The flexible sandwich 26a including the coil 26 fits within a second recess 37 in the housing 38 and overlies the chip 24. A cover 25, preferably having a raised round area 25a, is sealed to the housing 38 by a suitable thermal, chemical or adhesive bond. Housing 30 and cover 25 are preferably constructed of a material having good chemical resistance and bonding properties, as well as good crush resistance, and low electrical conductivity and magnetic permeability. Examples of such materials include high-density polyethylene and a polyester material known by the tradename "VALOX", which is manufactured by General Electric Co. It will be apparent to those skilled in the art that no battery is illustrated in the embodiment of FIG. 4(a), in which it is envisioned that the data storage portion of the chip 24 will be an electrically erasable programmable read-only memory (EEPROM) or equivalent.

Figure 4B:
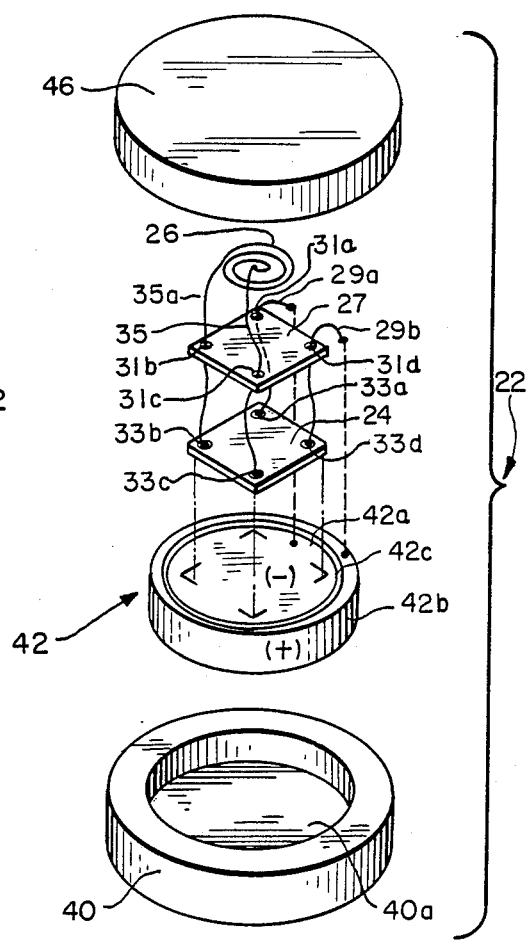
FIG. 4(b) is an exploded perspective view which illustrates the construction of an alternate embodiment of a data storage device of FIG. 2.

FIG. 4(b) illustrates a second or alternate preferred embodiment of a data storage device 22. In this embodiment, a solid ring-shaped base 40 having an integral bottom 40a houses a cylindrical cathode 42a of a battery 42, which is preferably a lithium cell. The cathode 42a is surrounded by a corresponding ring-shaped insulator 42c and a corresponding ring-shaped metal anode 42b. The ring-shaped anode 42b fits inside of the base 40 and is affixed therein by any suitable means. An integrated circuit chip 24, preferably of the CMOS variety, and embodying the data storage device electronic circuitry, is mounted on the upper surface of the cathode 42a. The upper surface of the chip 24 contains conductive electrical connections 33a-d. Connection 33a is connected to the cathode 42a of the battery 42 by a conventional lead 29a, which is attached to both the connection 33a and to the cathode 42a in a conventional manner. Likewise, connection 33d is connected to the anode 42b of the battery 42 by a lead 29b. A thin, insulating shield 27, designed to provide magnetic and electrical isolation, is mounted on top of the chip 24. The shield 27 is preferably a thin ferrite sheet or a conventional ground plane structure. The shield 27 has holes 31a-d extending therethrough in locations corresponding to the locations of connections 33a-d on the underlying chip 24. The coil 26 is mounted on top of the insulating shield 27 and has one end electrically connected to connection 33b on the chip 24 by a conventional electrical lead 35a which passes through hole 31b and is attached to connection 33b in a conventional fashion. The coil 26 has its other end electrically connected to connection 33c by a conventional lead 35, which passes through hole 31c and is attached to connection 33c in a conventional manner. The coil 26 itself is preferably a flat coil of copper or other suitable electrically conductive material. A cylindrical cover 46 fits over the coil 26, insulating shield 27, chip 24, and battery 42, and is sealed to the top face of the base 40 by a suitable thermal, chemical or adhesive bond. The base 40, and cover 46 are preferably constructed of a material having good chemical resistance and bonding properties, as well as good crush resistance and low electrical conductivity and magnetic permeability. Examples of such a material include high-density polyethylene and a polyester material manufactured under the tradename "VALOX" by the General Electric Co. It should be noted that the battery 42 in this embodiment does not provide operating power for the data storage device electronics in the chip 24, but only provides power to a static random access memory (RAM) for data retention. A single 3 VDC lithium cell battery has been found suitable for this purpose.

Figure 5A:
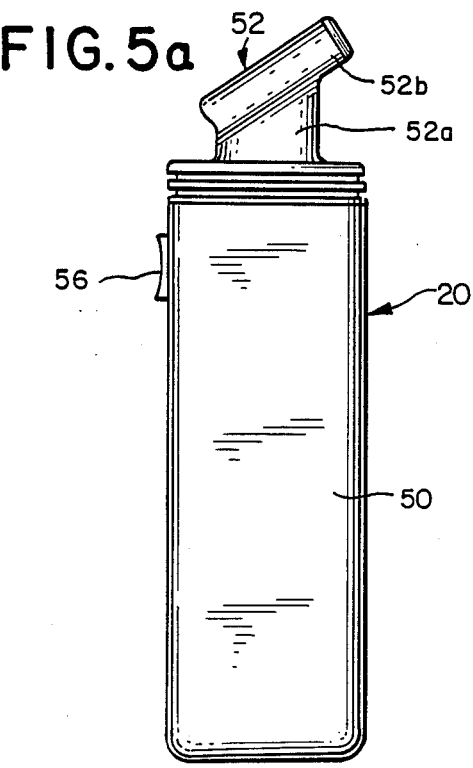
FIG. 5(a) is a side elevational view of a portable data link device according to the present invention.
Figure 5B:
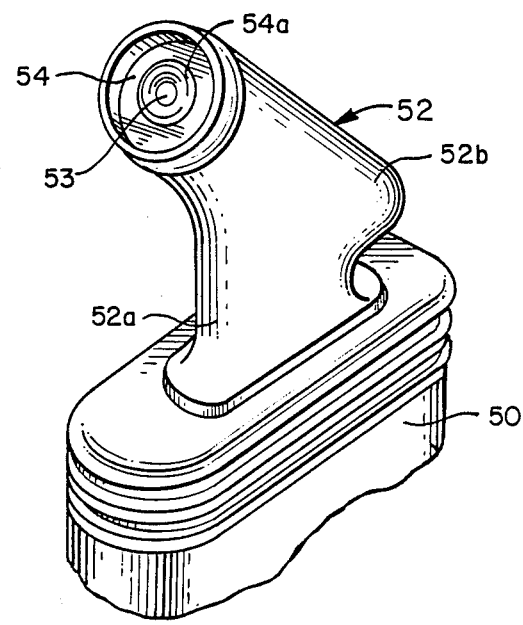
FIG. 5(b) is a partial perspective view of the upper portion of the portable data link device of FIG. 5(a)

FIGS. 5a and 5b illustrate a presently preferred embodiment of a data link device 20. As illustrated, the data link device 20 is mounted inside a portable, hand-held case 50 which has at least one switch 56 mounted thereon. Extending upwardly and angularly from the case 50 is a head portion 52 comprising a base or support section 52a and a generally cylindrical portion 52b integral with the base section 52a. An outer end of the generally cylindrical portion 52b has a hollow indentation 54 having a diameter slightly larger than the diameter of the rounded portion 25a of a corresponding data storage device 22 around which it is to be placed. An optical "hole" 53 is positioned in the center of the indentation 54 and is surrounded by a coil 54a for transmitting power and data to, and receiving data from a data storage device 22. The coil 54a is preferably a flat coil of copper or other suitable electrically conductive material, and is preferably formed by conventional etching techniques on a layer of a flexible laminated material similarly to the structures 26, 26a illustrated in FIG. 4a and previously described. Alternatively, the coil 54a could be wound about a hollow core (not shown) mounted in the cylindrical portion 52b of the head 52, the diameter of the core being of such size as to not restrict optical access to the optical "hole" 53, which may be a lens or optically transparent material, for example. The optical "hole" 53 provides optical access for a bar code reader or other optical input/output device mounted in the head 52 in addition to the coil 54a.

In order to establish communication between the data link device 20 and a miniature data storage device 22, an operator depresses a switch 56 on the case 50 to turn on the data link device 20. The data link device 20 is then brought into proximity with a data storage device 22 and the hollow indentation 54 of the cylindrical portion 52b is placed over the miniature data storage device 22 so that the rounded portion 25a of the data storage device 22 is disposed partially within the hollow indentation 54. At this point, the coils 26 and 54a are in proximity although not physical contact and are approximately aligned. The data link device 20 automatically establishes communication with the data storage device 22 over an inductively coupled channel established by the coils 26 and 54a.

Since, in the preferred embodiment, all communication between the data link device 20 and the data storage device 22 is accomplished contactlessly through an inductive link, it is preferable that the head 52 be constructed of a material having high electrical resistivity and low magnetic permeability so that it does not interfere with communications.

Figure 6:
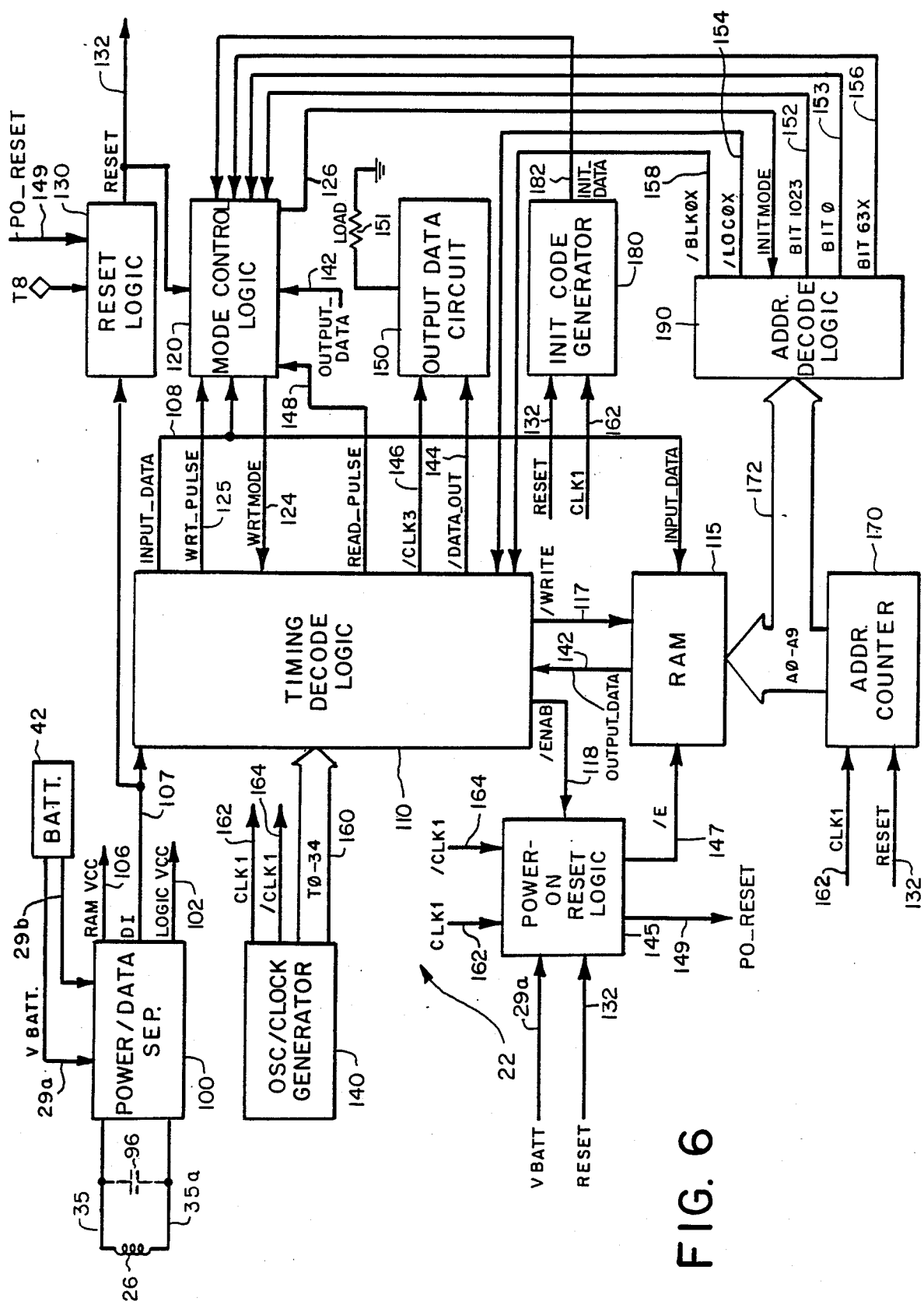
FIG. 6 is a functional block diagram illustrating the major electronic components of a data storage device.

FIG. 6 functionally illustrates the major electronic components of a presently preferred embodiment of a data storage device 22 according to the present invention. As shown therein the coil 26 is electrically connected at one end to a power/data separator circuit 100 by the lead 35. At the other end, the coil 26 is connected to ground by the lead 35a. A capacitance 96 may be present in parallel with the coil 26. However, it is preferable that the coil 26 be not too highly tuned because the resonant frequency of the LC combination may vary quite substantially from data storage device to data storage device due to the rather wide variations in values typically encountered in IC-fabricated components. Accordingly, it is envisioned that a maximum capacitance of 15–20 pF be present.

The power/data separator 100 continuously derives operating power and data and clock signals from the combination signal, which is continuously transmitted by the data link 20, and which is received on coil 26 and conducted to the power/data separator 100 on lead 35. The power/data separator 100 supplies the derived operating power to the other components of the data storage device 22 on a LOGICVCC terminal 102. In the embodiment of the data storage device 22 illustrated in FIG. 4(b), the power/data separator 100 also provides power for the RAM 115 on the RAMVCC terminal 106 during periods when the data storage device 22 is being powered by the data link device 20.

The power/data separator 100 outputs on line 107 to a timing decode logic circuit 110 a signal DI having data and clock components derived from the combination signal. The DI signal is interpreted by the data storage device circuitry as data, mode commands, or reset commands.

The timing decode logic 110 controls the timing of signals used for writing and reading the RAM 115. It also controls the timing of signals for sending data and clock signals to the data link device 20 and for receiving data and clock signals from the data link device 20. In addition, the timing decode logic 110 controls the timing of signals for gating data comparators used to enable write mode (WRTMODE) and initialize mode (INITMODE), which will be described in detail below. The timing decode logic 110 performs these functions by internally generating timing, gating, clock, and control signals. It uses some of the synchronous clock signals T0-T34 generated by an oscillator/clock generator 140 for this purpose.

The timing decode logic 110 receives the DI signal as an input on line 107 and synchronously derives the data component thereof, identified hereinafter as the INPUT_DATA signal, which it outputs to a mode control logic circuit 120 on line 108. It also outputs the INPUT_DATA signal on line 108 to the RAM 115, which stores it if the RAM 115 has been previously enabled via /WRITE and /ENAB control signals on lines 117 and 118 respectively.

The timing decode logic 110 receives an OUTPUT_DATA signal from the RAM 115 as an input on line 142. It gates this signal using a synchronous timing signal READ_PULSE to generate a properly timed /DATA_OUT data signal, which it outputs to an output data circuit 150 on line 142 for sending data to the data link device 20. It also outputs the READ_PULSE timing signal on line 148 to a mode control logic circuit 120. In addition, it generates and outputs a /CLK3 clock signal on a line 146 directly to the output data circuit 150 for sending clock information to the data link device 20. Further, the timing decode logic 110 generates a WRT_PULSE timing signal which it outputs to the mode control logic 120 on line 125. The WRT_PULSE signal is timed to correspond to the portion of the combination signal in which data is transmitted by the data link device 20.

The timing decode logic circuit 110 also controls access to the RAM 115 via the /WRITE and /ENAB control signals, which it outputs to the RAM 115 and to the power-on reset circuit 145 on lines 117 and 118 respectively.

The timing decode logic 110 uses signals indicative of the current mode of operation of the data storage device 22, and of the currently-addressed memory location of the RAM 115 to generate control, timing, and gating signals. The timing decode logic 110 receives as inputs a WRTMODE mode control signal from the mode control logic 120 on a line 124, and /LOCOX and /BLKOX address control signals from an address decode logic circuit 190 on lines 154 and 158 respectively. These signals will be described in detail below.

The oscillator/clock generator circuit 140 generates synchronous clock signals T0-T34, CLK1 and /CLK1. The oscillator/clock generator 140 outputs the CLK1 and /CLK1 master clock signals on lines 162 and 164 respectively. The CLK1 clock signal on line 162 is output to an initialization code generator 180, a power-on reset logic circuit 145, and an address counter 170. The /CLK1 clock signal on line 164 is output to the power-on reset logic 145.

The reset logic circuit 130 detects whether a reset command has been sent by the data link device 20, and generates a RESET signal if it has been. The reset logic 130 receives the DI signal on line 107 and the T8 clock signal generated by the oscillator/clock generator 140 as inputs. When the reset logic 130 receives a reset command in the DI signal during the rising edge of the T8 clock pulse, it outputs the RESET signal on line 132 to the mode control logic 120, an address counter 170, an initialization code generator 130, and a power-on reset circuit 145. The reset logic also receives the PO_RESET signal on line 149 as an input from the power-on reset logic 145. A high PO_RESET signal also causes the reset logic 130 to generate a RESET signal.

The mode control logic circuit 120 controls the mode of operation of the data storage device 22. Each data storage device 22 is capable of operating in three modes: read, write and initialize. In a presently preferred embodiment, the data storage device 22 is always in read mode when not in write mode. In addition, it also has an automatic data verification mode wherein it sends a copy of the data received from the data link device 20 during write mode back to the data link device 20 to verify correct reception of the data.

The mode control logic 120 receives the INPUT_DATA signal on line 108 as an input. It interprets the data component of this signal to determine whether a write mode command or an initialize mode command has been transmitted by the data link device 20. The mode control logic 120 also receives the following inputs: the OUTPUT_DATA signal on line 142, the RESET signal on line 132, the READ_PULSE timing signal on line 148, the WRT_PULSE timing signal on line 125, an INIT_DATA code signal from the initialization code generator 180 on line 182, and memory address decode signals BIT1023, BIT0, and BIT63X on lines 152, 153, and 156 respectively.

The mode control logic 120 outputs a WRTMODE signal on line 124 to the timing decode logic 110, and an INITMODE signal on line 126 to the address decode logic 190.

If the mode control logic 120 determines that the data link device 20 has transmitted a write mode command, it outputs the WRTMODE signal on line 124, but only if the address decode signals BIT0 and BIT63X do not indicate that a write-restricted memory location is currently addressed. The WRTMODE signal indicates that the data storage device 22 is enabled to receive and currently-addressed, non-write-restricted memory locations of the RAM 115.

Likewise, if the mode control logic 120 determines that the data link device 20 has transmitted an initialize mode command, it outputs the INITMODE signal on line 126. The INITMODE signal indicates that the data storage device 22 is in initialize mode and is enabled to receive and store data transmitted by the data link device 20 in the RAM 115. There are no memory access restrictions when the data storage device 22 is in initialize mode. Thus, the initialize mode is useful for initially storing data or later changing data in selected memory locations which it is desired to otherwise protect from read and/or write access.

The occurrence of a RESET signal on line 132 causes the mode control logic 120 to be reset, thus placing the data storage device 22 in read mode, by resetting any high WRTMODE or INITMODE signal to a low value.

The output data circuit 150 modulates the combination signal transmitted by the data link device 20 to send data from the data storage device 22 back to the data link device 20. The output data circuit 150 preferably modulates the combination signal according to as "impedance-modulation", wherein it sequentially switches an electrical load 151 into and out of the data storage device circuitry in accordance with the states of data signals it receives as inputs. The data link device 20 is able to sense the variation in the load presented to the combination signal and to demodulate the "impedance-modulated" combination signal in order to obtain the data sent or, more accurately, "reflected" back by the data storage device 22. It will be apparent to those skilled in the art that numerous other modulation means and techniques could also be used. However, the "impedance-modulation" means and technique of the present invention are preferred because they eliminate the need for active transmission elements and are consistent with the objectives of low cost, energy efficiency, and small size. Other passive modulation means consistent with these objectives are also preferable over active modulation elements and techniques.

The output data circuit 150 receives as inputs the /CLK3 clock signal and the /DATA_OUT data signal from the timing decode logic 110 on lines 146 and 144. The output data circuit 150 modulates the combination signal as a function of both the /CLK3 signal and the DATA_OUT signal, specifically as the OR function of the inverse of those signals, so that both clock and data information are reflected back to the data link device 20. As will be described in detail below, it is this clock component that the data link device 20 synchronizes with.

The initialization code generator 180 generates an initialization code which the data component of the DI signal transmitted by the data link device 20 must match to cause the data storage device 22 to enter initialize mode. As previously described, in initialize mode the data link device 20 is allowed unrestricted read and write access to every memory location in the RAM 115.

As presently preferred, the initialization code generator 180 is a 1023-bit pseudo-random sequence generator, the generated 1023-bit sequence comprising the initialization code. A 10-bit shift register arranged as a pseudo-random number generator has been found suitable. Such an arrangement of a shift register is well known to those skilled in the art and further explanation is unnecessary to an understanding of the present invention. The initialization code for a particular data storage device 22 is preferably set by the particular hardware arrangement selected for the shift register at the time the data storage device 22 is manufactured.

The initialization code generator 180 receives as inputs the CLK1 clock signal on line 162 and the RESET signal on line 132. The initialization code generator 130 outputs the preset initialization code as a bit-serial signal INIT_DATA on line 182 to the mode control logic 120. The CLK1 signal clocks the initialization code onto line 182 one bit at a time. The occurrence of a RESET signal causes the initialization code generator 180 to start sending the 1023-bit pseudo-random sequence starting with the first bit.

It should be apparent to those skilled in the art that there is a great deal of flexibility in the initialization code scheme of the present invention. For instance, a unique code may be assigned to each individual data storage device 22 or the same code may be given to selected blocks or groups of data storage devices 22. Moreover, it should be apparent that with minor revisions to the address decode logic 190 to be described below, such revisions being of a type readily known to those skilled in the art, the access protection provided by the initialization code can also be made readily available to any selected individual RAM 115 memory locations or blocks of RAM 115 memory locations.

The address counter 170 in a presently preferred embodiment is a conventional device well known to those skilled in the art, such as a conventional 4040 counter. The address counter 170 receives as inputs a CLK1 clock signal on line 162 and the RESET signal on line 132. The address counter 170 has a sequentially-incremented 10-bit digital output on address lines A0–A9, which are connected directly to the corresponding address lines A0–A9 of the RAM 115 by buss 172. Address lines A0–A9 are also connected in parallel to the address decode logic 190 by buss 172. The presence of a RESET signal on line 132 resets the output on the address lines A0–A9 of the address counter 170 to zeros.

Although a 10-bit address counter has been found suitable for use in the presently preferred embodiment of the data storage device 22 in which a maximum of 1024 memory locations are to be accessed, it should be obvious to those skilled in the art that the number of output bits required of the address counter 170 is a function of the number of memory locations to be accessed, which is a somewhat arbitrary choice. For example, if a memory device having 2048 memory locations is used, an address counter having 11 parallel output bits is required. Alternatively, a 10-bit counter could be used and a conventional memory selection scheme employed to select which one of multiple 1024 memory location blocks is selected for access.

The address decode logic 190 generates address decode signals indicating when the 10-bit address value generated by the address counter 170 on address lines A0–A9 corresponds to selected RAM 115 memory locations. These signals are used by the mode control logic 120 and by the timing decode logic 110 to restrict read and/or write access to certain selected memory locations in all modes of operation except initialize mode.

The address decode logic 190 receives the address counter output A0–A9 as inputs on the address buss 172. It also receives the INITMODE signal as an input on line 126. From these input signals, it generates a /LOCOX signal and outputs it on a line 154 to the timing decode logic 110. In addition, it generates a /BLKOX signal which is output on a line 158 to the timing decode logic 110. It also generates address control signals BIT1023, BIT0, and BIT63X, which it outputs to the mode control logic 120 on lines 152, 153, and 156 respectively, and which will be described in detail below.

The discussion will now turn to a detailed description of the electronic circuitry comprising the components of the data storage device 22 more generally described above.

Figure 7A:
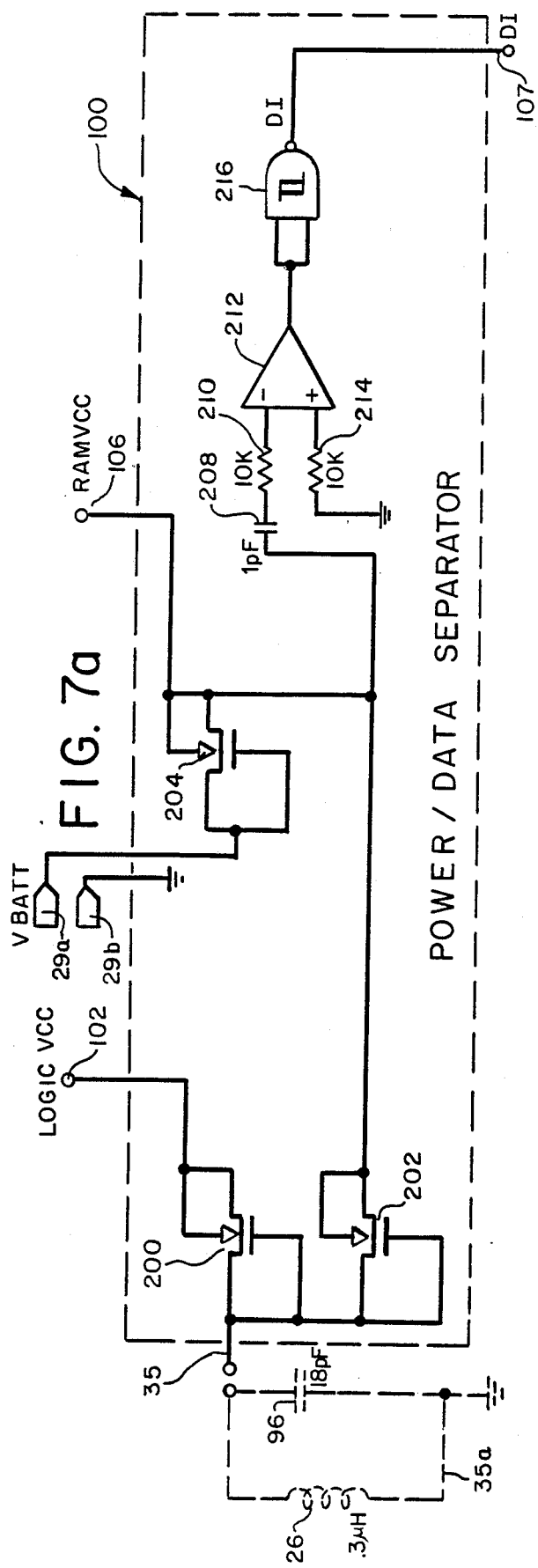
FIG. 7(a) is a detailed electrical schematic diagram of the power/data separator circuit of the data storage device shown in FIG. 6.

As illustrated in FIG. 7a, the coil 26 preferably provides a total inductance of approximately 0.3 microhenry. As previously described, a capacitance of 18 pF, for example, may be present in parallel with the coil 26.

The power/data separator 100 includes first and second N-channel field effect transistors (FETs) 200, 202. The first N-channel FET 200 is connected between the input lead 35 and a LOGICVCC output terminal 102. The second N-channel FET is connected between the input lead 35 and a RAMVCC output terminal 106. The gates and drains of the first and second N-channel FETs 200, 202 are connected to lead 35. The source of the first FET 200 is connected to the LOGICVCC output terminal 102. The source of the second FET 202 is connected to RAMVCC output terminal 106 and one end of a 1 pF capacitor 208. The substrates of the FETs 200 and 202 are connected to their respective sources. The LOGICVCC terminal 102 supplies the operating or supply voltage for all of the other components illustrated in FIGS. 7a–g, except the RAM 115 in the embodiment wherein a RAM rather than an EEPROM memory device is employed.

Also, in the embodiment wherein a RAM is employed, the gate and drain of a third N-channel FET 204 is connected to the positive terminal VBATT 29a of the battery 42. The source and substrate of FET 204 are connected to the RAMVCC output terminal 106, the source and substrate of FET 202, and one end of the 1 pF capacitor 208. The RAMVCC terminal 106 provides the supply voltage to the RAM 115 supply pin.

The other end of the capacitor 208 is connected through a 10K ohm resistor 210 to the inverting terminal of an operational amplifier 212. An MC 14573 operational amplifier has been found suitable for use in this application. The non-inverting terminal of the operational amplifier 212 is connected to ground through a second 10K ohm resistor 214. The output of the amplifier 212 is connected to the input of a Schmitt trigger 216, which outputs the DI signal on line 107.

In operation, the combination signal transmitted by the data link device 20 is received in the coil 26. The combination signal consists of a 49 MHz carrier signal amplitude modulated by a 100 KHz digital clock signal and a separate data signal having a 100 KHz bit rate. The combination signal is conducted into the data-/power separator 100 on lead 35. The first and second N-channel FETs 200, 202, connected as described above, act as diodes, and together with the distributed capacitance in the CMOS IC 24 of the presently preferred embodiment, provide filtering of the 49 MHz carrier. The resulting signal is output on the source of the first N-channel FET 200 to the LOGICVCC output terminal 102 and on the source of the second N-channel FET 202 to capacitor 208, resistor 210, and operational amplifier 212. The capacitor 208 provides DC isolation for the operational amplifier 212. The gain bandwidth of the operational amplifier is much lower than 49 MHz, but is preferably sufficient to track the modulation signals. As a result, the operational amplifier 212 acts to further discriminate against any residual carrier signal, and provides the amplified original digital clock and data modulation signals at the output. The Schmitt trigger 216 outputs a clean digital signal, which has been identified herein as the DI signal, on line 107. This signal comprises the original data and clock information transmitted by the data link device 20.

Figure 7B:
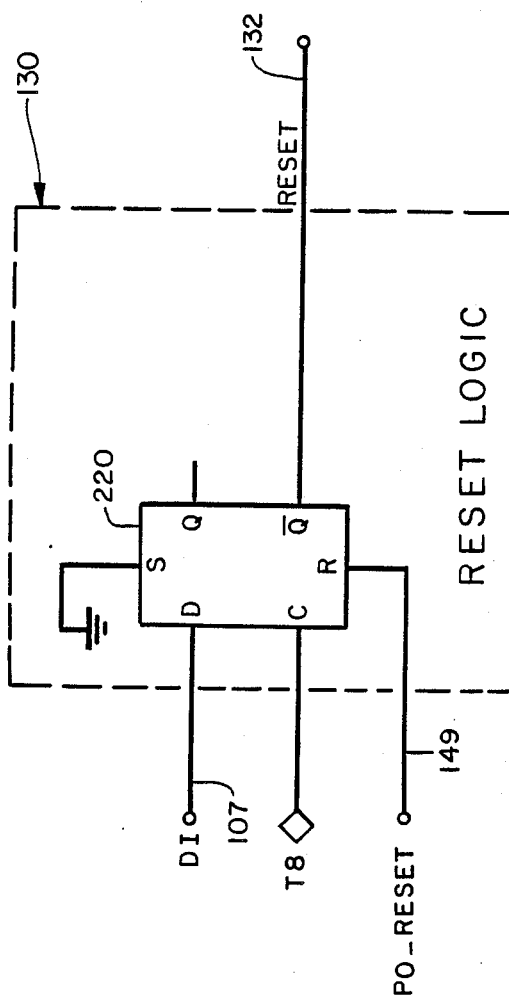
FIG. 7(b) is a detailed electrical schematic diagram of the reset logic circuit of the data storage device shown in FIG. 6.

The reset logic 130 illustrated in FIG. 7b comprises a single D-latch 220. The set input (S) is grounded, and the reset input (R) is connected to the PO_RESET signal on line 149. The clock input (C) is connected to the T8 clock signal generated by the oscillator/clock generator 140. The data input (D) is connected to the DI signal on line 107. The inverted output (/Q) comprises the RESET signal on line 132.

In operation, the reset logic 130 generates a positive RESET signal on line 132 when the clock component of the DI signal on line 107 is low at the rising edge of a T8 clock pulse. This event can be forced by turning off the clock modulation of the carrier in the data link device 20 for one clock cycle. The timing of the T8 clock cycle is such that, with respect to the DI signal, the rising edge of the T8 clock pulse occurs during the same time as the clock component of the DI signal. The rising edge of the T8 clock pulse clocks the state of the clock component of the DI signal through the D-latch 220. If the clock component is low, this causes the inverted output (/Q) to go high, generating the RESET signal on line 132. The RESET signal remains high until clock modulation of the carrier is resumed in the data link device 20. On the next cycle of the T8 clock signal, the positive value of the clock component of the DI signal will be clocked through the D-latch 220, and the RESET signal on the inverted output (/Q) will go low. It should be apparent to those skilled in the art that an alternative is to connect multiple D-latches in series so that a RESET signal will not be generated until an equivalent number of clock components of the DI signal have been missed.

A high RESET signal is also produced when the power-on reset circuit 145 outputs a high PO_RESET signal on line 405. The high PO_RESET signal resets the D-latch 220, forcing the RESET signal to go high for as long as the PO_RESET signal remains high. As will be seen, this condition is present before the data storage device 22 is fully powered up and whenever the voltage level on the LOGICVCC terminal 102 is below a certain minimum value.

Figure 7C:
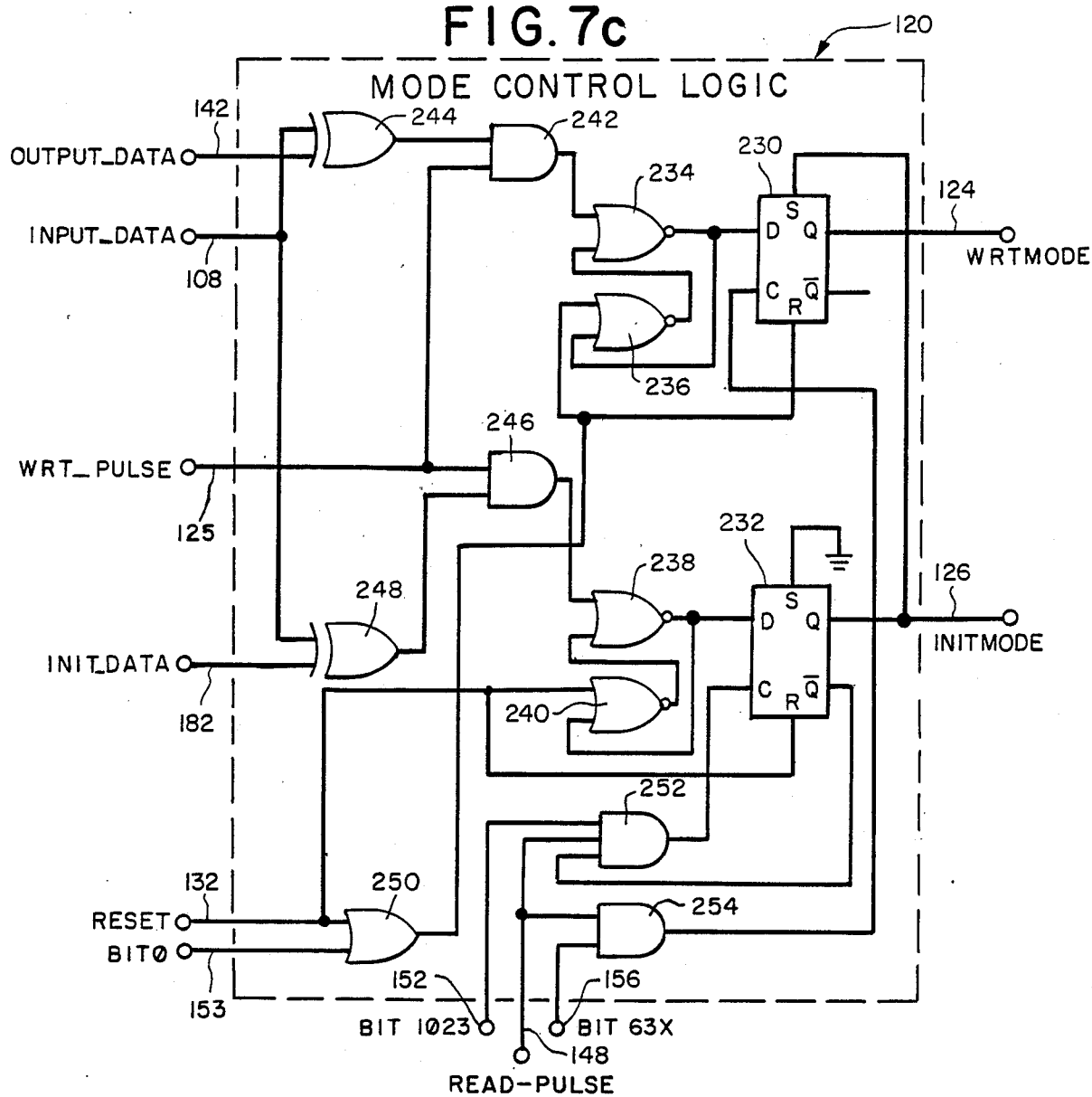
FIG. 7(c) is a detailed electrical schematic diagram of the mode control logic circuit of the data storage device shown in FIG. 6.

The mode control logic 120 illustrated in FIG. 7c includes first and second D-latches 230 and 232. The data input (D) of the first D-latch 230 is connected to the output of a two-input NOR gate 234. One input of the NOR gate 234 is connected to the output of a two-input AND gate 242. The other input of the NOR gate 234 is connected to the output of a two-input NOR gate 236. The inputs of the second NOR gate 236 are connected to the output of the NOR gate 234 and to the reset input (R) of the D-latch 230. The data input (D) of the second D-latch 232 is connected to the output of a NOR gate 238. The inputs of NOR gate 238 are connected to the output of a two-input AND gate 246 and to the output of a two-input NOR gate 240. The inputs of NOR gate 240 are connected to the RESET signal on line 132 and to the output of NOR gate 238. The set input (S) of the second D-latch 232 is connected to ground. The uninverted output (Q) of the second D-latch 232 comprises the INITMODE signal on line 126, which is also connected to the set input (S) of the first D-latch 230. The reset input (R) of the second D-latch 232 is connected to the RESET signal on line 132. The uninverted output (Q) of the first D-latch 230 comprises the WRTMODE signal on line 124. The clock input (C) of the second D-latch 232 is connected to the output of an AND gate 252, while the clock input (C) of the first D-latch 230 is connected to the output of an AND gate 254. The inputs of AND gate 252 are connected to the READ_PULSE signal on line 148, the BIT1023 signal on line 152, and the inverted output (/Q) of the second D-latch 232. The inputs of AND gate 254 are connected to the READ_PULSE and BIT63X signals on lines 148 and 156 respectively. One input of AND gate 242 is connected to the output of an XOR gate 244. The other input is connected to the WRT_PULSE signal on line 125. The inputs of AND gate 246 are connected to the WRT_PULSE signal on line 125 and to the output of an XOR gate 248. The INPUT_DATA signal on line 108 is connected to one input of each of XOR gates 244 and 248. The other input of XOR gate 244 is connected to the OUTPUT_DATA signal on line 142, while the other input of XOR gate 248 is connected to the INIT_DATA signal on line 182. An OR gate 250 has inputs connected to the RESET and BIT0 signals on lines 132 and 153 respectively, and an output connected to the reset input (R) of the first D-latch 230.

In operation, the mode control logic 120 determines whether a write mode command has been transmitted by the data link device 20 as follows. After the data storage device 22 is powered up, the data link device 20 and the data storage device 22 are synchronized. The data storage device 22 is initially in read mode, since it has not yet received a write mode command in the INPUT_DATA signal on line 108. The data link device 20 sends a write mode command by transmitting an exact duplicate of the data in block 0 of the RAM 115, which consists of the first 64 memory locations or bits, in bit-serial format. At the same time, since the data link device 20 and data storage device 22 are synchronized, the data in corresponding address locations in block 0 of the RAM 115 is read out in bit-serial format starting at bit 0. This data comprises the OUTPUT_DATA signal and is input to the XOR gate 244 on line 142. At the same time, the corresponding data bit transmitted by the data link device 20 is input to the XOR gate 244 as the INPUT_DATA signal on line 108. The XOR gate 244 compares each data bit transmitted by the data link device 20 with the corresponding data bit from the RAM 115. Any non-comparison results in a high output from the NOR gate 234, which is clocked through the AND gate 242 and applied to an input of the NOR gate 234. The NOR gates 234 and 236 comprise an input latch which inverts the high output of the XOR gate 244 and latches it, thus retaining a low input on the data input (D) of the D-latch 230. The D-latch 230 is clocked when the BIT63X signal on line 156 goes high indicating that the address counter 170 output A0-A9 has reached a count value of "64". If the data transmitted by the data link device 20 and input as the INPUT_DATA signal matches the data in the first 64 RAM 115 memory locations, a high value remains on the data input (D) of the D-latch 230. This value is clocked through to the uninverted output (Q) on line 124 when the BIT63X signal goes high, thus enabling write mode. If any bits did not compare, the low value latched to the data input (D) of the D-latch 230 by the input latch is clocked through to line 124 thus unenabling write mode.

The mode control logic 120 also determines whether the data link device 20 has transmitted an initialize mode command in a similar manner initialization code generator 180 outputs a bit-serial initialization code INIT_DATA on line 182 to an input of the XOR gate 248. The XOR gate 248 compares the INIT_DATA signal bit for bit with the INPUT_DATA signal. The data link device 20 must transmit data exactly matching the 1023-bit initialization code INIT_DATA to cause the data storage device 22 to enter initialize mode. Any noncomparison is clocked as a high input through AND gate 246, and inverted and latched by NOR gates 238 and 240, thus retaining a low input on the data input (D) of the D-latch 232. The D-latch 232 is clocked when the BIT1023 signal on line 152 goes high, indicating that the address counter has reached a count value of 1023, which is in turn an indication that 1024 cycles of the CLK1 clock signal have occurred and 1024 data bits have been received and compared. If any non-comparison was detected between the INPUT_DATA signal and the 1023-bit initialization code, a low value is clocked through to line 126, thus unenabling initialize mode. If a successful comparison occurred, a high value is clocked through to line 126, the INITMODE signal goes high, and initialize mode is enabled. When initialize mode is enabled, write mode is also automatically enabled by the INITMODE signal setting the D-latch 230. Thus, in initialize mode, there are no read or write restricted memory locations.

A RESET signal on line 132 resets the INITMODE signal on line 126 by resetting the D-latch 232 and the input latch comprised of NOR gates 238 and 240. The RESET signal on line 132 or a high BIT0 signal on line 153 resets the WRTMODE signal on line 124 by resetting the D-latch 230 and the input latch comprised of NOR gates 234 and 236. Thus, the WRTMODE signal is held low until the data storage device 22 is fully powered up, or whenever the data link device 20 transmits a reset command, or whenever the address counter 170 output A0-A9 corresponds to the first bit of storage in the RAM 115, and the data storage device 22 is not in initialize mode.

Figure 7D:
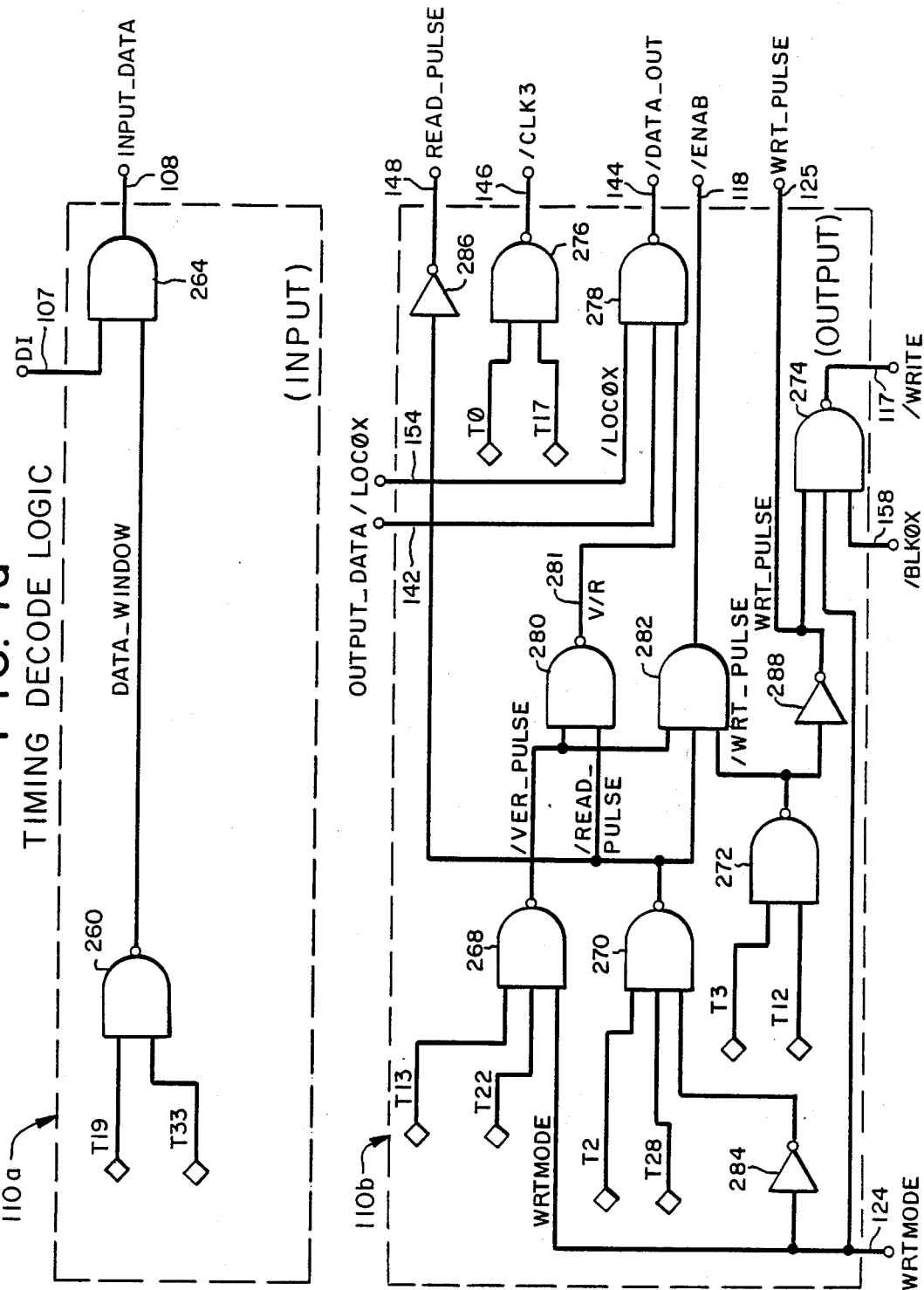
FIG. 7(d) is a detailed electrical schematic diagram of the timing decode logic circuits of the data storage device shown in FIG. 6.

FIG. 7d illustrates the details of the timing decode logic 110, which comprises an input portion 110a and an output portion 110b. The input portion 110a comprises a NAND gate 260 and an AND gate 264. The inputs to NAND gate 260 are connected to clock signals T19 and T33 generated by the oscillator/clock generator 140 illustrated in FIG. 7f. The output of NAND gate 260 is connected to one input of AND gate 264, which has its other input connected to the DI signal on line 107. The output of AND gate 264 comprises the INPUT_DATA signal and is connected to line 108.

The output portion 110b comprises NAND gates 268, 270, 272, 274, 276, 278 and 280, and AND gate 282. The inputs of NAND gate 268 are clock signal T13, clock signal T22, and the WRTMODE signal on line 124. The inputs of NAND gate 270 are clock signals T2 and T28 from the oscillator/clock generator 140 and the output of an inverter 284, the input of which is connected to the WRTMODE signal on line 124. The inputs of NAND gate 272 are clock signals T3 and T12 from the oscillator/clock generator 140. Similarly, the inputs of NAND gate 276 are clock signals T0 and T17 from the oscillator/clock generator 140. The output of NAND gate 276 comprises the /CLK3 signal on line 146. The output of NAND gate 268 is connected to one input of NAND gate 280 and to one input of NAND gate 282. The output of NAND gate 270 is connected to the other input of NAND gate 280, one input of NAND gate 282, and to the input of an inverter 286, the output of which is connected to line 148 and comprises the READ_PULSE signal. The output of NAND gate 272 is connected to one input of AND gate 282 and also to the input of an inverter 288. The output of inverter 288 is connected to one input of NAND gate 274 and comprises the WRT_PULSE signal on line 125. The other inputs to NAND gate 274 are the WRTMODE and /BLKOX signals on lines 124 and 158 respectively. The output of NAND gate 274 is connected to line 117 and comprises the /WRITE signal. The output of AND gate 282 is connected to line 118 and comprises the /ENAB signal. The OUTPUT_DATA and /LOCOX signals on lines 142 and 154 respectively and the output of NAND gate 280 are connected to inputs of NAND gate 278. The output of NAND gate 278 is the /DATA_OUT signal on line 144.

In operation, the timing decode logic 110 continuously generates signals for synchronously controlling the timing of sending and receiving data to and from the data link device 20, and for controlling the timing of writing and reading data to and from the RAM 115. The timing decode logic 110 is never reset but is continuously in operation from the time the data storage device 22 first receives enough power from the data link device 20 for the oscillator/clock generator 140 to generate clock signals.

The input portion 110a of the timing decode logic 110 receives the DI signal on line 107. The DI signal comprises both clock and data components transmitted by the data link device 20. The input portion 110a generates an internal gating signal DATA_WINDOW, which is the output of the NAND gate 260. The timing of this gating signal relative to the DI signal is such that it is high during the time the data component of the DI signal is normally present, and it is low during the time when the clock component of the DI signal is normally present. The AND gate 264 receives both DATA_WINDOW and DI as inputs. Thus, the output of the AND gate 264, which is the INPUT_DATA signal on line 108 comprises the DI signal with the clock component stripped therefrom and only the data component remaining.

The output portion 110b of the timing decode logic 110 generates three timing control signals, /VER_PULSE, /READ_PULSE, and /WRT_PULSE, which control the timing of the modulation of the combination signal by the output data circuit 150, and the timing of the RAM 115 for storing data received from the data link device 20. In addition, the output portion 110b generates a clock signal /CLK3 which is used to modulate the combination signal to reflect clock signals to the data link device 20. As will be apparent to those skilled in the art, the output portion 110b of the timing decode logic 110 of the presently preferred embodiment is implemented in negative logic. The use of such logic is preferred because it requires fewer gates to implement when the logic design is embodied in an integrated circuit as is intended in the present invention. However, it is well known to those skilled in the art that a logic circuit such as the timing decode logic 110 may be constructed using either positive of negative logic, and that the circuit will function equivalently and give identical results in either case.

Figure 19:
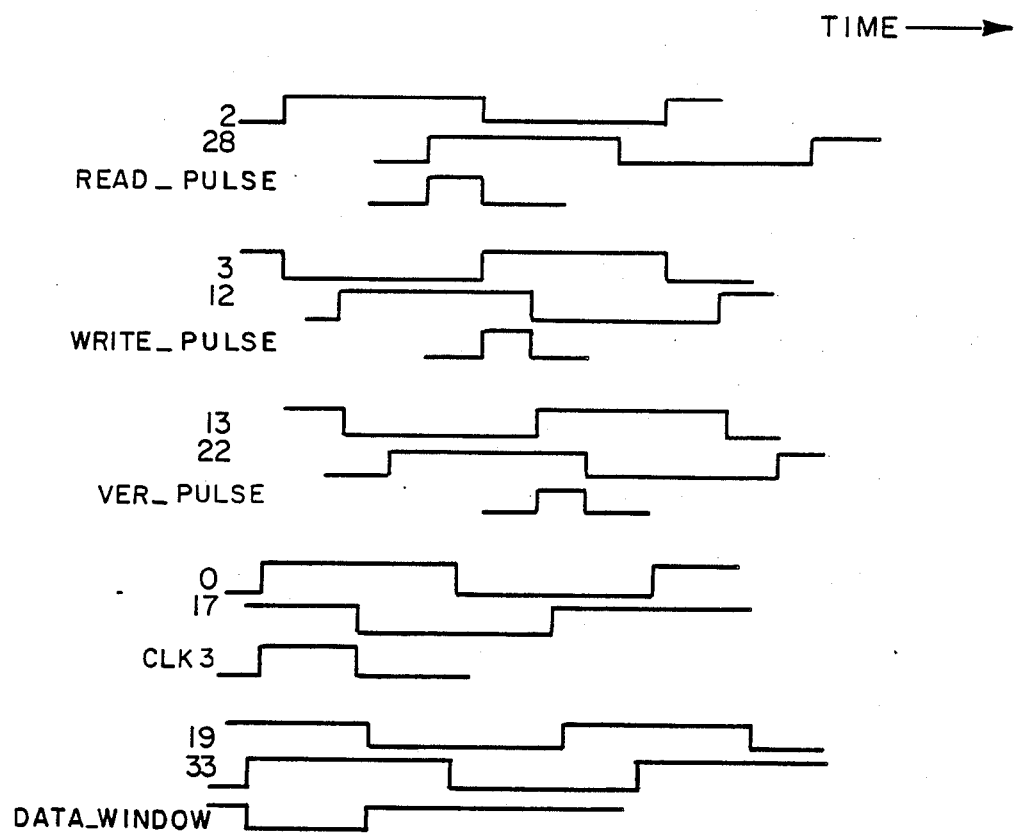
FIG. 19 is a timing diagram showing the generation of various timing and clock signals in the data storage device by the timing decode logic of FIG. 6.

A low/true /VER_PULSE signal is generated when the data storage device 22 is in write mode and the clock signals T13 and T22 are both high. Likewise a low/true /READ_PULSE signal is generated when the data storage device is not in write mode and the clock signals T2 and T28 are both high. A low/true /WRT_PULSE signal is always generated regardless of the mode of operation the data storage device 22 is in when the clock signals T3 and T12 are high. As illustrated in FIG. 19, the /READ_PULSE, /WRITE_PULSE, and /VER_PULSE control signals are sequential, non-overlapping synchronous pulses of durations significantly less than the output clock signals from which they are generated.

The READ_PULSE signal, which is the inverse of the /READ_PULSE signal, is output of line 148 and used in conjunction with the BIT1023 and BIT63X signals from the address decode logic 190 to clock the D-latches 230 and 232 of the mode control logic 120 as previously described. The /READ_PULSE signal is combined with the VER_PULSE signal in NAND gate 28 to generate a synchronous signal V/R on line 281. The synchronous V/R signal is high/true whenever either the /READ_PULSE signal or the /VER_PULSE signal is low/true. The V/R signal synchronously gates the OUTPUT_DATA signal on line 142 to the output data circuit 150 as the /DATA_OUT signal on line 144 on the occurrence of a low /VER_PULSE or /READ_PULSE signal. The /DATA_OUT signal is the data component of the information reflected back to the data link device 20 by the output data circuit 150. A low DATA_OUT signal corresponds to a "1" data bit, and a high /DATA_OUT signal corresponds to a "0" data bit.

Figure 20:
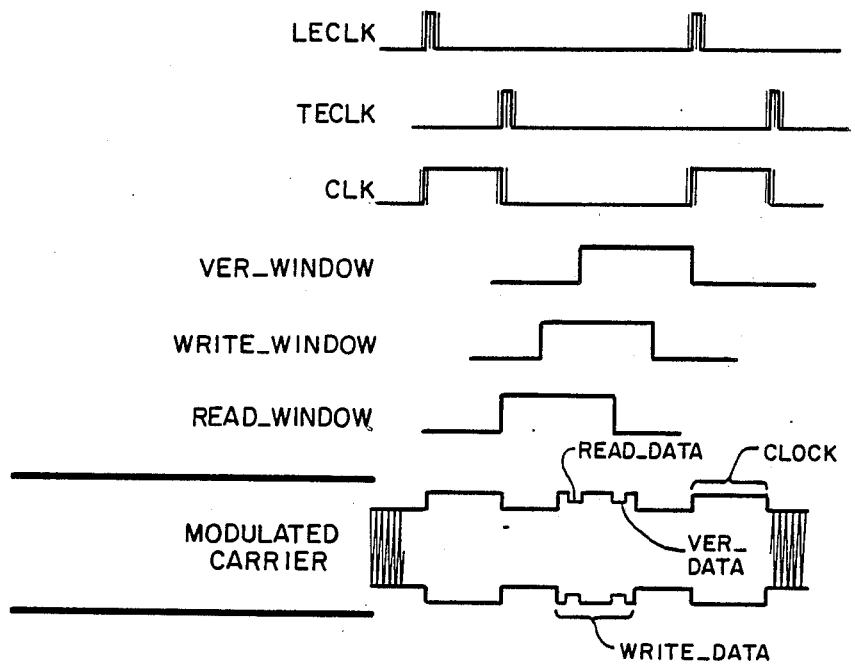
FIG. 20 is a timing diagram showing the relative timing of various clock, gating, and timing signals in the data storage and data link devices with respect to the modulated carrier signal.

The output portion 110b generates the /CLK3 synchronous clock signal from the clock output signals T0 and T17, the /CLK3 signal being low when both the T0 and the T33 signals are high. The synchronous /CLK3 signal comprises the clock component of the information reflected to the data link device 20 by the output data circuit 150. FIGS. 19 and 20 illustrate that the relative timing of the CLK3 pulse, the inverse of the /CLK3 pulse, is such that it precedes the occurrence of the READ_PULSE signal in time and follows the occurrence of the VER_PULSE signal. In other words, the output portion 110b of the timing decode logic 110 continuously, synchronously, and sequentially generates the following cycle of signals: the CLK3 signal, followed by a READ_PULSE signal, followed by a WRT_PULSE signal, followed by a VER_PULSE signal, followed by the next cycle of the CLK3 signal. The /CLK3 signal is similar to the /DATA_OUT signal, i.e., a low /CLK3 signal corresponds to a true clock pulse and a high /CLK3 signal corresponds to a false clock pulse.

The /READ_PULSE, /WRT_PULSE, and /VER_PULSE signals also combine in the AND gate 282 to produce the ENAB signal on line 118. The /ENAB signal, through the power-on reset circuit 145, enables the RAM 115 at the same time as any one of the /READ_PULSE, /WRT_PULSE, or /VER_PULSE signals is low/true, indicating that it is the proper time to read data into or write data out of the RAM 115.

The WRT-PULSE signal, which is the inverse of the /WRT_PULSE signal, combines with the WRTMODE signal on line 124 and the /BLKOX signal on line 158 in the NAND gate 274 to produce the /WRITE signal on line 117. The /WRITE signal goes low and enables the RAM 115 to store the INPUT_DATA signal present on line 108 when the WRT_PULSE signal is high, indicating the proper timing for writing into the RAM 115, and the WRTMODE and /BLKOX signals are high indicating that the data storage device 22 is in write mode and that the address 170 is not currently addressing a memory location in block 0, or that the data storage device 22 is in initialize mode.

Figure 7E:
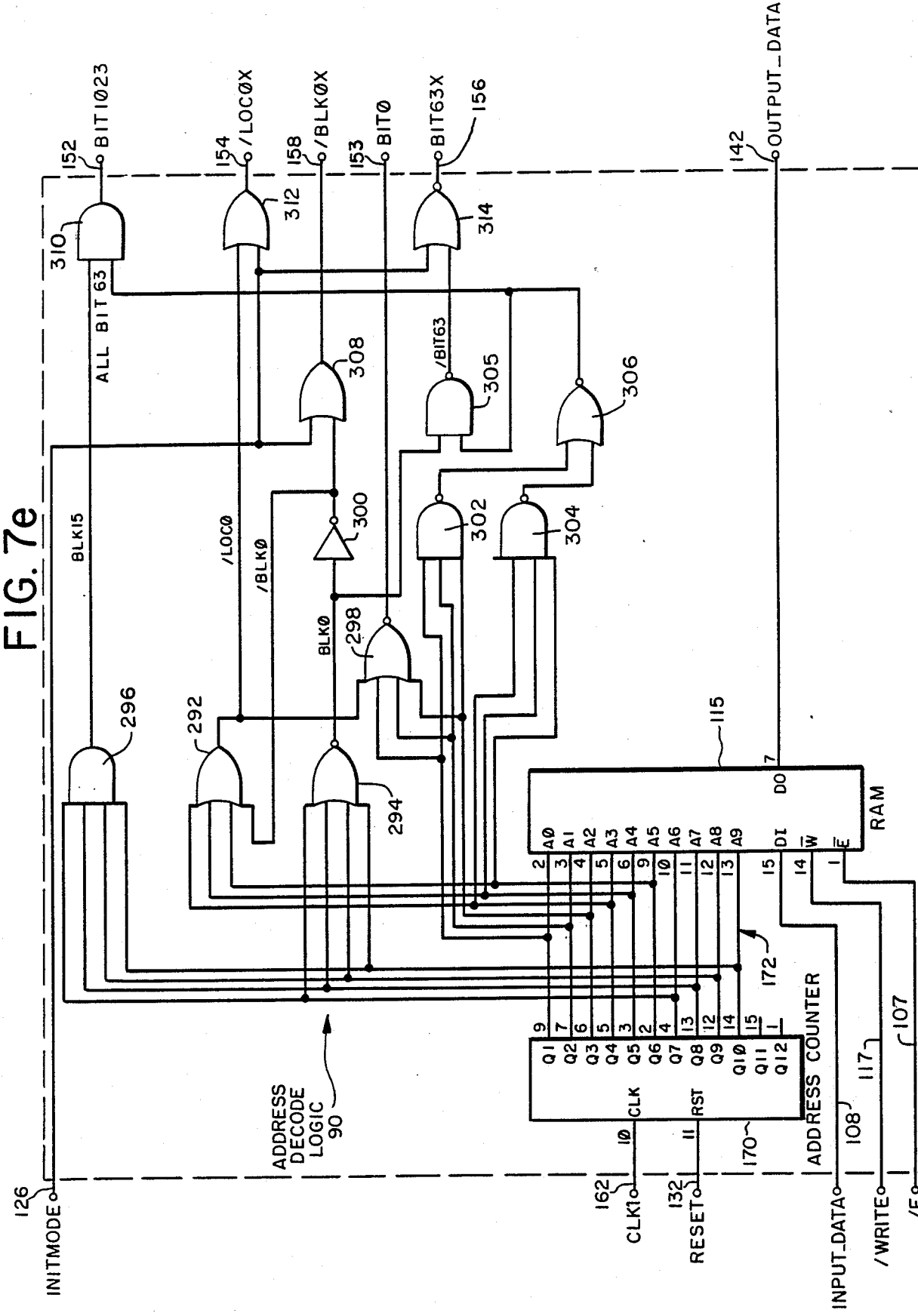
FIG. 7(e) is a detailed electrical schematic diagram of the address counter, address decode logic, and random access memory (RAM) circuits of the data storage device shown in FIG. 6.

FIG. 7e illustrates the details of RAM 115, address counter 170 and the address decode logic 190. The address counter 170, is a conventional sequential counter having a parallel twelve-bit output, of which the ten least significant output bits are used to address memory locations in the RAM 115. Thus 1024 individual address locations or bits can be accessed. The address counter 170, which is suitably a conventional 4040 type or equivalent counter, has clock (CLK) and reset (RST) inputs connected respectively to the CLK1 and RESET signals on lines 162 and 132.

In a presently preferred embodiment, the RAM 115 is a 1K×1 static RAM chip having 1024 separately addressable memory locations. An HM-6508 RAM chip or equivalent has been found suitable. Of course the choice of memory size is somewhat arbitrary and larger or smaller capacity memories can be substituted if desired for different uses. In an equally preferred alternative embodiment, an EEPROM is employed, obviating the need for an on-board battery supply for data retention. The RAM 115 has ten parallel address inputs A0-A9, which are connected directly to the corresponding outputs of the address counter 170. The RAM 115 also receives bit-serial input data from the INPUT_DATA signal on line 108. Further, the RAM 115 receives as inputs the /WRITE signal on line 117, and the /E signal on line 147. The RAM 115 outputs bit-serial data comprising the OUTPUT_DATA signal from the DO output on line 142.

The address decode logic 190 comprises OR gates 292, 308, and 312; NOR gates 294, 298, 306, and 314; NAND gates 302, 304, and 305; AND gates 296 and 310; and inverter 300.

AND gate 296 has its inputs connected to address counter 170 outputs A6-A9 inclusive. OR gate 292 has its inputs connected to address counter 170 outputs A3-A5 inclusive, and to the output of an inverter 300 comprising the /BLK0 signal. The NOR gate 294 has its inputs connected to the address counter 170 outputs A6-A9 inclusive. The output of AND gate 296, which comprises the BLK15 signal, is connected to an input of AND gate 310. The other input of AND gate 310 is connected to the output of a NOR gate 306 which comprises the ALLBIT63 signal. The output of the OR gate 292, which comprises the /LOC0 signal, is connected to an input of NOR gate 298, and to an input of OR gate 312. The other inputs of NOR gate 298 are connected to address counter 170 outputs A0-A2 inclusive. The output of NOR gate 298 comprises the BIT0 signal on line 153. The output of NOR gate 294, which comprises the BLK0 signal is connected to an input of NAND gate 305, and to an input of the OR gate 308 through inverter 300. The other input of NAND gate 305 is connected to the output of NOR gate 306. The inputs of NAND gate 302 are connected to address counter 170 outputs A0-A2 inclusive. The other input of OR gate 308 is the INITMODE signal on line 126. The output of OR gate 308 comprises the /BLK0X signal on line 158. The output of NAND gate 302 is connected to an input of NOR gate 306. A NAND gate 304 has its inputs connected to address counter 170 outputs A2-A5 inclusive, and its output connected to the other input of NOR gate 306. The output of NAND gate 305, which comprises the /BIT63 signal, is connected to an input of NOR gate 314. The INITMODE signal on line 126 is connected to the other input of NOR gate 314 and to an input of OR gate 312. The output of the AND gate 310 is the BIT1023 signal on line 152. The output of OR gate 312 is the /LOC0X signal on line 154. The output of the NOR gate 314 is the BIT63X signal on line 156.

In operation, the address counter 170 increments the count on the RAM 115 address lines A0-A9 on each occurrence of a negative-going edge of the CLK1 clock signal. A short time after the values on the address lines A0-A9 change, the occurrence of a WRT_PULSE signal causes the RAM 115 to be enabled, as well as write-enabled if the data storage device 22 is in write mode, and if, as previously described, the other address-dependent conditions are satisfied. If the mode and address conditions are satisfied, the current state of the INPUT_DATA signal on line 108 is stored in the currently addressed memory location of the RAM 115. A short time thereafter, the occurrence of a /VER_PULSE signal again causes the RAM 115 to be enabled and to output the data bit stored in the immediately preceding write cycle on line 142 as the OUTPUT_DATA signal. In read mode, the occurrence of a /READ_PULSE signal a short time after the values on the address lines A0-A9 change causes the RAM 115 to be enabled and to output the data bit stored in the currently addressed memory location on line 142 as the OUTPUT_DATA signal. In either mode, the address counter 170 increments the address count on the RAM 115 address lines A0-A9 when it is again clocked by the CLK1 clock signal.

When the address counter 170 outputs A3-A9 are all high, the addressed RAM 115 logical memory location is, by definition word 0 of block 0. When a memory location in word 0 of block 0 is addressed (bits 0-7 of block 0), the output of the OR gate 292 comprising the /LOC0 signal is low/true. However, when the A3 output of the address counter 170 goes high, indicating that the address count has reached a value of "S", the LOC0 signal output by the OR gate 292 goes high/false. The /LOC0 signal is always high/false except when the address counter A3-A5 outputs are low, and the /BLK0 signal output by the inverter 300 is low/true, indicating that word 0 (bits 0-7) of block 0 is addressed.

The /BLK0 signal, being the inverse of the BLK0 signal output by the NOR gate 294, is low/true when the BLK0 signal is high/true. The BLK0 signal is high/true when the outputs A6-A9 of the address counter 170 are all low, indicating an address value less than "64" or, in other words, an address value in block 0. When any of the address counter 170 outputs A6-A9 is high, indicating an address value greater than "63", which address is outside block 0, the BLK0 signal goes low/false and the /BLK0 signal goes high/false.

The /BLK0X and /LOC0X signals output by OR gates 308 and 312, on lines 158 and 154 respectively, are formed similarly to each other. The /BLK0X signal is the OR function of the /BLK0 signal and the INITMODE signal on line 126. Thus, the /BLK0X signal is high/false when either the /BLK0 signal is high/false, indicating that a memory location outside block 0 is addressed, or the INITMODE signal is high/true, indicating that initialize mode is enabled. The /LOC0X signal is the OR function of the /LOC0 signal and the INITMODE signal on line 126. The /LOC0X signal is high/false when either the /LOC0 signal is high/false, indicating that a bit outside of word 0 is addressed, or the INITMODE signal is high/true.

The BLK15 signal output by AND gate 296 is high/true when the address counter outputs A6-A9 are high, indicating an address value in block 15, the last block of 64 memory locations in RAM 115. When any of the address counter 170 outputs A6-A9 is low, indicating an address value not in block 15, the BLK15 signal goes low/false.

The BIT0 signal output by the NOR gate 298 on line 153 is high/true when the /LOC0 signal is low/true indicating that word 0 of block 0 is addressed, and the address counter 170 outputs A0-A2 are all low, indicating that bit 0 of word 0 is addressed. The BIT0 signal is low/false otherwise.

A low/true /BIT63 signal output by NAND gate 305 indicates that bit 63 of block 0, or in other words, the last bit of block 0, is addressed. The /BIT63 signal is low/true when the BLK0 signal is high/true and address counter 170 outputs A0-A5 are all high. Thus, the /BIT63 signal goes low/true each time the last bit in block 0 is addressed and is high/false at all other times.

The ALLBIT63 signal output by NOR gate 306 combines with the BLK15 signal in AND gate 310 to produce the BIT1023 signal on line 152 The BIT1023 signal is high/true when both the BLK15 and ALLBIT63 signals are high/true, indicating the last bit in block 15 or, in other words, bit 1023 is addressed.

The /BIT63 signal combines with the INITMODE signal in the NOR gate 314 to produce the BIT63X signal on line 156. The BIT63X signal is used to clock the D-latch 230 in the mode control logic 120 after 64 bits of data from the data link means 20 and the RAM 115 have been compared. The BIT63X signal is high/true when the /BIT63 signal is low/true and the INITMODE signal is low/false. Thus, the BIT63X does not clock the D-latch 230 when the data storage device 22 is in initialize mode. In initialize mode it is unnecessary to clock the D-latch 230 because, as previously described, the high/true INITMODE signal is used to set the D-latch 230, thus automatically enabling write mode.

Figure 7F:
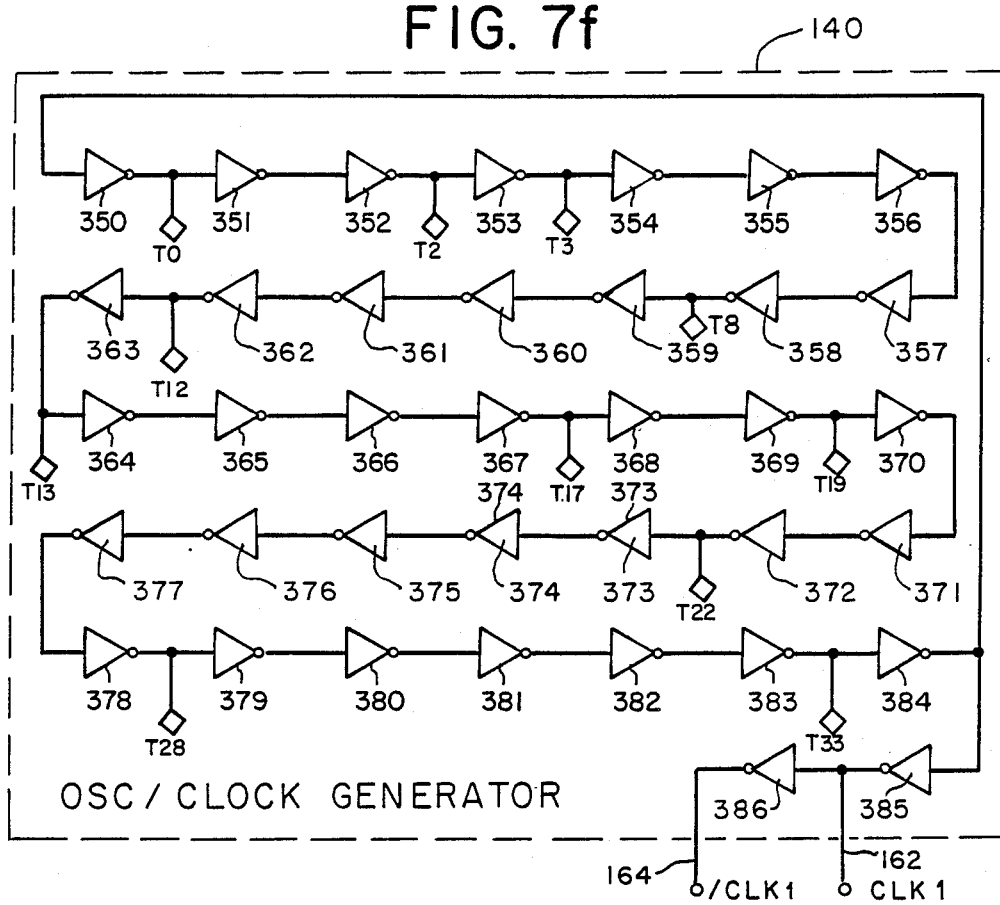
FIG. 7(f) is a detailed electrical schematic diagram of the oscillator/clock generator circuit of the data storage device shown in FIG. 6.

With reference to FIG. 7f, the oscillator/clock generator 140 is preferably a conventional inverter ring oscillator. The ring oscillator comprises thirty-five inverters designated by reference numerals 350 through 384. In a preferred embodiment, the inverters 350–384 are conventional CMOS-type 4069 inverters. Clock signals T0, T2, T3, T8, T12, T13, T17, T19, T22, T28 and T33 are tapped from the ring oscillator after the first, third, fourth, ninth, thirteenth, fourteenth, eighteenth, twentieth, twenty-third, twenty-ninth, and thirty-fourth inverters 350, 352, 353, 358, 362, 363, 367, 369, 372, 378, and 383 respectively. The output of inverter 384 is connected to series-connected inverters 385 and 386. The output of inverter 385 is the CLK1 master clock signal, and the output of inverter 386 is the inverted /CLK1 master clock signal.

In a presently preferred embodiment, the oscillator/clock generator 140 operates at a nominal 100 KHz frequency. The oscillation frequency is dependent on the level of the supply voltage supplied to the data storage device 22 by the data line device 20. In practice, it has been found that a supply voltage level between 3–4 VDC is necessary to achieve the nominal 100 KHz oscillation frequency. The supply voltage is regulated, in a manner to be described below, in order to maintain accurately the nominal 100 KHz oscillation frequency. At the nominal 100 KHz frequency, the period of each clock signal is 10 microseconds. The total propagation delay between the outputs of inverters 350 and 384 is 5 microseconds. The oscillator/clock generator 140 runs continuously when power is supplied. It is not reset.

Figure 7G:
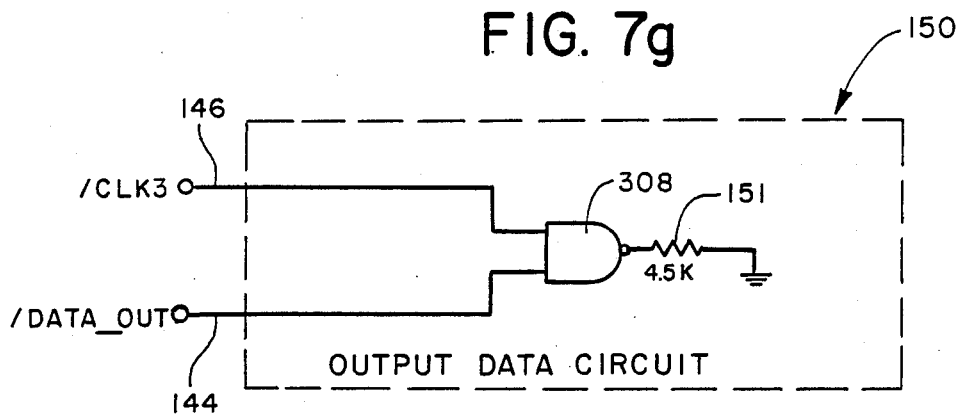
FIG. 7(g) is a detailed electrical schematic diagram of the output data circuit of the data storage device shown in FIG. 6.

FIG. 7g illustrates the details of the output data circuit 150. This circuit comprises a NAND gate 308, which has inputs connected to the /CLK3 and /DATA_OUT signals generated by the timing decode logic 110 on lines 146 and 144 respectively, and an output connected to ground through a 4.5K ohm resistor 151.

Figure 18:
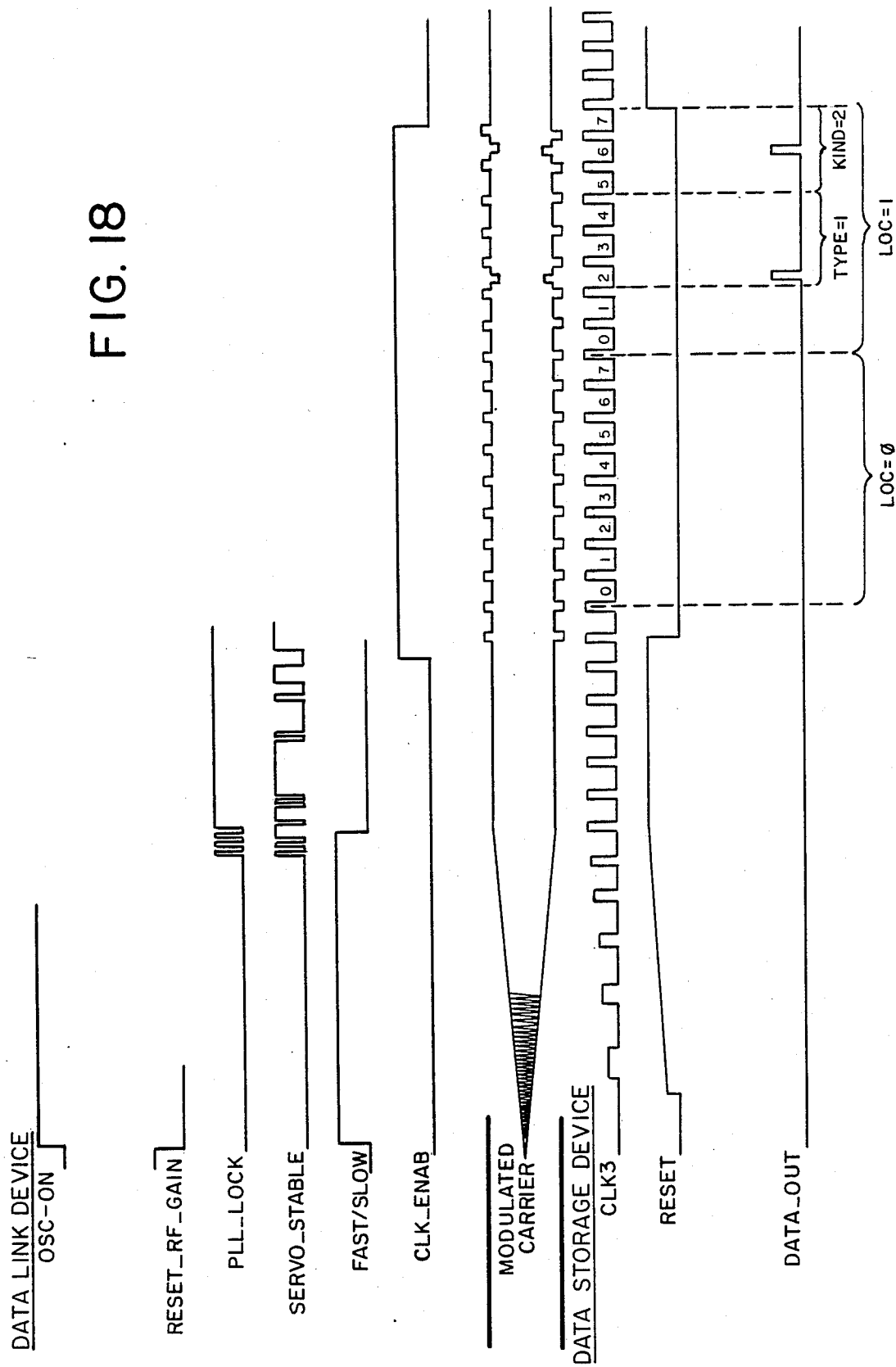
FIG. 18 is a timing diagram showing the typical relative timing of various signals in the data storage and data link devices.

In operation, the output data circuit 150 is a passive rather than an active modulator. The output of the NAND gate 308 is high when a low /CLK3 signal occurs or when a low /DATA_OUT signal occurs, and is low otherwise. The NAND gate 308 acts as a switch with its output state determining whether the 4.5K ohm resistor 151 is part of the total load of the data storage device 22 presented to the combination signal transmitted by the data link device 20. The resistor 151 is switched into the circuit when the NAND gate 308 output is high and is switched out when it is low. Switching the resistor 151 into the circuit presented to the combination signal causes a slight dip in the voltage of the modulated carrier signal, which is illustrated in FIGS. 18 and 20. This variation is sensed in the data link device 20 to drive the data and clock information of the /CLK3 and /DATA_OUT signals.

Figure 7H:
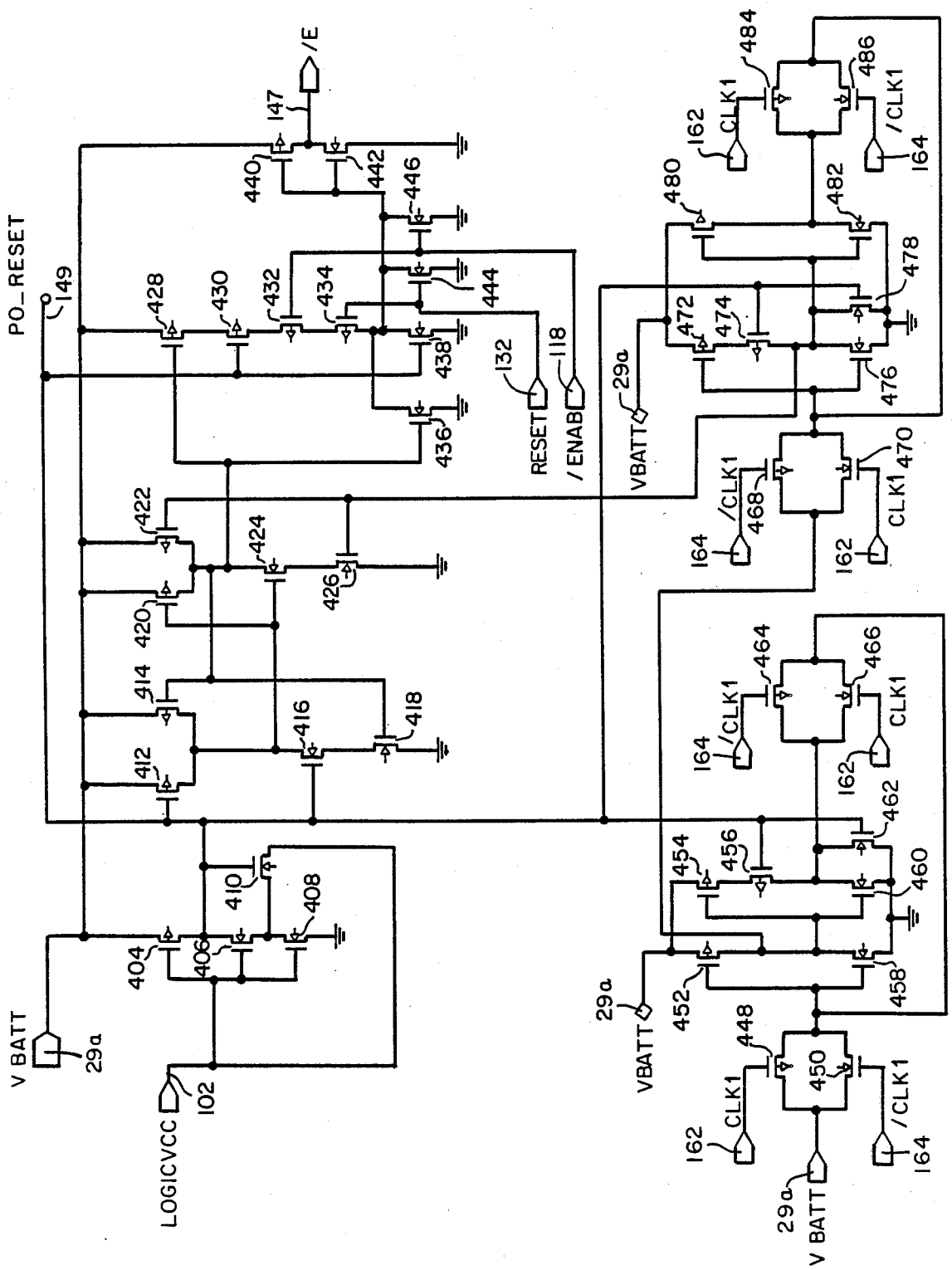
FIG. 7(h) is a detailed electrical schematic diagram of the power-on reset circuit of the data storage device shown in FIG. 6.

When the data link device 20 is not in proximity with the data storage device 22, or when it is removed from proximity therewith, it is critical to maintain power to the RAM 115 or all data previously stored therein will be lost. A power-on reset circuit 145 illustrated in FIG. 7h is provided for this purpose. As illustrated, the power-on reset circuit 145 comprises metal-oxide-silicon field effect transistors (MOSFETs) 400–486.

FETs 448, 450, 452, 454, 456, 458, 460, 462, 464, and 466 are arranged in a D-latch configuration. As part of this arrangement, FET pairs 448 and 450, 464 and 466 are configured as pass gates which pass the logic levels on their respective inputs when clocked by the CLK1 and /CLK1 signals respectively in a manner to be described in detail below. The FETs 468, 470, 472, 474, 476, 478, 480, 482, 484, and 486 are arranged in a second D-latch configuration, which together with the first D-latch described above comprises a master-slave arrangement. As art of the second D-latch, the FET pairs 468 and 470, 484 and 486 are configured as pass gates which pass the logic levels on their respective inputs when clocked by the /CLK1 and CLK1 signals respectively in a manner to be described in detail below.

The gates of P-channel FETs 448 and 484 are connected to the CLK1 signal on line 162. The gates of P-channel FETs 464 and 468 are connected to the /CLK1 signal on line 164. The gates of N-channel FETs 450 and 486 are connected to the /CLK1 signal on line 164. The gates of N-channel FETs 466 and 470 are connected to the CLK1 signal on line 162. The source of P-channel FET 448 and the drain of N-channel FET 450 are connected to the VBATT terminal 29a. The drain of FET 448 and the source of FET 450 are connected to the drain of P-channel FET 464, the source of N-channel FET 466, and the gates of N-channel FET 458, and P-channel FET 452. The source of P-channel FET 452 is connected to the VBATT terminal 29a. The drain of the FET 452 is connected to the drain of N-channel FET 458, the source of P-channel FET 468, the drain of N-channel FET 470, and the gates of P-channel FET 454 and N-channel FET 460. The source of P-channel FET 454 is connected to the VBATT terminal 29a. The drain is connected to the source of P-channel FET 456. The drain of the P-channel FET 456 is connected to the drains of N-channel FETs 460 and 462, the source of P-channel FET 464, and the drain of N-channel FET 466. The sources of the N-channel FETs 458, 460, and 462 are connected to ground. The gates of P-channel FET 456 and N-channel FET 462 are connected to the PO_RESET signal junction on line 149.

The drain of P-channel FET 468 and the source of N-channel FET 470 are connected to the drain of P-channel FET 484, the source of N-channel FET 486, and the gates of P-channel FET 472, and N-channel FET 476. The sources of P-channel FETs 472 and 480 are connected to the VBATT terminal 29a. The drain of the P-channel FET 472 is connected to the source of P-channel FET 474. The drain of P-channel FET 480 is connected to the drain of the N-channel FET 482, the source of P-channel FET 484, and the drain of N-channel FET 486. The gate of the P-channel FET 474 is connected to the gate of the N-channel FET 478 and to the PO_RESET signal junction on line 149. The drain of the P-channel FET 474 is connected to the drains of N-channel FETs 476 and 478, the gates of N-channel FET 482 and P-channel FET 480, and the gates of N-channel FET 426 and P-channel FET 422. The sources of N-channel FETs 476, 478, and 482 are all connected to ground.

Four FETs 404, 406, 408, and 410 are arranged similarly to a Schmitt trigger structure. Three series FETs 404, 406, and 408 have their gates connected to the LOGICVCC terminal 102. The FET 404 is a P-channel FET having its drain connected to the drain of the N-channel FET 406, and its source connected to the VBATT terminal 29a. The N-channel FET 406 has its source connected to the drain of the N-channel FET 408, the source of which is connected to ground. The N-channel FET 410 has its gate connected to the drains of N-channel FET 406 and P-channel FET 404, to the gates of P-channel FETs 412 and 430, and to the gates of N-channel FETs 416 and 438. The signal appearing at this junction is the PO_RESET signal which is output on line 149. The N-channel FET 410 has its drain connected to the LOGICVCC terminal 102 and its source connected to the source of N-channel FET 406, and the drain of N-channel FET 408.

FETs 412, 414, 416, 418, 420, 422, 424, and 426 are arranged in an S-R flip-flop structure. P-channel FETs 412, 414, 420, and 422 all have their sources connected to the VBATT terminal 29a. The drains of P-channel FETs 412 and 414 are connected to the drain of an N-channel FET 416, and to the gates of P-channel FET 420 and N-channel FET 424. The drains of the FETs 420 and 422 are connected to the drain of the N-channel FET 424, to the gates of the P-channel FETs 414 and 428, and to the gates of N-channel FETs 418 and 436. The source of the N-channel FET 416 is connected to the drain of a series N-channel FET 418, the source of which is connected to ground. The source of the N-channel FET 424 is connected to the drain of a series N-channel FET 426, the source of which is connected to ground.

FETs 428, 430, 432, 434, 436, 438, 444 and 446 are arranged in a quad-input NOR gate structure. The source of the P-channel FET 428 is connected to the VBATT terminal 29a. The drain of the P-channel FET 428 is connected to the source of a series P-channel FET 430, and the gate is connected to the drains of the P-channel FETs 420 and 422, and to the gate of the N-channel FET 436. The drain of the P-channel FET 430 is connected to the source of a series P-channel FET 432, and the gate is connected to the gate of the N-channel FET 438 and to the PO_RESET signal junction on line 149 previously described. The drain of the P-channel FET 432 is connected to the source of the P-channel FET 434, and the gate is connected to the gate of the N-channel FET 446 and to the /ENAB signal on line 118. The drain of the P-channel FET 434 is connected in parallel to the drains of the N-channel FETs 436, 438, 444, and 446, and to the gates of P-channel FET 440 and N-channel FET 442. The gate of the P-channel FET 434 and the gate of the N-channel FET 444 are connected to the RESET signal on line 132. The source of each of the N-channel FETs 436, 438, 444, and 446 is connected to ground.

The FETs 440 and 442 are arranged as an inverting buffer. P-channel FET 440 has its source connected to the VBATT terminal 29a. The drain of the P-channel FET 440 is connected to the drain of the N-channel FET 442. The signal at this junction is the /E signal which is output on line 147. The source of the N-channel FET 442 is grounded.

In operation, the pass gate formed by FETs 448 and 450 connects the positive VBATT logic level to the gates of the FETs 452 and 458 on each occurrence of a positive /CLK1 pulse. Likewise, the pass gate formed by FETs 464 and 466 connects the logic level at the source of the FET 464 to the gates of the FETs 452 and 458 on each occurrence of a positive CLK1 pulse. Similarly, the pass gate formed by FETs 468 and 470 connect the logic level at the drain of the FET 452, which comprises the uninverted output of the first D-latch, to the gates of FETs 472 and 476 on each occurrence of a positive CLK1 signal. The pass gate formed by FETs 484 and 486 connect the logic level at the drain of the FET 484 to the gates of the FETs 472 and 476 on each occurrence of a positive /CLK1 signal.

When the voltage level on the LOGICVCC terminal 102 is less than about 1.5-2.0 volts, the PO_RESET signal on line 149 is high. Thus, the gate of the P-channel FET 412, which comprises the set input of the S-R flip-flop, is high.

A high PO_RESET signal turns on the FET 438, which pulls the gates of the FETs 440 and 442 low, turning on FET 440, and pulling the /E signal on line 147 high. A high /E signal ensures that the RAM 115 remains powered for data retention even when the LOGICVCC level is insufficient to support it. At the same time, a high PO_RESET signal turns on FETs 478 and 416. FET 478 pulls the gates of FETs 422 and 426 low. When the gate of the FET 422 is pulled low, the FET 422 is turned on, the voltage at the drain of the FET 422, which comprises the output of the S-R flip-flop, goes high, and the gate of the FET 418 is pulled high turning FETs 418 and 436 on. With FETs 416, 418 and 422 on and the PO_RESET signal high, FETs 424, 426, 428, and 430 are held off. This additionally ensures that the gates of the FETs 440 and 442 are pulled low and that the /E signal on line 147 is high. Still further, a high PO RESET signal turns on the FET 462, which pulls the source of the FET 464 low. When a high CLK1 signal occurs, the FETs 464 and 466 are turned on and pull the gates of the FETs 452 and 458 low. The FET 452 is thus turned on and the voltage at its drain, which comprises the uninverted output of the first D-latch, goes high, thus inputting a high value into the pass gate formed the FETs 468 and 470. On the occurrence of a positive CLK1 signal, the FETs 468 and 470 are turned on and pull the gate of the FETs 472 and 476 high, turning on FET 476 and turning off FET 472. As a result, the gate of the FET 422 is pulled still further low, ensuring again that it is fully turned on.

When the voltage level at the LOGICVCC terminal 102 rises to a certain level determined by the threshold voltage values of the FETs 406 and 408 (typically about 1.5-2.0 volts), the FETs 406 and 408 turn on and pull the PO_RESET signal of line 149 low. Thus, the gate of the FET 412 goes low as well. The low PO_RESET signal turns on FETs 412, 430, 456, and 474. On the next clock cycle, when CLK1 goes high, the FETs 464 and 466 are turned on and pull the gates of the FETs 452 and 458 high. Thus, FET 452 is turned off, FET 458 is turned on, and the voltage at their drains is pulled low. The occurrence of the positive CLK1 pulse also turns on the FETs 468 and 470, which in turn pull the gates of the FETs 472 and 476 low. This turns on FET 472. With FETs 472 and 474 turned on, the gates of the FETs 426 and 422 are pulled high, turning on FET 426 and turning off FET 422. With the FET 412 on, the gate of the FET 424 is pulled high, turning it on. This pulls the voltage at the drain of the FET 422 low and turns on FET 428. The low PO_RESET signal and the low voltage at the drain of the FET 422 hold the FETs 436 and 438 off. Low RESET and /ENAB signals on lines 132 and 118 respectively hold the FETs 444 and 446 off, while turning on the FETs 432 and 434. With FETs 428, 430, 432, and 434 turned on, the gates of the FETs 440 and 442 are pulled high, turning on the FET 442, which pulls the /E signal on line 147 low and enables the RAM 115. Either a high RESET signal on line 132 or a high /ENAB signal on line 118 will turn off FET 434 or 432 and turn on FET 444 or 446. This turns on the FET 440 and pulls the /E signal on line 147 high, thus disabling the RAM 115.

Figure 8:
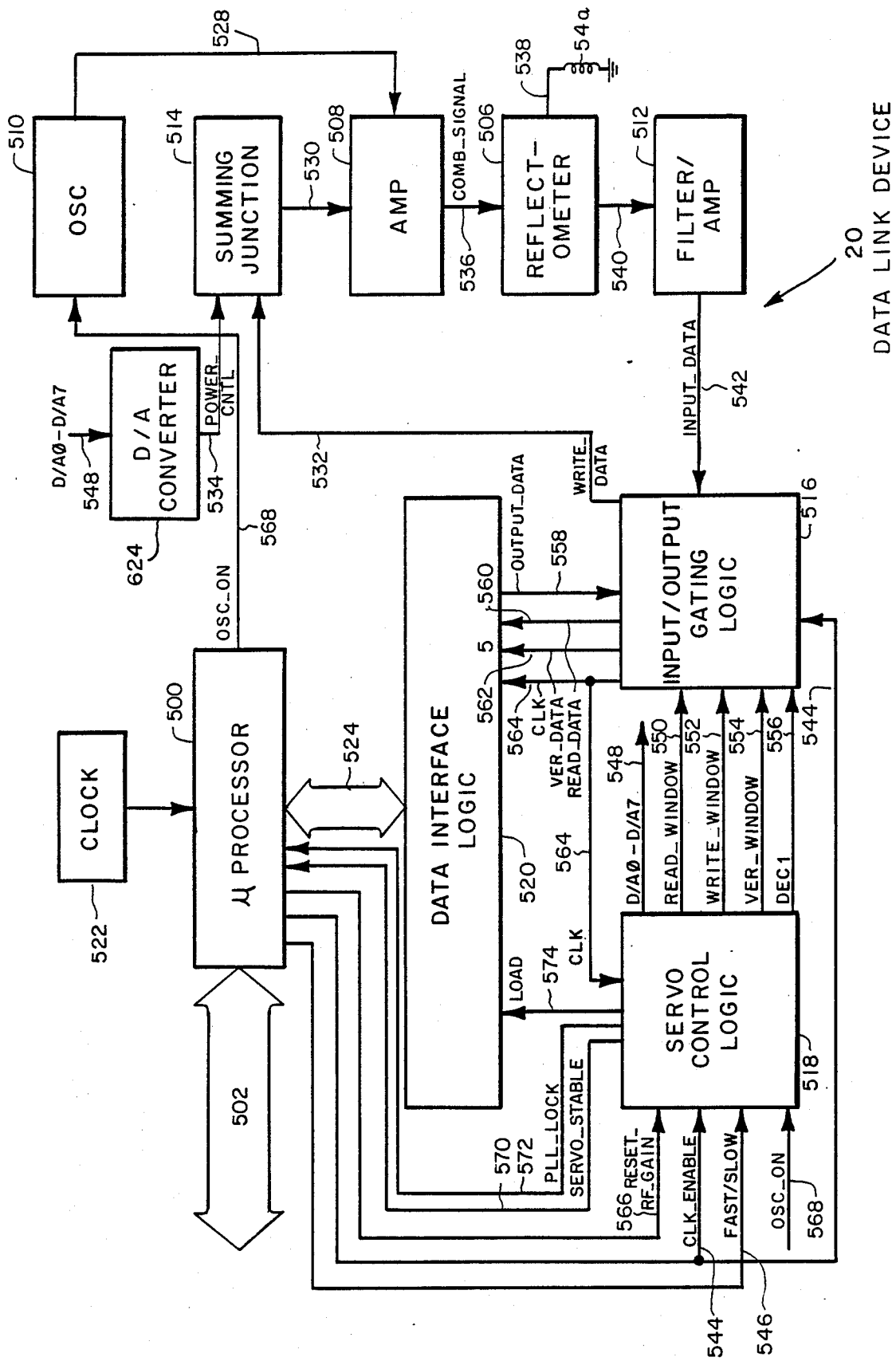
FIG. 8 is a functional block diagram illustrating the major electronic components of a data link device.

FIG. 8 is a block diagram which illustrates the major electronic components of the data link device 20. The data link device 20 includes a microprocessor 500, which may be interfaced to conventional storage means for storing link data signals by conventional buss 502. Buss 502 may also serve to interface the microprocessor 500 to another microprocessor (not shown) or to a host computer (not shown). Neither the additional microprocessor nor the host computer is part of the present invention.

A clock 522, which in a preferred embodiment may be a conventional 1 MHz crystal clock, provides clock signals to the microprocessor 500. The microprocessor 500 and 1 MHz clock 522 are preferably implemented as any conventional 8-bit microprocessor having an on-board 1 MHz clock, such as, for example, an HD63B01Z0 CMOS microprocessor. The data link device 20 also comprises means for generating a combination signal having a power component and a data component derived from link data signals. The data link device 20 further comprises means for continuously transmitting said combination signal to a data storage device 22 when the data link device 20 is brought into proximity therewith. The foregoing means include a reflectometer 506, an amplifier 508, an oscillator 510, a filter/amplifier 512, a summing junction 514, a D/A converter 624, input/output gating logic 516, a servo control logic circuit 518, a data interface logic circuit 520, and a coil 54a.

The microprocessor 500 is connected to the data interface logic 520 by a conventional buss 524. The data interface logic 520 acts as the data interface between the microprocessor 500 and an input/output gating logic circuit 516. The data interface logic 520 receives a CLK clock signal, and bit-serial input data signals VER-DATA and READ-DATA from the input/output gating logic 516 as inputs on lines 564, 562, and 560 respectively. It forms 8-bit parallel data words therefrom and sends the parallel data words to the microprocessor 500. It also receives 8-bit parallel output data words from the microprocessor 500 and generates therefrom a bit-serial output data signal OUTPUT_DATA, which it outputs to the input/output gating logic 516 on line 558. A LOAD control signal generated by the servo control logic circuit 518 is input to the data interface logic 520 on line 574 and controls the input and output of data by the data interface logic 520.

The input/output gating logic circuit 516 also receives a CLK_ENABLE control signal on line 544 as an input directly from the microprocessor 500. As will be seen, the CLK_ENABLE signal can be used to control the reset of the data storage device 22. The input/output gating logic 516 also receives as inputs data gating signals READ_WINDOW on line 550, WRITE_WINDOW on line 552, VER_WINDOW on line 554, INPUT_DATA on line 542, and OUTPUT_DATA on line 558. In addition, the input/output gating logic 516 receives a clock gating signal DEC1 as an input on line 556. The foregoing data and clock gating signals are generated by a servo control logic circuit 518. In addition to the CLK, VER_DATA and READ_DATA signals described previously, the input/output gating logic 516 also produces a WRITE_DATA output signal containing clock and data components on line 532.

The input/output gating logic 516 uses the READ_WINDOW and VER_WINDOW data gating signals to derive the READ_DATA and VER_DATA input data signals from the INPUT_DATA signal, and the WRITE_WINDOW data gating signal to derive the WRITE_DATA output data signal from the OUTPUT_DATA signal. In addition, the input/output gating logic 516 uses the DEC1 clock gating signal to "capture" the clock component of the INPUT_DATA signal reflected from the data storage device 22. The "captured" clock component is the CLK signal, which was the /CLK3 clock signal in the output data circuit 150 of the data storage device 22. By "capturing" the clock signal /CLK3 reflected by the data storage device 22 and using it as the master clock signal CLK in the data link device 20, accurate synchronization of the two devices is achieved and maintained during communication therebetween.

The servo control logic circuit 518 receives as inputs a RESET_RF_GAIN control signal on line 566, the CLK_ENABLE control signal on line 544, the FAST/SLOW control signal on line 546, and the OSC_ON control signal on line 568 directly from the microprocessor 500. It also receives the CLK clock signal on line 564 as an input from the input/output gating logic 516. The servo control logic 518 outputs a SERVO_STABLE control signal and a PLL_LOCK control signal to the microprocessor 500 on lines 570 and 572 respectively. The servo control logic 518 also produces the output signals LOAD, READ_WINDOW, WRITE_WINDOW, VER_WINDOW, and DEC1, as previously described. In addition, the servo control logic 518 produces an 8-bit parallel digital output signal D/A0-D/A7 on lines 548 which are connected as inputs to a D/A converter 624.

The D/A converter 624 outputs on line 534 an analog signal POWER_CNTL, the magnitude of which is determined by the inputs D/A0-D/A7.

The summing junction 514 receives the WRITE_DATA signal from the input/output gating logic 516 and the POWER_CNTL signal as inputs on lines 532 and 534 respectively. The summing junction 514 produces an output signal, which is the algebraic summation of the two input signals, on line 530.

The oscillator 510, which in a presently preferred embodiment is a 49 MHz oscillator, outputs a 49 MHz carrier signal on line 528. The on/off state of the oscillator 510 is controlled by the state of the OSC_ON signal output to the oscillator 510 by the microprocessor 500 on line 568.

The amplifier 508, which in a presently preferred embodiment is a variable gain amplifier, receives the output signals of the summing junction 514 and oscillator 510 as inputs on lines 530 and 528 respectively. The amplifier 508 amplifies the 49 MHz carrier signal according to the magnitude of the summing junction 514 output signal and produces an amplitude modulated COMB_SIGNAL, which it outputs on line 536.

The reflectometer 506 receives the COMB_SIGNAL on line 536 as an input from the amplifier 508 and outputs the COMB_SIGNAL to one end of the coil 54a on line 538. The other end of the coil 54a is grounded. The coil 54a continuously transmits the COMB_SIGNAL to a data storage device 22.

Simultaneously with the transmission of the combination signal by coil 54a, the data storage device 22 "impedance-modulates" the combination signal as previously described. The reflectometer 506 serves to detect or sense the modulation by the data storage device 22 and outputs the modulated COMB_SIGNAL modulated by both the data link and data storage devices on line 540.

The filter/amplifier 512 receives the modulated COMB_SIGNAL on line 540 as an input, amplifies it, and strips or removes the 49 MHz carrier therefrom. The filter/amplifier 512 outputs the resulting INPUT_DATA signal containing clock and data information from the data storage device 22 on line 542 to the input/output gating logic 516. By transmitting the COMB_SIGNAL modulated with data and clock components from the data link device 20 and simultaneously demodulating the COMB_SIGNAL to derive the data impedance modulated onto the COMB_SIGNAL by the data storage 22 as described above, the data link device 20, together with the data storage device 22 communicates data bi-directionally and simultaneously.

In operation, the servo control logic 518 synchronizes the data link device 20 and the data storage device 22, and controls the magnitude of the COMB_SIGNAL transmitted to the data storage device 22 by the coil 54a to regulate the supply voltage of the oscillator/clock generator 140 on the data storage device 22 to achieve and maintain the preferred nominal 100 KHz oscillation frequency thereof.

The servo control logic 518 synchronizes the data link device 20 with the data storage device 22 by locking onto the phase of the clock component of the INPUT_DATA signal. When it has successfully locked onto the phase, it generates the PLL_LOCK signal to inform the microprocessor 500. It also generates the DEC1 clock gating signal to capture the clock component of the INPUT_DATA signal. It receives the "captured" CLK signal back from the input/output gating logic 516 and generates the READ_WINDOW, WRITE_WINDOW, and VER_WINDOW data gating signals at appropriate times relative thereto. The servo control logic 518 also uses the "captured" CLK signal to generate the LOAD control signal on line 574 at the appropriate times to cause data words comprising the VER_DATA, READ_DATA, and OUTPUT_DATA data signals to be input to and output by the data interface logic 520.

The servo control logic 518 regulates the magnitude of the COMB_SIGNAL and hence the supply voltage of the oscillator/clock generator 140 of the data storage device 22 by determining the frequency of the clock component of the INPUT_DATA signal in a manner to be described in detail below. The servo control logic 518 generates the 8-bit parallel digital output signal D/A0–D/A7, which corresponds to the difference between the detected and nominal frequencies and outputs it to the D/A converter 624, which generates the corresponding analog signal POWER_CNTL therefrom. The POWER_CNTL signal adds or subtracts from the magnitude of the COMB_SIGNAL in the summing junction 514 and is transmitted as part thereof to the data storage device 22 by the coil 54a. When the servo control logic 518 detects that the oscillator/clock generator 140 is operating at the nominal 100 KHz frequency, it outputs a SERVO_STABLE signal to inform the microprocessor 500 and causes the D/A0-D/A7 signal to remain at its current value until such time as the oscillator/clock generator 140 strays from the nominal oscillation frequency.

As will be described in detail below, the operation of the servo control logic 518 is controlled by the microprocessor 500 via the CLK_ENABLE, FAST/SLOW, RESET_RF_GAIN, and OSC_ON control signals previously identified above.

Figure 9:
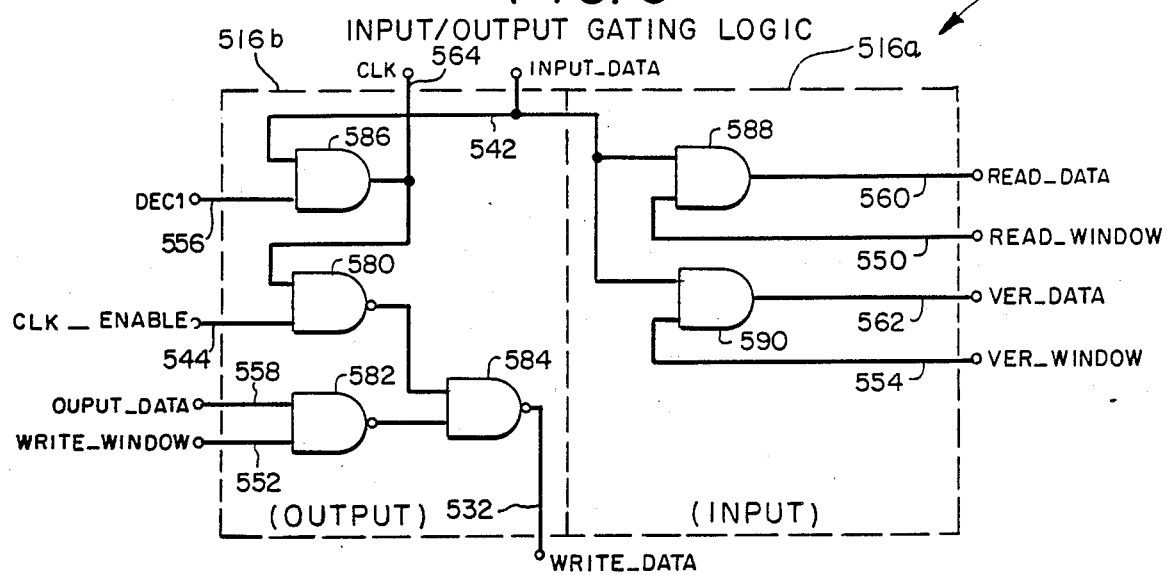
FIG. 9 is a detailed schematic diagram of the input/output gating logic circuits of the data link device shown in FIG. 8.

FIG. 9 illustrates the details of the input/output gating logic 516. As shown therein, the input/output gating logic 516 comprises an input portion 516a and an output portion 516b.

The output portion 516b comprises NAND gates 580, 582, and 584, and AND gate 586. NAND gate 580 has inputs connected to the CLK_ENABLE and CLK signals on lines 544 and 564 respectfully, the CLK signal on line 564 comprising the output of AND gate 586. The inputs of AND gate 586 are the DEC1 and INPUT_DATA signals on lines 556 and 542 respectively. The inputs of NAND gate 582 are the OUTPUT_DATA and WRITE_WINDOW signals on lines 558 and 552 respectively. The inputs of NAND gate 584 are the outputs of NAND gates 580 and 582. The output of NAND gate 584 is the WRITE_DATA signal on line 532.

The input portion 516a comprises AND gates 588 and 590. The inputs of AND gate 588 are connected to the INPUT_DATA and READ_WINDOW signals on lines 542 and 550 respectively. The output of AND gate 588 is the READ_DATA signal on line 560. The inputs of AND gate 590 are connected to the INPUT_DATA and VER_WINDOW signals on lines 542 and 554, respectively. The output of AND gate 590 is the VER_DATA signal on line 562.

In operation, the output portion 516b receives the INPUT_DATA signal from the filter/amplifier 512 and the DEC1 clock gating signal from the servo control logic 518 as inputs to AND gate 586. The DEC1 signal is somewhat wider than the clock component of the INPUT_DATA signal and is timed to correspond thereto so that AND gate 586 "captures" the clock component and outputs it on line 564 as the CLK signal. The NAND gate 580 generates a low signal when both the CLK_ENABLE and CLK signals are high and generates a high output when either the CLK_ENABLE or CLK signal is low. NAND gate 582 generates a low signal when both the OUTPUT_DATA and WRITE_WINDOW signals are high and generates a high output when either of the two signals is low. The WRITE_DATA signal output by NAND gate 584 consequently includes both a clock component from the CLK signal and a data component from the OUTPUT_DATA signal, the data component being spaced in time from the clock component as illustrated in FIG. 20.

The input portion 516a receives the INPUT_DATA signal as an input to AND gates 588 and 590. The other inputs, the READ_WINDOW and VER_WINDOW data gating signals, are timed relative to each other as illustrated in FIG. 20. Each gating signal is somewhat wider than the data pulse it is to gate. In the absence of transmission error difficulties, the VER_DATA and READ_DATA signals output by AND gates 590 and 580 respectively occur nearly in the center of the VER_WINDOW and READ_WINDOW gating signals respectively. The occurrence of both READ_DATA and VER_DATA data signals in the same gating window is an indication that a transmission error due to jitter or other causes has occurred.

Figure 10:
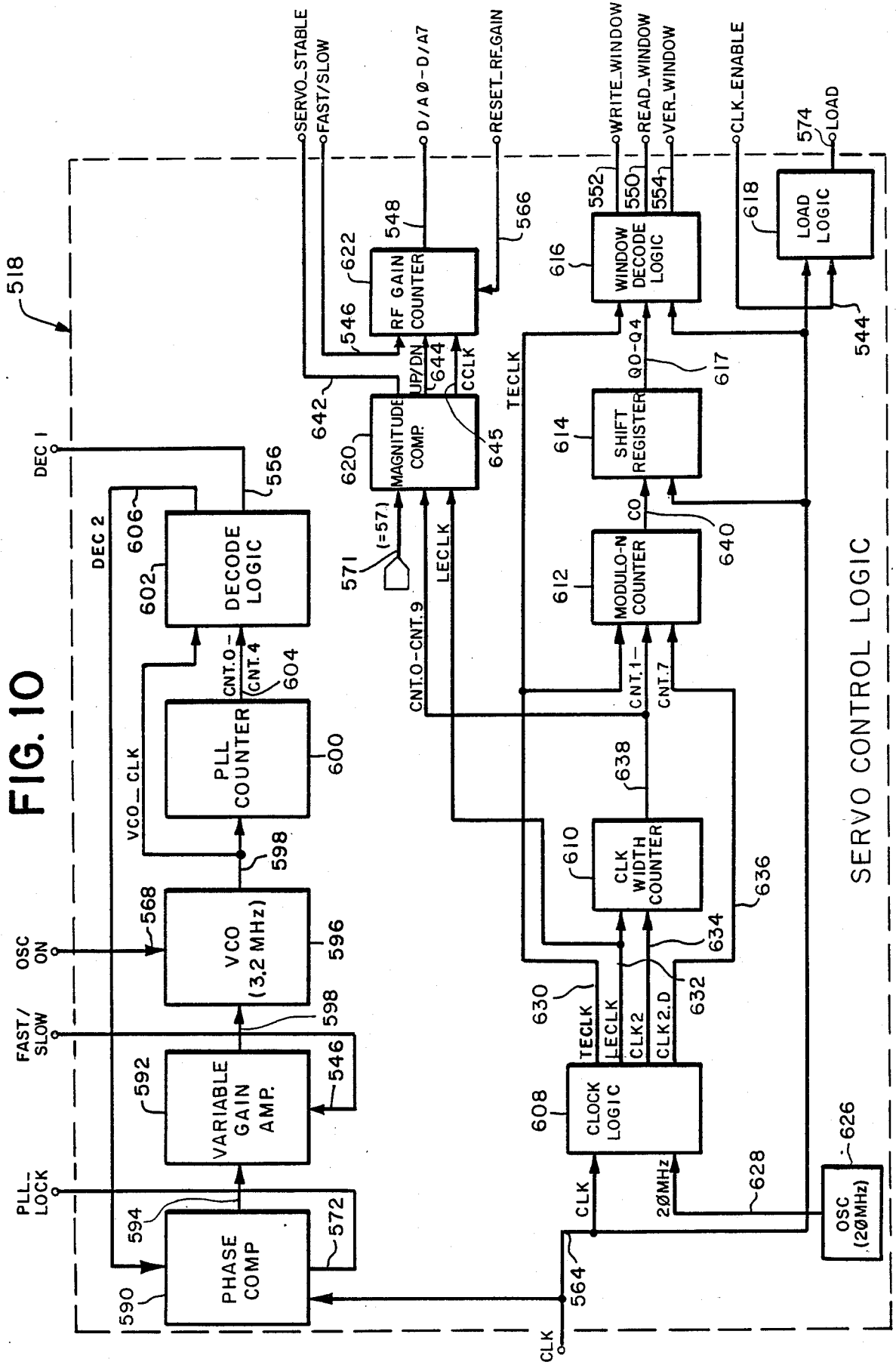
FIG. 10 is a block diagram showing the components of the servo control logic of the data link device shown in FIG. 8.

The details of the servo control logic 518 are shown in FIG. 10. A first portion of the servo control logic 518 includes a phase comparator 590, which in a presently preferred embodiment is implemented as a conventional phase locked loop (PLL). The phase comparator 590 has inputs connected to the CLK signal and to a DEC2 signal on lines 564 and 606 respectively. The phase comparator 590 produces a first output signal on line 594 which is connected to an input of a variable gain amplifier 592. The phase comparator 590 also generates a PLL_LOCK control signal as an output on line 572.

The variable gain amplifier 592 has a second input connected to the FAST/SLOW control signal on line 546. The variable gain amplifier 592 produces an output on line 598 which is connected to an input of a voltage controlled oscillator (VCO) 596.

The VCO 596, which in a presently preferred embodiment is a VCO capable of producing a nominal 3.2 MHz output signal, also receives the OSC_ON control signal as an input on line 568. The VCO 596 produces an output signal VCO_CLK on line 598 which is connected to an input of a PLL counter 600 and to an input of a decode logic circuit 602. The PLL counter 600 produces a 5-bit parallel output count CNT.0–CNT.4 on lines 604.

The decode logic 602 receives the CNT.0–CNT.4 output as inputs on lines 604, and generates DEC1 and DEC2 output signals on lines 556 and 606. The DEC1 signal is connected to the input/output gating logic 516 while the DEC2 signal is fed back as an input to the phase comparator 590.

In operation, the phase comparator 590 compares the phases of the CLK signal on line 564 and the DEC2 signal from the decode logic 602 on line 606. The phase comparator 590 generates an output signal on line 594 having a magnitude related to the difference in phase between the two signals. This signal is amplified by the variable gain amplifier 592, and the amplified signal is output on line 598. The gain of the amplifier 592 is preferably controllable by the state of the FAST/SLOW signal output by the microprocessor 500 on line 546 such that a high FAST/SLOW signal sets the gain to a maximum value and a low FAST/SLOW signal sets the gain to a minimum value. The magnitude of the amplified output signal controls the oscillation frequency of the VCO 596. The VCO 596 is turned on initially by an OSC_ON signal from the microprocessor 500. The VCO_CLK signal output by the VCO 596 is an approximately 50% duty cycle signal having frequency determined by the phase error detected by the phase comparator 590. In a presently preferred embodiment, the VCO 596 oscillates at a nominal 3.2 MHz frequency. The PLL counter 600 in a presently preferred embodiment produces counter output signals CNT.0–CNT.4 having frequencies of one half, one fourth, one eighth, one sixteenth, and one thirty-second the frequency of the VCO_CLK signal. The decode logic 602 uses these signals to generate the clock decode signals DEC1 and DEC2 on lines 556 and 606, respectively. The DEC2 signal should have the same timing characteristics as the clock component of the INPUT_DATA signal. It is a 2/7 duty cycle digital signal having a frequency in the same range of magnitude as the clock component, the exact frequency being determined by the output of the variable gain amplifier. At a zero phase error, it is identical to the clock component of the INPUT_DATA signal. The DEC1 signal is a clock gating signal. It has the same frequency and phase as the DEC2 signal, but is wider, i.e., has a greater duty cycle. As previously described, the input/output gating logic 516 uses this signal to "capture" the clock component of the INPUT_DATA signal.

It will be readily apparent to those skilled in the art that the overall function of the above-described first portion of the servo control logic 518 is to synchronize the data link device 20 with the data storage device 22 and to generate signals which the data link device 20 can use to "capture" the clock information generated and reflected to the data link device 20 by the data storage device 22.

A second portion of the servo control logic 518 includes a clock logic circuit 608, a CLK width counter 610, a modulo-n counter 612, a shift register 614, a window decode logic circuit 616, a load logic circuit 618, a magnitude comparator 620, an RF gain counter 622, and an oscillator circuit 626.

The clock logic 608 has inputs connected to the CLK signal on line 564, and to the output of a 20 MHz oscillator 626 on line 628. The clock logic 608 outputs a trailing edge clock signal TECLK on line 630, a leading edge clock signal LECLK on line 632, a CLK2 signal on line 634, and a CLK2.D signal on line 636.

The CLK width counter 610 receives the LECLK and CLK2 signals as inputs on lines 632 and 634. It generates a 10-bit count output CNT.0–CNT.9 on lines 638, which are connected to inputs of the modulo-n counter 612 and to the magnitude comparator 620.

The magnitude comparator 620 also receives the LECLK signal as an input on line 632. The magnitude comparator 620 further has a 10-bit parallel input connected to a digital value, preferably equal to "57" on lines 571. The magnitude comparator 620 generates SERVO_STABLE, CCLK, and UP/DN output signals on lines 642, 645, and 644, respectively.

The RF gain counter 622 receives the UP/DN signal as an input on line 644. In addition, it receives as inputs the FAST/SLOW, and RESET_RF_GAIN control signals on lines 546 and 566, and the CCLK signal on line 645. The RF gain counter 622 generates an 8-bit parallel digital output D/A0–D/A7 on lines 548 which are connected to inputs of the D/A converter 624 as previously described above.

The modulo-n counter 612 receives as inputs on lines 638 the CNT.1–CNT.7 outputs from the CLK width counter 610. It also receives the TECLK and CLK2.D signals as inputs on lines 630 and 636, respectively. The modulo-n counter 612 generates an output signal CO on line 640.

The shift register 614 receives the CO signal as an input on line 640 and the CLK signal as an input on line 564. It outputs a parallel 5-bit digital output Q0–Q4 on lines 617. In a presently preferred embodiment, the shift register 614 is at least 5 bits long.

The window decode logic 616 receives as inputs the Q0–Q4 signals on lines 617, the CLK signal on line 564, and the TECLK signal on line 630. The window decode logic 616 outputs the data gating signals WRITE_

WINDOW, READ_WINDOW, and VER_WINDOW on lines 552, 550 and 554, respectively.

The load logic 618 receives the CLK and CLK_ENABLE signals as inputs on lines 564 and 544, respectively. The load logic 618 outputs a LOAD control signal on line 574.

In operation, the clock logic 608 receives the CLK signal as an input. The clock logic 608 is clocked at a 20 MHz rate by the oscillator 626 and detects the leading and trailing edges of the CLK signal. It generates a narrow pulse comprising the LECLK signal upon detecting the leading edge, and a second narrow pulse comprising the TECLK signal upon detecting the trailing edge. It also outputs the CLK2 signal, which is the 20 MHz clock gated with the CLK signal to produce a 20 MHz clock signal when the CLK signal is high, and a low signal when the CLK signal is low. The clock logic 608 also produces the CLK2.D signal which is the 20 MHz clock signal starting two 20 MHz clock cycles after the CLK signal has gone low and ending when the CLK signal goes high again.

The CLK width counter 610 is reset by the occurrence of an LECLK signal and is clocked at a 20 MHz rate by the CLK2 signal. The CLK2 signal begins clocking the CLK width counter when the CLK signal goes high, and stops when it goes low. The value of the output count CNT.0–CNT.9 when the CLK signal goes low is an indication of the width of the CLK pulse, and consequently of its period and frequency. It has been found that if the oscillator/clock generator 140 in the data storage device 22 is operating at the 100 MHz nominal frequency, the CLK width corresponds to a CNT.0–CNT.9 value of "57".

The CLK width counter outputs CNT.0–CNT.9 are input to the magnitude comparator 620 and compared with the digital value "57". If the value of CNT.0–CNT.9 is equal to "57", the CCLK output signal does not occur, and a SERVO_STABLE signal is output to the microprocessor 500 to indicate that the oscillator clock generator 140 in the data storage device 22 is operating at exactly the 100 KHz nominal frequency. If CNT.0–CNT.9 is greater than "57", the UP/DN signal will be high to cause the RF gain counter 622 to count up by one. If CNT.0–CNT.9 is less than "57", the UP/DN signal will be low to cause the RF gain counter 622 to count down by one. The UP/DN signal is clocked into the RF gain counter 622 upon the occurrence of a LECLK pulse, only if the count value CNT.0–CNT.9 does not equal "57".

The RF gain counter 622 produces an 8-bit output count D/A0–D/A7, which is converted to the analog POWER_CNTL signal by the D/A converter 624 and applied to the summing junction 514, as previously described, to regulate the amplitude of the COMB_SIGNAL and consequently the oscillation frequency of the oscillator/clock generator 140 in the data storage device 22. The count value D/A0–D/A7 of the RF gain counter 622 is reset to zero by the application of a RESET_RF_GAIN signal thereto by the microprocessor 500. The RF gain counter 622 counts in a fast mode upon the application of a high FAST/SLOW control signal thereto by the microprocessor 500. A low FAST/SLOW signal causes it to count in a slow mode, in which it updates the count value D/A0–D/A7 sixteen times slower than in the fast mode.

The modulo-n counter 612 receives the CLK width counter 610 outputs CNT.1–CNT.7 in parallel with the magnitude comparator 620. The 7-bit CNT.1–CNT.7 value gives an indication of the width of the CLK pulse divided by two. The divided-by-two value is clocked into the modulo-n counter 612 to set the modulus by the occurrence of a TECLK pulse. Two 20 MHz clock cycles after the CLK signal has gone low, the CLK2.D signal begins clocking the modulo-n counter 612 at a 20 MHz rate. The modulo-n counter 612 is operated as a downcount counter. Each time it reaches a zero count, it generates a CO output signal. The CO signal, in addition to being sent to the shift register 614, is also used internally to the modulo-n counter to cause the CNT.1–CNT.7 count value to be loaded.

The shift register 614 is clocked by CO pulses from the modulo-n counter 612. The shift register data input is held high so that sequential CO pulses clock high values through the shift register 614. The shift register 614 is tapped to produce outputs Q0–Q4 which are input to the window decode logic 616. The shift register contents are reset to low values when the CLK signal goes high.

The window decode logic 616 uses the TECLK signal and the Q0–Q4 outputs of the shift register 614 to produce the READ_WINDOW, WRITE_WINDOW, and VER_WINDOW data gating signals with the relative timing shown in FIG. 20. Each of the data gating signals is three CO signals, or three shifts in length and overlaps the adjacent signals by two shifts, as illustrated. The data gating signals are bounded by the occurrence of a TECLK pulse and the rising edge of the CLK signal.

The load logic 618 is enabled and reset by the CLK_ENABLE control signal from the microprocessor 500. When enabled, the load logic 618 counts occurrences of the rising edge of the CLK signal and outputs a high LOAD control pulse after eight occurrences. The LOAD pulse is used by the data interface logic 520 to clock in and out 8-bit parallel data words as previously described.

It should by now be apparent to those skilled in the art that the above-described second portion of the servo control logic 518 performs several functions. First, it controls the amplitude of the modulated COMB_SIGNAL transmitted to the data storage device 22 by the coil 54a in order to regulate the oscillation frequency of the oscillator/clock generator 140 in the data storage device 22. Second, it controls the rate of increasing RF power transmitted to the data storage device 22 by the coil 54a during initial power up of the data storage device 22. Third, it generates data gating window signals properly synchronized and timed with the data storage device 22 for deriving data reflected to the data link device 20 by the data storage device 22.

Figure 11:
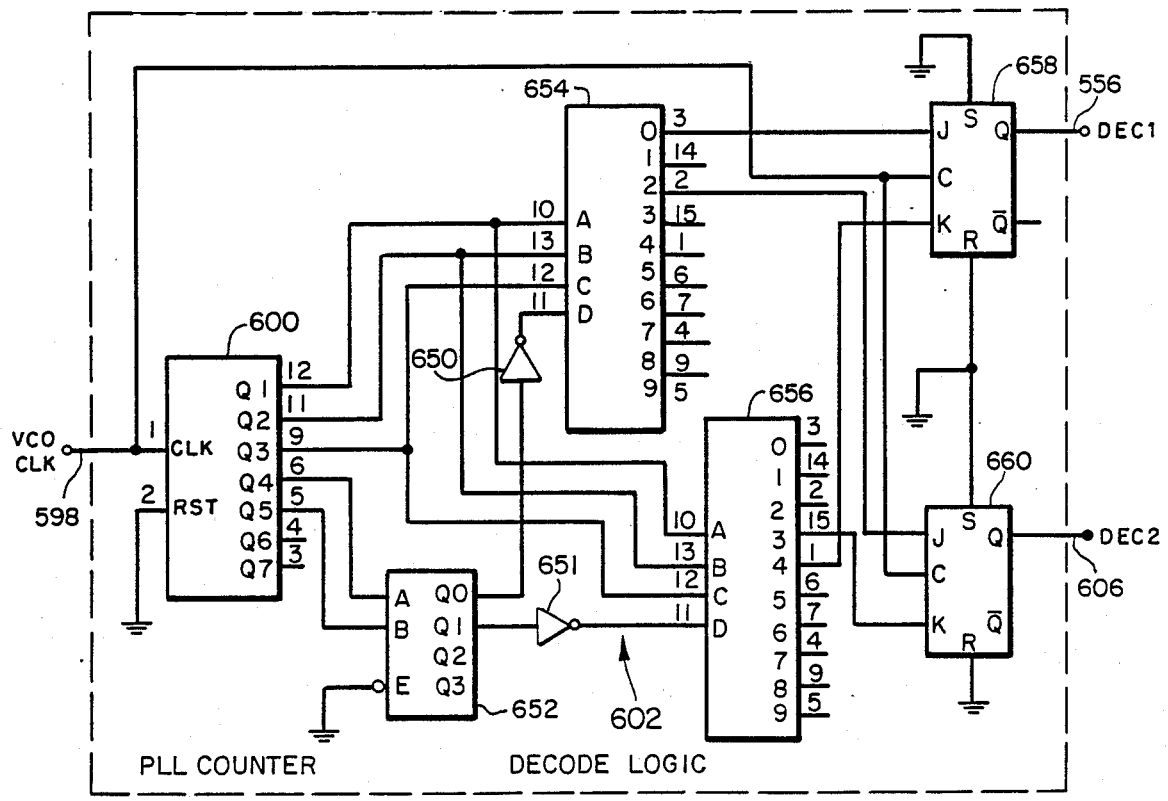
FIG. 11 is a detailed electrical schematic diagram of the PLL counter and decode logic circuits shown in FIG. 10.

FIG. 11 illustrates the details of the PLL counter 600 and the decode logic 602 depicted in FIG. 10. The PLL counter 600 in a presently preferred embodiment is suitably a conventional 4024 counter. The decode logic 602 comprises 1 of 4 decoder 652, two 1 of 10 decoders 654 and 656, and J-K flip-flops 658 and 660. The 1 of 4 decoder 652 is suitably a 4555 decoder, and the two 1 of 10 decoders 654 and 656 are suitably 4028 decoders. The J-K flip-flops 656 and 660 are 4027 flip-flops. The clock input (CLK) of the PLL counter 600 is connected to the VCO_CLK signal on line 598. The reset input (RST) is grounded. The PLL counter 600 has 7-bit parallel output Q1–Q7. Outputs Q1, Q2 and Q3 provide VCO_CLK divided by two, four and eight, respectively, and are connected to inputs A, B and C respectively of 1 of 10 decoders 654 and 656. Outputs Q4 and Q5, which provide VCO_CLK divided by sixteen and thirty-two respectively, are connected to inputs A and B respectively of the 1 of 4 decoder 652. Output Q6 and Q7 are not used. The /ENABLE input (E) of the 1 of 4 decoder is connected to ground. The 1 of 4 decoder 652 has a 4-bit parallel output Q0-Q3. Output Q0 is connected to input D of 1 of 10 decoder 654 through an inverter 650. Output Q1 is connected to input D of 1 of 10 656 through an inverter 651. The 1 of 10 654 has a 10-bit parallel output 0-9. Output 0 is connected to the J input of the J-K flip-flop 658. Output 2 is connected to the J input of the J-K flip-flop 660. The remaining outputs are not used. Output 3 of the identical 1 of 10 decoder 656 is connected to the K input of the J-K flip-flop 660. Output 4 is connected to the K input of the J-K flip-flop 658. The remaining outputs are not used. The clock inputs (C) of the J-K flip-flops 658 and 660 are connected to the VCO_CLK signal on line 598. The set (S) and reset (R) inputs of the J-K flip-flops 658, 660 are grounded. The uninverted output (Q) of the J-K flip-flop 658 is the DEC1 clock gating signal on line 556. The uninverted output (Q) of the J-K flip-flop 660 is the DEC2 signal on line 606.

In operation, the PLL counter 600 updates its count value Q1-Q5 on each negative going edge of a VCO_CLK pulse. Each positive going edge of a VCO_CLK pulse clocks the J-K flip-flops 658 and 660. The 1 of 4 decoder 652 prevents the 1 of 10 decoder 656 from changing the state of outputs 0-7 until the PLL counter 600 output count reaches a value of eight and PLL counter 600 output Q4 goes high, by holding the D input of the 1 of 10 656 high. As the PLL counter 600 counts to eight, the 1 of 10 654 sets J-K flip-flop 658 on the first count so that the DEC1 signal goes high. On the third count, the 1 of 10 decoder 654 sets the J-K flip-flop 660 so that the DEC2 signal goes high. Both DEC1 and DEC2 remain high as the PLL counter 600 continues to count VCO_CLK pulses. When the count value reaches eight and the Q4 output of the PLL counter 600 goes high, the 1 of 4 decoder 652 enables the 1 of 10 656 to change the values of outputs 0-7 by releasing the D input thereof, and prevents the 1 of 10 654 from changing the states of outputs 0-7 by holding the D input thereof high. On the twelfth count, the 1 of 10 656 resets the J-K flip-flop 660 causing the DEC2 signal to go low. On the thirteenth count, the 1 of 10 656 resets the J-K flip-flop 658 causing the DEC1 signal to go low. Both the DEC1 and DEC2 signals thereafter remain low as the PLL counter 600 counts to 31. When the PLL counter 600 output count Q1-Q5 rolls over to zero, the cycle repeats.

It should be apparent from the foregoing that the DEC1 clock gating signal is somewhat wider than the DEC2 signal as previously described. Also, it should be apparent that the DEC2 signal is high for a total of 9 counts out of 32, giving it a duty cycle very nearly equal to the 2/7 duty cycle of the clock component of the INPUT_DATA signal, as previously mentioned. Those skilled in the art will recognize that these 1 of 10 decoders are used as 1 of 8 decoders with their D inputs functioning as /ENABLE inputs.

Figure 12:
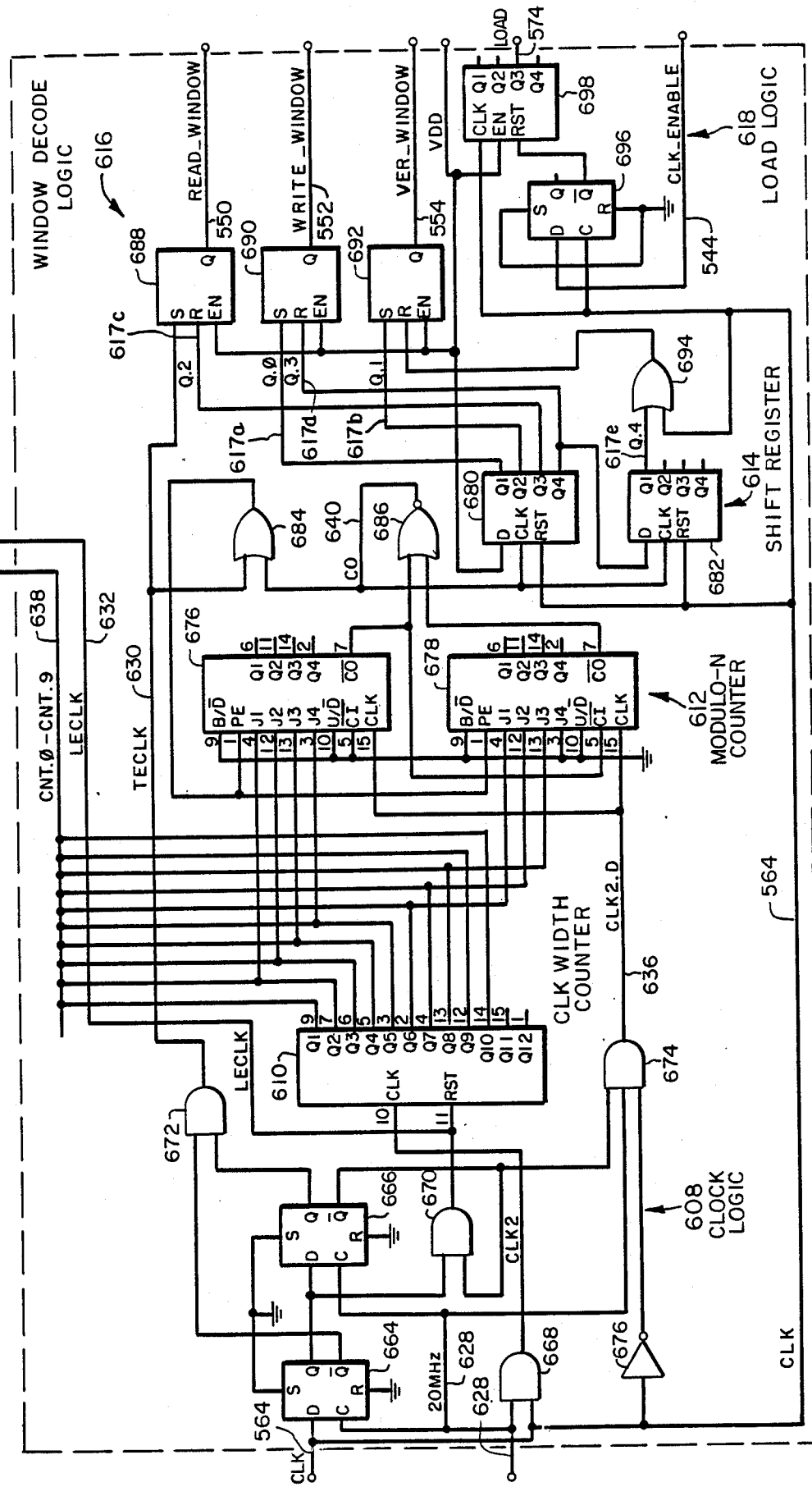
FIG. 12 is a detailed electrical schematic diagram of the clock logic, CLK width counter, modulo-n counter, shift register, window decode logic, and load logic circuits shown in FIG. 10.

FIG. 12 illustrates the details of the clock logic 608, the CLK width counter 610, the modulo-n counter 612, the shift register 614, the window decode logic 616, and the load logic 618, which are generally illustrated in FIG. 10. With reference to FIG. 12, the clock logic 608 comprises D-latches 664 and 666, AND gates 668, 670, 672 and 674, and inverter 676. The CLK signal on line 564 is connected to the data input (D) of D-latch 664 and to one input of AND gate 668. It is also connected to an input of AND gate 674 through an inverter 676. A 20 MHz clock signal output by the oscillator 626 on line 628 is connected to the clock input (C) of D-latches 664 and 666, and to inputs of AND gates 668 and 674. The set (S) and reset (R) inputs of the D-latches 664, 666 are grounded. The uninverted output (Q) of the D-latch 664 is connected to the data input (D) of the D-latch 666 and to an input of the AND gate 670. The inverted output (/Q) of the D-latch 664 is connected to one input of the AND gate 672. The uninverted output (Q) of the D-latch 666 is connected to the other input of the AND gate 672. The inverted output (/Q) of D-latch 666 is connected to an input of the AND gate 670 and to an input of the AND gate 674. The output of AND gate 672 is the TECLK signal on line 630. The output of the AND gate 670 is the LECLK signal on line 632 and is connected to the reset input (RST) of the CLK width counter 610. The output of the AND gate 668 is the CLK2 signal which is connected to the clock input (CLK) of the CLK width counter 610. The output of the AND gate 674 is the CLK2.D signal on line 636.

The CLK width counter 610 preferably comprises a standard 4040 12-bit counter having its clock input (CLK) connected to the output of the AND gate 668 and its reset input (RST) connected to the output of the AND gate 670. The CLK width counter 610 produces a 12-bit parallel output Q1-Q12. Outputs Q1-Q10 comprise the CNT.0-CNT.9 count signals on lines 638. Outputs Q2-Q5 (CNT.1-CNT.4) are connected to inputs J1-J4 of a conventional 4-bit modulo-n up/down counter 676. Outputs Q6-Q8 (CNT.5-CNT.7) are similarly connected to inputs J1-J3 of a conventional 4-bit modulo-n up/down counter 678.

Modulo-n counters 676 and 678 are preferably 4029 counters and together with OR gate 684 and NOR gate 686 comprise modulo-n counter 612. The two modulo-n counters 676 and 678 are linked together to form a single 8-bit modulo-n counter by connecting the carry-out output (CO) of the counter 676 to the carry-in input (CI) of the counter 678. In this way, the second counter 678 does not count down until the first counter 676 has completed its count down sequence. The up/down select inputs (U/D) of the modulo-n counters 676 and 678 are grounded so that the modulo-n counters 676 and 678 are enabled as down-counters. The carry-out outputs (CO) of both counters 676 and 678 are connected to inputs of a NOR gate 686. The output of the NOR gate 686 comprises the CO signal on line 640 and is connected to an input of an OR gate 684 and to the clock inputs (CLK) of two shift registers 680 and 682. The other input of the OR gate 684 is connected to the TECLK signal on line 630. The output of the OR gate 684 is connected to the modulus load inputs (PE) of both counters 676 and 678. The occurrence of a positive pulse on the modulus load inputs (PE) of the counters 676 and 678 causes the current CNT.1-CNT.7 values to be loaded into the J1-J4 inputs of the counter 676 and into the J1-J3 inputs of the counter 678 as the new modulus value. It is necessary to reload the modulus value each time the counters 676 and 678 count down to zero before the modulo-n counter 612 can begin a new down-count sequence.

Shift register 614 comprises a pair of conventional 4-bit shift registers 680 and 682 linked together to form an 8-bit shift register, of which 5 bits are used in a presently preferred embodiment. Conventional 4015A shift registers have been found suitable for use. Each of the shift registers 680 and 682 has outputs Q1–Q4. The shift registers 680 and 682 are linked together by connecting the Q4 output of the shift register 680 to the data input (D) of the shift register 682. The data input (D) of the shift register 680 is connected to a positive logic voltage VDD. The reset inputs (RST) of the shift registers 680 and 682 are connected to the CLK signal on line 564. The clock inputs (CLK) of the shift registers 680 and 682 are connected to the CO signal on line 640. As the shift registers 680 and 682 are clocked, the high value on the data input (D) of shift register 680 is shifted through to the outputs Q1–Q4 of the shift register 680 and Q1 of the shift register 682. The Q1–Q4 outputs of the shift register 680 comprise signals Q.0–Q.3 on lines 617a–d respectively. The Q1 output of the shift register 682 comprises signal Q.4 on line 617e. The remaining outputs of the shift register 682 are not used.

The window decode logic 616 comprises R-S latches 688, 690 and 692, and OR gate 694. The R-S latches are suitably conventional 4043A latches. The enable inputs (EN) of R-S latches 688, 690 and 692 are connected to a positive logic voltage VDD. The set input (S) of R-S latch 688 is connected to the TECLK signal on line 630. The reset input (R) is connected to the Q.2 signal on line 617c. The set input (S) of R-S latch 690 is connected to the Q.0 signal on line 617a. The reset input (R) is connected to the Q.3 signal on line 617d. The set input (S) of R-S latch 692 is connected to the Q.1 signal on line 617b. The reset input (R) is connected to the output of the OR gate 694 which has one input connected to signal Q.4 on line 617e, and the other to the CLK signal on line 564. The outputs (Q) of R-S latches 688, 690 and 692 comprise the READ_WINDOW, WRITE_WINDOW, and VER_WINDOW data gating signals on lines 550, 552 and 554, respectively.

The load logic 618 comprises a D-latch 696 and a conventional 4-bit counter 698. The D-latch 696 is suitably a 4013 latch and the 4-bit counter 698 is suitably a 4520B counter. The data input (D) of the D-latch 696 is connected to the CLK_ENABLE signal on line 544. The clock input (C) of D-latch 696 is connected to the CLK signal on line 564. The set (S) and reset (R) inputs of the D-latch 696 are grounded. The inverted output (/Q) of D-latch 696 is connected to the reset input (RST) of counter 698. The enable input (EN) of counter 698 is connected to a positive logical voltage VDD. The Q3 output of counter 698 comprises the LOAD signal on line 574. The remaining outputs are not used.

In operation, the AND gate 668 outputs a 20 MHz clock signal CLK2 for as long as the CLK signal stays high. The CLK2 signal causes the CLK width counter 610 to count at a 20 MHz rate. The CLK width counter 610 outputs the current count value as a 10-bit digital value CNT.0–CNT.9 on lines 638. As soon as the CLK signal goes low, the CLK2 signal also goes low, and the CLK width counter 610 ceases counting. At this time, the 10-bit count value CNT.0–CNT.9 indicates the width of the CLK signal. Also, when the CLK signal goes low, the inverted output (/Q) of the D-latch 664 goes high on the next 20 MHz clock cycle. The uninverted output (Q) of the D-latch 666 remains high for an additional 20 MHz clock cycle, thus causing the output of the AND gate 672 to go high for one 20 MHz clock cycle and generating a TECLK pulse being one 20 MHz clock cycle in length. The CLK width counter 610 does not resume counting until the CLK signal again goes high. When the CLK signal goes high, the uninverted output (Q) of the D-latch 664 goes high on the next 20 MHz clock cycle. The inverted output (/Q) of the D-latch 666 remains high for an additional 20 MHz clock cycle, and during this time the output of the AND gate 670 goes high, generating a TECLK pulse and resetting the CLK width counter 610. As previously described, the CLK2 signal then causes the CLK width counter 610 to count at a 20 MHz rate.

Referring again to the point in time when the CLK signal goes low, the positive TECLK pulse on line 630 causes the output of the OR gate 684 to go high, thus loading the CLK width counter 610 outputs CNT.1–CNT.7 into the J1–J4 inputs of the modulo-n counter 676 and into the J1–J3 inputs of the modulo-n counter 678 as the new modulus value. It should be noted that the value loaded into the modulo-n counters 676 and 678 is in actuality one half the value actually counted by the CLK width counter 610. At the same time as the CLK signal goes low, the output of the inverter 676 goes high. The inverted output (/Q) of D-latch 666 goes high on the second 20 MHz clock cycle thereafter. Thus, after a two clock cycle delay to give the CNT.1–CNT.7 value on lines 638 time to be loaded into the modulo-n counters 676 and 678, the CLK2.D signal on line 636 starts clocking the modulo-n counters 676 and 678 at a 20 MHz rate. The modulo-n counter 676 disables the modulo-n counter 678 from counting down until it completes its own count-down sequence by holding the carry-out output (/CO) high. After the modulo-n counter 676 completes each count-down sequence, the carry-out output (/CO) goes low, enabling the modulo-n counter 678, which then counts down once. When the modulo-n counter 678 completes its countdown sequence, the carry-out outputs of both modulo-n counters 676 and 678 are low. This causes the output of the NOR gate 686 to go high and reloads the CNT.1–CNT.7 data on lines 638 into the modulo-n counters 676 and 678. The modulo-n count-down sequence will repeat approximately five times, until CLK again goes high. The count-down sequence described above then repeats starting on the next CLK2.D clock cycle.

The time required for both modulo-n counters 676 and 678 to complete a count-down sequence is equal to one half the number of 20 MHz clock cycles which occurred during the time the CLK signal was high, which, of course, corresponds to the count value CNT.0–CNT.9. In a presently preferred embodiment of the present invention, it is necessary that the modulo-n counters 676 and 678 be capable of completing approximately five count-down sequences before the next occurrence of a CLK signal to properly generate the data gating signals READ_WINDOW, WRITE_WINDOW, and VER_WINDOW.

Initially, immediately after the CLK signal goes low, the TECLK pulse sets the R-S latch 688, causing the READ_WINDOW signal on line 550 to go high. Thereafter, each occurrence of a CO pulse out of the NOR gate 686 clocks a high value one bit further through the shift registers 680 and 682. On the first CO pulse, the Q.0 signal on line 617a goes high setting the R-S latch 690 and causing the WRITE_WINDOW signal on line 552 to go high. The second CO pulse causes the Q.1 signal on line 617b to go high, setting the R-S latch 692 and causing the VER_DATA signal on line 554 to go high. The third CO pulse causes the Q.2 signal on line 617c to go high resetting the R-S latch 688 and causing the READ_WINDOW signal to go low.

The fourth CO pulse causes the Q.3 signal on line 617d to go high, resetting the R-S latch 690 and causing the WRITE_WINDOW signal to go low. The fifth CO pulse causes the Q.4 signal on line 617e to go high, which in turn causes the output of the OR gate 694 to go high, resetting the R-S latch 692 and causing the VER_DATA window to go low. If the next rising edge of the CLK signal should occur prior to the Q.4 signal going high, the positive CLK signal will reset the R-S latch 692 through the OR gate 694. The rising edge of the next CLK signal also resets the shift registers 680 and 682.

The rising edge of each CLK signal also clocks the counter 698. On each eighth count, the Q3 output thereof goes high generating the LOAD signal for use by the data interface logic 520. The D-latch 696 is also clocked by the rising edge of the CLK signal. The D-latch provides a one clock cycle delay before resetting or re-enabling the counter 698 in response to a change in the state of the CLK_ENABLE signal from the microprocessor 500. This delay corresponds to the one clock cycle delay required by the D-latch 220 in the data storage device 22 illustrated in FIG. 7b to change the state of the RESET signal when the state of the CLK_ENABLE signal in the data link device 20 changes. For example, when the CLK_ENABLE signal goes low, the COMB_SIGNAL transmitted by the coil 54a to the data storage device 22 consists only of the 49 MHz carrier. This is, in effect, a reset command to the data storage device 22 and after one clock is missed, the D-latch 220 sets the RESET signal high. The D-latch 220 does not reset the RESET signal low until after the CLK_ENABLE signal goes high again and the next clock signal is transmitted to the data storage device 22 and detected by the D-latch 220. Similarly in the data link device 20, the D-latch 696 ensures that when the CLK_ENABLE signal goes low to generate a reset in the data storage device 22, the counter 698, like the components in the data storage device 22 is not reset until after a one CLK cycle delay.

Figure 13:
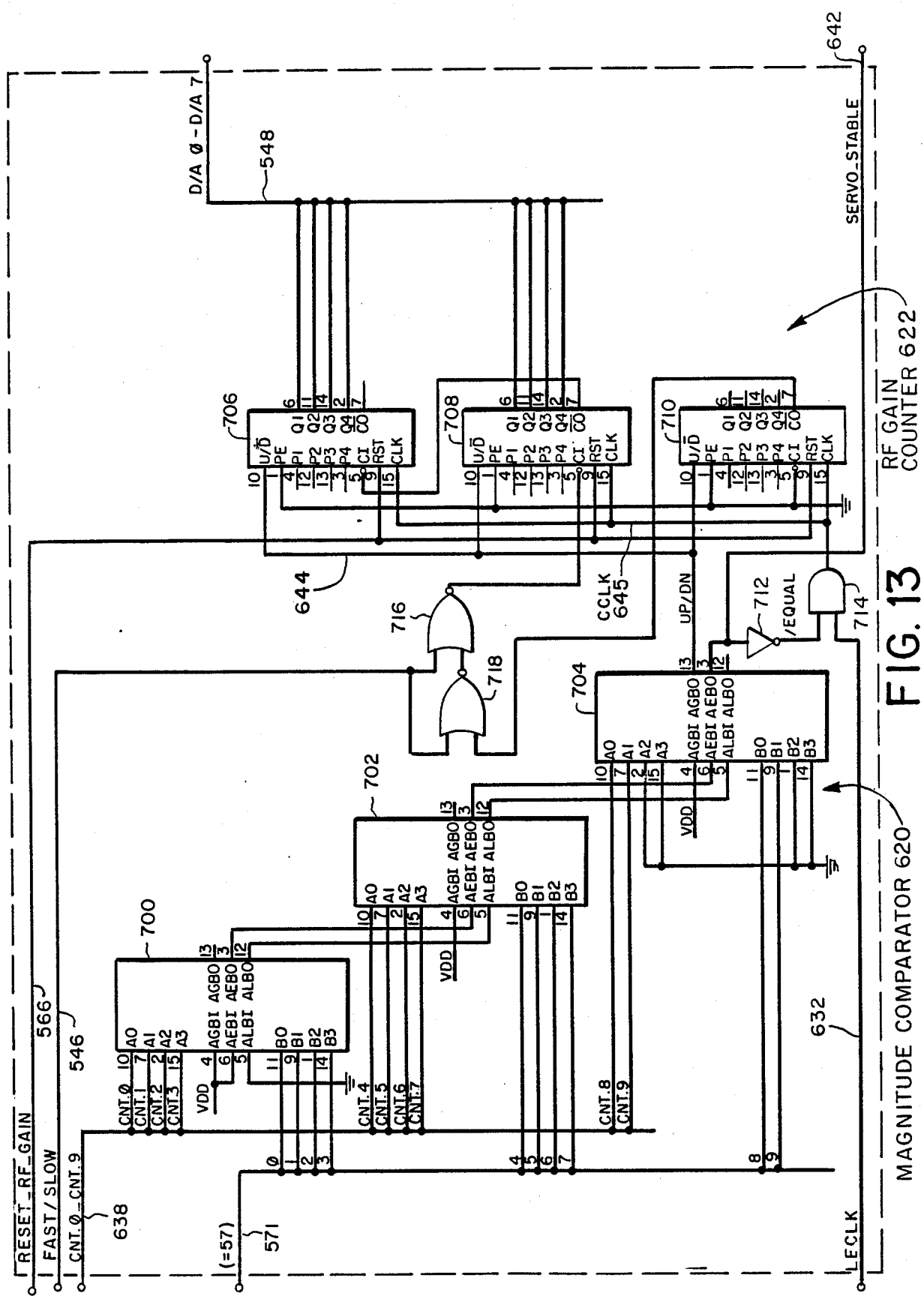
FIG. 13 is a detailed electrical schematic diagram of the magnitude comparator and RF gain counter circuits shown in FIG. 10.

FIG. 13 illustrates the details of the magnitude comparator 620 and the RF gain counter 622 which are illustrated generally in FIG. 10. The magnitude comparator 620 suitably comprises three conventional 4585B digital comparators 700, 702 and 704 linked together to form a 10-bit comparator, and an AND gate 714. Each comparator 700, 702, and 704 has a first 4-bit parallel input A0-A3 and a second 4-bit parallel input B0-B3. The comparators 700, 702, and 704 are linked together by connecting the AEBO and ALBO outputs of magnitude comparator 700 to the AEBI and ALBI inputs respectively of magnitude comparator 702, and the AEBO and ALBO outputs of magnitude comparator 702 to the AEBI and ALBI inputs respectively of the magnitude comparator 704. The A0-A3 inputs of magnitude comparator 700 are connected to the CNT.0-CNT.3 outputs of the CLK width counter 610, the A0-A3 inputs of the magnitude comparator 702 to the CNT.4-CNT.7 outputs, and the A0-A1 inputs of magnitude comparator 706 to the CNT.8-CNT.9 outputs. The B0-B3 inputs of magnitude comparator 700 are set to bits 0-3 of the value "57", the B0-B3 inputs of the magnitude comparator 702 to bits 4-7, and inputs B0-B1 of the magnitude comparator 704 to bits 8-9. The AGBI and AEBI inputs of magnitude comparator 700, and the AGBI inputs of magnitude comparators 702 and 704 are connected to a positive logical voltage VDD. The ALBI input of the magnitude comparator 700 and the unused A2-A3 and B2-B3 inputs of magnitude comparator 704 are grounded. The AGBO output of magnitude comparator 704 comprises an UP/DN signal on line 644 which is connected to the up/down inputs (U/D) of three counters 706, 708, and 710. The AEBO output of the magnitude comparator 704 comprises the SERVO_STABLE control signal on line 642, and is connected to an input of an inverter 712. The output of the inverter 712 comprises the /EQUAL signal and is connected to an input of AND gate 714. The other input of the AND gate 714 is connected to the TECLK signal on line 632. The output of the AND gate 714 comprises the CCLK signal on line 645 and is connected to the clock inputs (CLK) of the three counters 706, 708, and 710.

The RF gain counter 622 comprises three 4-bit digital counters 706, 708 and 710, and NOR gates 716 and 718. Each of the counters 706, 708, and 710 is suitably a conventional 4516 four-bit digital counter. Each of the counters 706, 708 and 710 has an up/down input (U/D) connected to the UP/DN signal on line 644, which is the AGBO output of magnitude comparator 704. In addition, each of the counters 706, 708 and 710 has a PE input connected to ground, and a reset input (RST) connected to the RESET_RF_GAIN signal on line 566. Further, each of the counters 706, 708 and 710 has a clock input (CLK) connected to the output of AND gate 714. The first counter 706 has a carry-in input (/CI) which is connected to a carry-out output (/CO) of the second counter 708. The second counter 708 has a carry-in input (/CI) connected to the output of a NOR gate 716. The NOR gate 716 has inputs connected to the FAST/SLOW control signal on line 546 and to the output of a NOR gate 718. The inputs of the NOR gate 718 are connected to the FAST/SLOW control signal on line 546 and to the carry-out output (/CO) of the third counter 710. The first counter 706 produces outputs Q1-Q4 on lines 548 corresponding to signals D/A4-D/A7, respectively. The second counter 708 produces outputs Q1-Q4 on lines 548 corresponding to signals D/A0-D/A3.

In operation, the cascaded magnitude comparators 700, 702, and 704 compare the CLK width counter 610 outputs CNT.0-CNT.9 with the digital bits 0-9 corresponding to the value "57". If the CNT.0-CNT.9 value is greater than or equal to "57", the AGBO output of magnitude comparator 704 is high. If CNT.0-CNT.9 is less than or equal to "57", the AGBO output is low. If CNT.0-CNT.9 equals "57", the AEBO output of the magnitude comparator 704 is high. Otherwise, the AEBO output is low. A high AGBO value indicates that the oscillator/clock generator 140 in the data storage device 22 is running at a slower frequency than the 100 KHz nominal frequency, and causes the counters 706, 708, and 710 (slow mode only) to count up by one on the next occurrence of a LECLK pulse on line 632. A low AGBO output indicates that the oscillator/clock generator 140 is running at a frequency in excess of or equal to the nominal 100 KHz frequency, and causes the counters 706, 708, and 710 (slow mode only) to count down by one on the next occurrence of a LECLK pulse. A high AEBO output indicates that the oscillator/clock generator 140 is running at exactly the 100 KHz nominal frequency. When the AEBO output is high, the inverter 712 causes the output of the AND gate 714 to remain low and the counters 706, 708, and 710 are not clocked since no adjustment in the amplitude of the COMB_SIGNAL is required.

The RF gain counter 622 is capable of running in a fast mode, and in a slow mode. In addition, the RF gain counter 622 output D/A0-D/A7 can be reset to zero upon the application of a high RESET_RF_GAIN control signal from the microprocessor 500. In fast mode, the FAST/SLOW signal from the microprocessor 500 on line 546 is high. This in turn causes the output of the NOR gate 716 connected to the carry-in input (/CI) of the second counter 708 to be low, enabling the counter 708 to increment its outputs D/A0-D/A3 on each LECLK pulse. In slow mode, the FAST/SLOW signal from the microprocessor 500 is low. As a result, the output of the NOR gate 716 depends upon the state of the carry-out output (/CO) of the third counter 710. Assuming that the UP/DN line is high, the carry-out output (/CO) of this counter remains high as the counter 710 counts up to a value of fourteen. On the next count, the counter output goes to fifteen and the carry-out output (/CO) goes low. This causes the output of the NOR gate 718 to go high and the output of the NOR gate 716 to go low, thus enabling the counter 708 to increment the outputs D/A4-D/A7 on the next LECLK pulse. On the next LECLK pulse, the carry-out output (/CO) of the third counter 710 again goes high, disabling the second counter 708 from counting until this third counter 710 again rolls over. Thus, it is apparent that in slow mode, the D/A0-D/A7 outputs on lines 548 change at a rate sixteen times slower than in fast mode.

Figure 14:
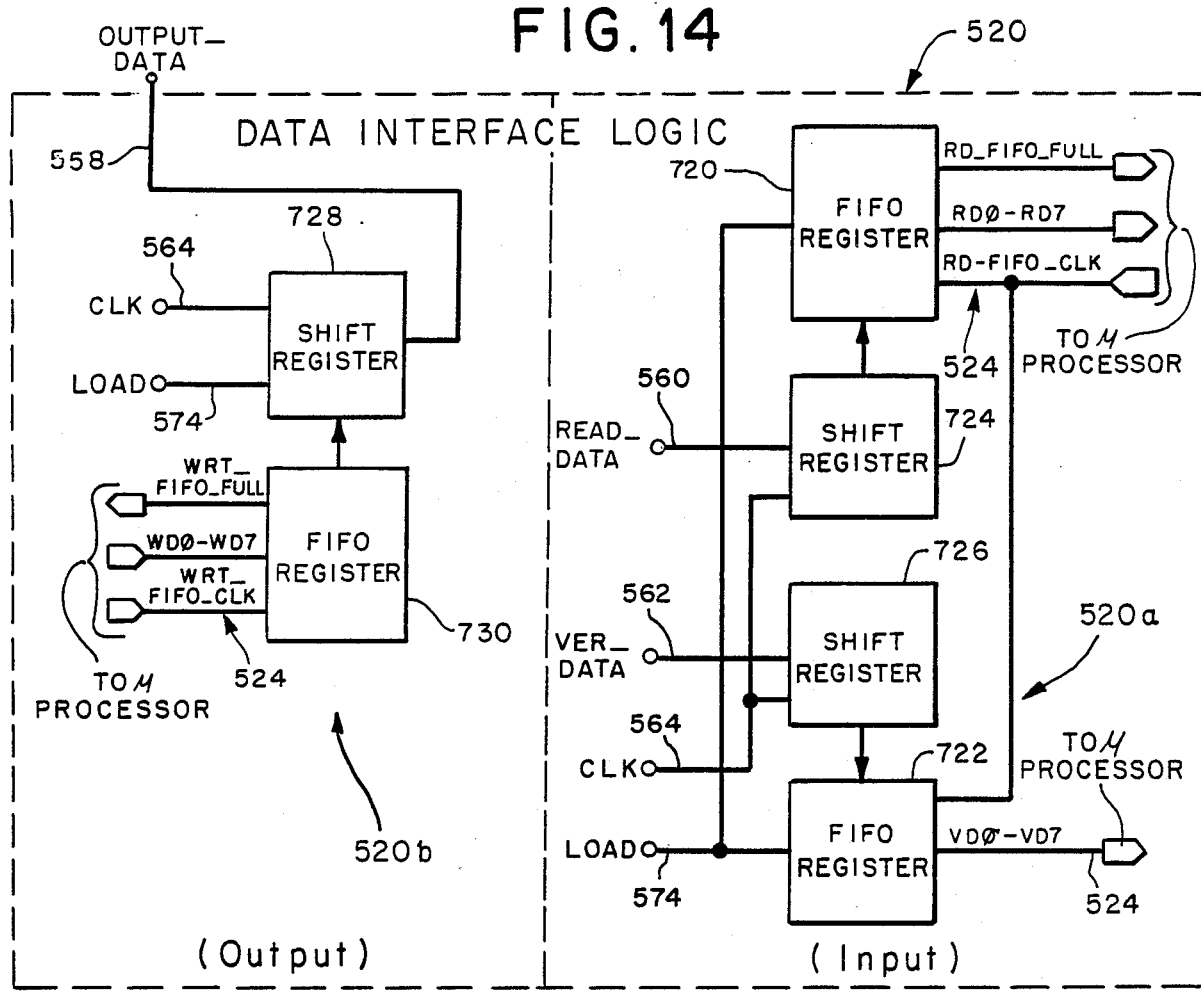
FIG. 14 is a functional block diagram showing the components of the data interface logic of the data link device shown in FIG. 8.

FIG. 14 illustrates the details of the data interface logic 520 illustrated in FIG. 8. The data interface logic 520 comprises an input portion 520a and an output portion 520b. Input portion 520a comprises first and second FIFO registers 720 and 722, and corresponding first and second shift registers 724 and 726. In a presently preferred embodiment, shift registers 724 and 726 are conventional 8-bit serial-in-parallel-out shift registers. The first shift register 724 has a bit-serial data input connected to the READ_DATA signal on line 560, and an 8-bit parallel output connected to the data input of the first FIFO register 720. The FIFO register 720 outputs a control signal RD_FIFO_FULL, and 8-bit parallel data RD0-RD7 which are connected to the microprocessor 500 through a conventional buss 524. The FIFO 720 inputs a RD_FIFO_CLK control signal from the microprocessor 500 on buss 524. Second shift register 726 has a bit-serial data input connected to the VER_DATA data signal on line 562, and an 8-bit parallel data output connected to the data input of the second FIFO register 722. The second FIFO register 722 outputs 8-bit parallel data signals VD0-VD7 which are connected to the microprocessor 500 through the buss 524. The CLK signal on line 564 supplies the clock input of both shift registers 724 and 726. The LOAD signal on line 574 is connected as a control input to both FIFO registers 720 and 722.

The output portion 520b of the data interface logic 520 comprises a shift register 728 and a FIFO register 730. The shift register 728 is preferably a conventional 8-bit parallel-in-serial out shift register. The shift register 728 has an 8-bit parallel data input connected to an output of the FIFO register 730, and a bit-serial data output comprising the OUTPUT_DATA signal on line 558. The shift register 728 further has a clock input connected to the CLK signal on line 564 and a load input connected to the LOAD signal on line 574. The FIFO register 730 has an 8-bit parallel data input WD0-WD7 and a clock input WRT_FIFO_CLK, both connected to the microprocessor 500 through buss 524. The FIFO 730 also produces an output control signal WRT_FIFO_FULL, which is also connected to the microprocessor 500 through the buss 524.

In operation, the CLK signal clocks bit-serial data into the shift registers 724 and 726 in the input portion 520a of the data interface logic 520. The shift registers 724 and 726 internally form 8-bit data words from the bit-serial input data. Every eighth CLK signal, the LOAD signal goes high, loading an 8-bit data word from shift registers 724 and 726 into the FIFOs 720 and 722. The microprocessor 500 communicates with the FIFO 720 via the buss 524. It determines if the FIFO 720 is full from the RD_FIFO_FULL control signal, and if so reads an 8-bit data word RD0-RD7 from the FIFO 720 and an 8-bit data word VD0-VD7 from the FIFO 722. It then outputs a RD_FIFO_CLK signal to FIFOs 720 and 722 to indicate it has received the data.

As previously described, when the data storage device 22 is in read mode, data should only appear in the FIFO 720. When it is in verify mode following write mode, data should only appear in the FIFO 722. By examining the contents of both FIFO's 720 and 722, the microprocessor 500 can determine not only what mode the data storage device 22 is in, but also whether a transmission error has occurred which has caused data bits reflected from the data storage device 22 to be phase or time shifted. In the latter case, the microprocessor 500 can take appropriate corrective action or initiate a re-transmission.

In the output portion 520b of the data interface logic 520, the microprocessor 500 communicates with the FIFO 730 to determine whether, similarly to the foregoing description, it is ready to accept an 8-bit data word. If the FIFO register 730 indicates it is ready to receive a data word via a low WRT_FIFO_FULL control signal, the microprocessor 500 loads a data word WD0-WD7 onto the FIFO 730 inputs, and outputs a WRT_FIFO_CLK signal to cause the data to be loaded into the FIFO 730. The FIFO 730 in turn outputs 8-bit data words into the shift register 728 when a LOAD signal occurs, and the shift register 728 clocks the data words out bit by bit as the OUTPUT_DATA signal on line 558 on each cycle of the CLK signal.

Figure 15:
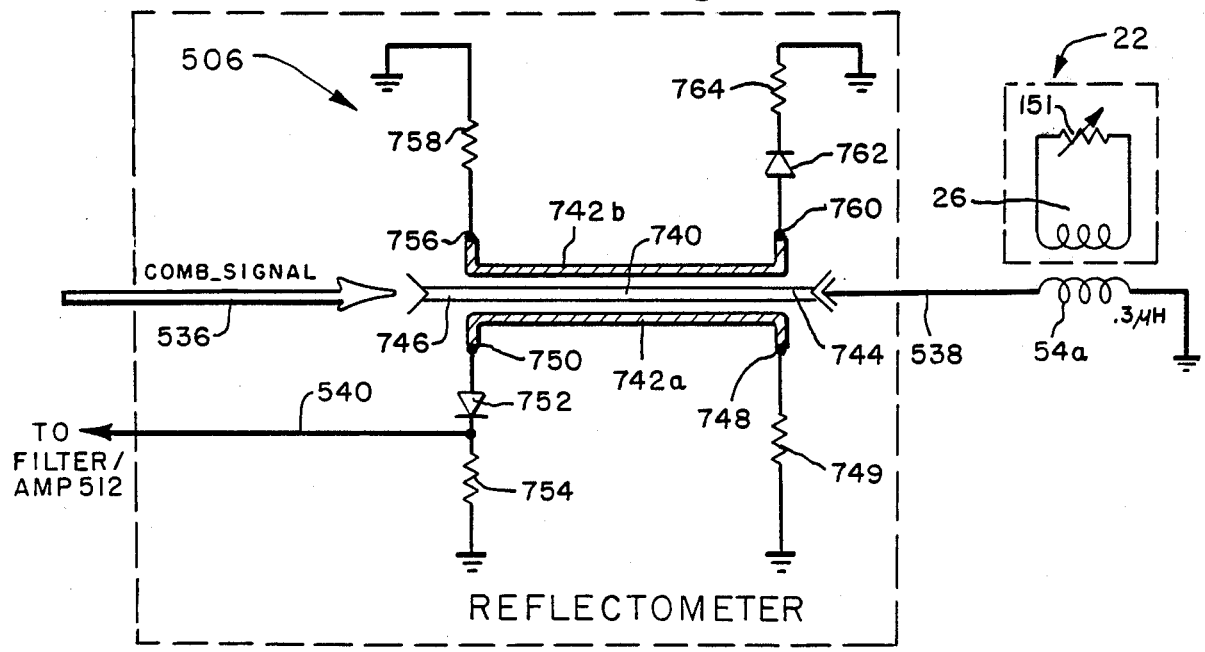
FIG. 15 is a detailed schematic diagram of the reflectometer element of the data link device shown in FIG. 8.

FIG. 15 illustrates the details of the reflectometer 506 illustrated in FIG. 8. The reflectometer 506 described herein is a conventional device well-known to those skilled in the art and does not itself constitute the present invention. The reflectometer 506 comprises an RF conductor 740 spaced between twin copper transmission lines 724a and 724b so that a characteristic known impedance is obtained. One end 744 of the RF conductor 740 is connected to an end of the coil 54a by line 538, and the other end 746 receives the COMB_SIGNAL from the variable gain amplifier 508 on line 536. One end 748 of the parallel copper transmission line 742a is connected to ground through a resistor 749, and the other end 750 is connected to ground through a diode 752 and resistor 754. The signal across resistor 754 is connected to an input of the filter/amplifier 512 by line 540. Likewise, one end 756 of the parallel copper transmission line 742b is connected to ground through a resistor 758, and the other end 760 is connected to ground through a diode 762 and a resistor 764. The amplitude of the signal connected to the filter/amplifier 512 at the end 750 of the copper transmission line 742a gives an indication of the relative amplitude of the "impedance-modulated" combination signal reflected from the data storage device 22. The amplitude variations of this reflected signal represents the data and clock information from the data storage device 22, as previously described.

Figure 16:
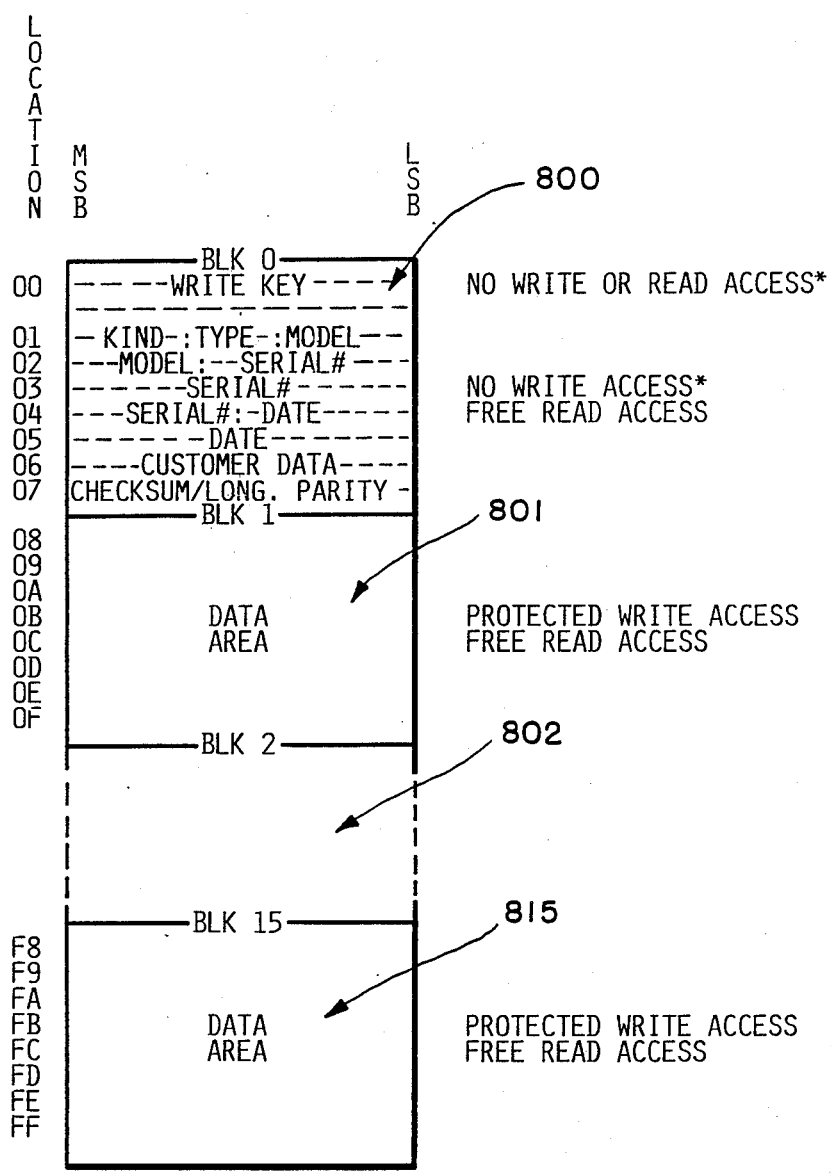
FIG. 16 is a memory map illustrating the logical division of the data storage locations in the data storage device shown in FIG. 6.

FIG. 16 illustrates a logical memory layout of the RAM 115, or alternatively the EEPROM. The memory locations are logically divided into eight blocks 800-815, each block consisting of eight eight-bit words for a total of 64 bits per block. Blocks 1 through 15 801-815 are designated as free storage that can be used to store any desired data for a variety of purposes. The data in each of the blocks 1-15 801-815 may be freely read by the data link device 20. However, the data in each of the blocks 1 through 15 801-815 is protected against being overwritten by data received from the data link device 20 until the write mode control code has first been received. Block 0, identified herein as 800, and consisting of the first 8 words of storage, is treated somewhat differently than blocks 1 through 15, 801-815. Similarly to blocks 1 through 15, the data in words 1 through 7 of block 0 may be freely read by the data link device 20. It is envisioned that blocks 1 through 7 will contain information stored at the time a data storage device 22 is manufactured, such as the kind and type of data device, its model and serial number, the date of manufacture, and particular customer data. In addition, it is preferred that word 7 contain a check sum or a longitudinal parity value for words 1-6. It is likewise preferred that the last word of each block, 801-815, contain a similar check sum or longitudinal parity value for words 0-6 of the block. Unlike blocks 1 through 15, 801-815, however, the data in words 1 through 7 of block 0 800 cannot be written into in write mode. Instead, words 1 through 7 may be written into only when the data storage device 22 has received the proper mode control code to place the data storage device 22 in initialization mode. In addition, neither read nor write access is normally allowed to word 0 of block 0 800, which contains a write key for each data storage device 22. The write key may only be read and may only be written into when the data storage device 22 is in initialization mode.

Figure 17:
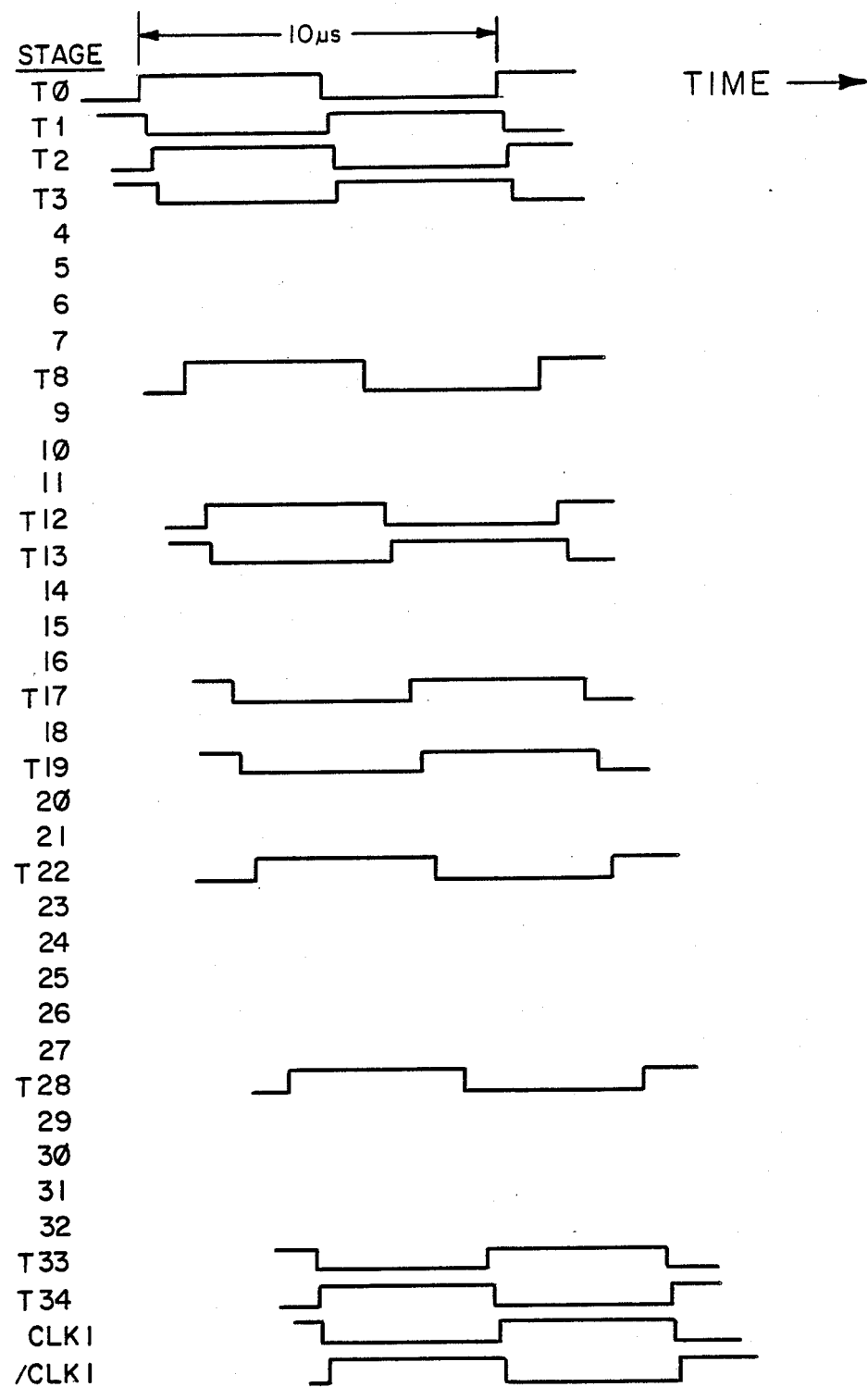
FIG. 17 is a timing diagram showing the relative timing of the signals generated by the oscillator/clock generator component of the data storage device shown in FIG. 7(g), the signals being illustrated with respect to time.

FIG. 17 illustrates the relative timing of the clock signals T0-T34, CLK1 and /CLK1 generated by the oscillator/clock generator 140 illustrated in FIG. 7(f). As illustrated, in a presently preferred embodiment, the oscillator/clock generator 140 operates at a nominal 100 KHz frequency. This results in the above-identified signals having a 10 microsecond period. At the nominal 100 KHz frequency, the total delay between the leading edges of the T0 signal and the T34 signal is 5 microseconds. Of course, as is apparent by now, the frequency of the oscillator/clock generator 140, and hence the total propagation delay and period of the signals is dependent upon the control of the COMB_SIGNAL amplitude by the data link device 20.

FIG. 18 illustrates the relative timing of various signals in the data link device 20 and data storage device 22, as well as the modulated carrier signal which the two devices "share". As illustrated, the microprocessor 500 in the data link device 20 outputs a high OSC_ON control signal to begin generating the 49 MHz carrier.

The microprocessor 500 initially generates a high RESET_RF_GAIN signal to reset the RF gain counter 622 and start the magnitude of the output signal at a low level. The microprocessor 500 then removes the RESET_RF_GAIN signal and generates a high FAST/SLOW signal to cause the amplitude of the 49 MHz carrier to ramp up quickly. As the amplitude of the carrier increases, the logic supply voltage LOGICVCC in the data storage device 22 also increases, which causes the oscillator/clock generator 140 to generate clock signals CLK3. The amplitude and frequency of the CLK3 signal, which is reflected to the data link device 20 by the output data circuit 150 in the data storage device 22, increase as the logic supply voltage LOGICVCC increases. Also as the LOGICVCC voltage increases, the level of the RESET signal in the data storage device 22 rises, until at some point it resets the data storage device 22.

As the data storage device 22 reflects the CLK3 signal to the data link device as the clock component of the INPUT_DATA signal (not shown), the servo control logic 518 tries to lock on to the phase of the clock component and attempts to stabilize its frequency as previously described. At first, the PLL_LOCK and SERVO_STABLE control signals are low more often than high. However, as the data link device 20 and the data storage device 22 become more synchronized and stable, the PLL_LOCK and SERVO_STABLE signals also stabilize at a high level.

At some point, the microprocessor 500 determines from the PLL_LOCK and SERVO_STABLE signals that the devices are sufficiently synchronized and stable. Such a determination might be made, for example, by determining a time average of the amplitude of the signals, and comparing it to a set threshold value. At this point, the microprocessor 500 resets the FAST/SLOW control signal to a low value, which, as previously described, causes the servo logic 516 to react somewhat more slowly to changes in the phase and frequency of the clock component from the data storage device 22, and which contributes to the stability of the link between the two devices. After a preset delay, the microprocessor 500 outputs a high CLK_ENABLE signal. This causes the carrier to be modulated by the clock signal CLK in the data link device 20, and after one clock cycle causes the RESET signal in the data storage device 22 to go low. After the RESET signal goes low, the RAM 115 automatically outputs stored data starting at memory location zero. The timing decode logic 110 and address decode logic 190 in the data storage device 22 prevent data from word 0 being read by the data link device 20. When memory location eight, corresponding to the first bit of word 1 is reached, however, the stored data is freely reflected to the data link device 20. The timing decode logic 110 controls the timing of the application of the data to the output data circuit 150 so that it falls between occurrences of the CLK3 signal. The reflected data is shown in FIG. 2 as small dips in the amplitude of the modulated carrier signal occurring between the clock components thereof.

As illustrated in FIG. 20, in the event that the data link device 20 writes data to the data storage device 22, the modulated carrier signal shows the data bits from the data link device 20 occurring between occurrences of the clock component of the modulated signal. It also shows these data bits being impressed with the same slight dips in amplitude as observed when the data link device 20 was reading data from the data storage device 22. This is caused by the data storage device 22 automatically reflecting back the received data to the data link device 20 to verify its correctness when the data storage device 22 is in write mode and by reflecting back previously stored data when it is in read mode.

FIG. 19 illustrates the generation and relative timing of the READ_PULSE, WRT_PULSE, VER_PULSE, DATA_WINDOW, and CLK3 signals by the timing decode logic 110 from selected ones of the clock signals T0–T34 generated by the oscillator/clock generator 140. Although the inverse of these signals often appear in the foregoing figures and description, they are illustrated here in a positive logic sense to facilitate understanding and discussion. As illustrated, the READ_PULSE signal is generated as the AND function of the T2 and T28 clock signals, the WRITE_PULSE signal as the AND function of the T3 and T12 clock signals, the VER_PULSE gating signal as the AND function of the T13 and T22 clock signals, and the DATA_WINDOW gating signal as the NAND function of the T19 and T33 clock signals. The CLK3 clock signal is generated as the AND function of the T0 and T17 clock signals.

FIG. 20 illustrates the relative timing of various gating, timing, and clock signals in the data link device 20 and data storage device 22 in relation to each other and to the modulated carrier signal which the two devices "share". A modulated carrier signal is shown containing a CLK component, a READ_DATA component, WRITE_DATA component and a VER_DATA component. The relative position of the READ_DATA component with respect to the CLK component is determined by the timing of the READ_PULSE timing signal in the data storage device 22, which has been previously described. The same is true of the VER_DATA component and the VER_PULSE timing signal in the data storage device 22. The relative position of the WRITE_DATA component with respect to the CLK component is determined by the relative position of the WRITE_WINDOW gating signal in the data link device 20, which has been previously described. Also, as previously described, the relative positioning of the VER_WINDOW and READ_WINDOW data gating signals in the data link device 20 are such that the VER_DATA and READ_DATA components of the modulated carrier occur at approximately the middle thereof. Likewise, the relative positioning of the WRITE_PULSE timing signal in the data storage device 22 with respect to the CLK component corresponds to the relative positioning of the WRITE_DATA component, as previously described.

FIG. 20 also illustrates the correspondence of the CLK3 clock signal in the data storage device 22 with the CLK clock signal in the data link device 20. The phase of the CLK signal tends to jitter slightly as illustrated, and this causes the phase of the TECLK and LECLK pulses to jitter slightly as well.

Figure 21A:
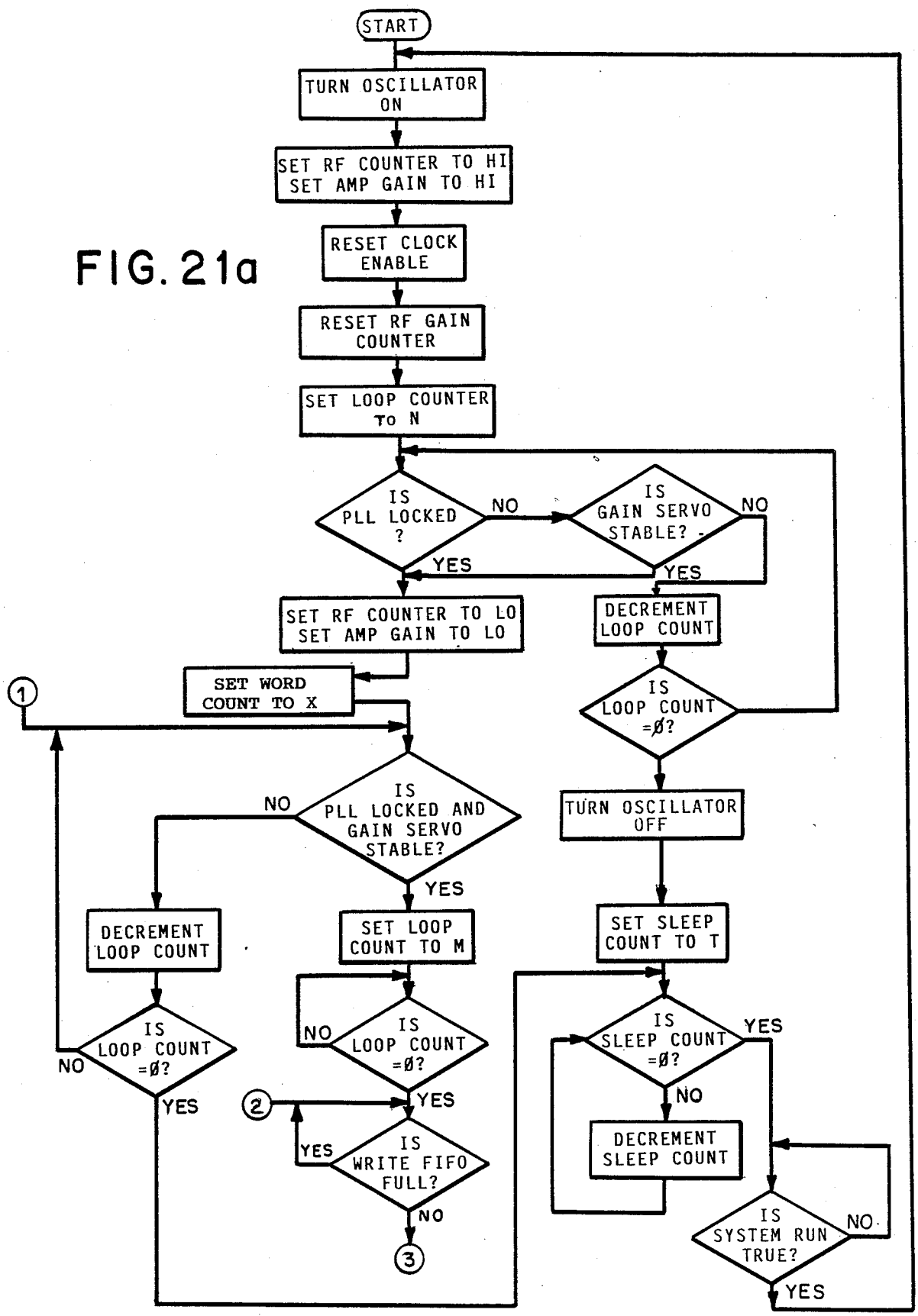
FIGS. 21(a) and 21(b) are flow charts showing the sequence of operation of the microprocessor in the data link device of FIG. 8.
Figure 21B:
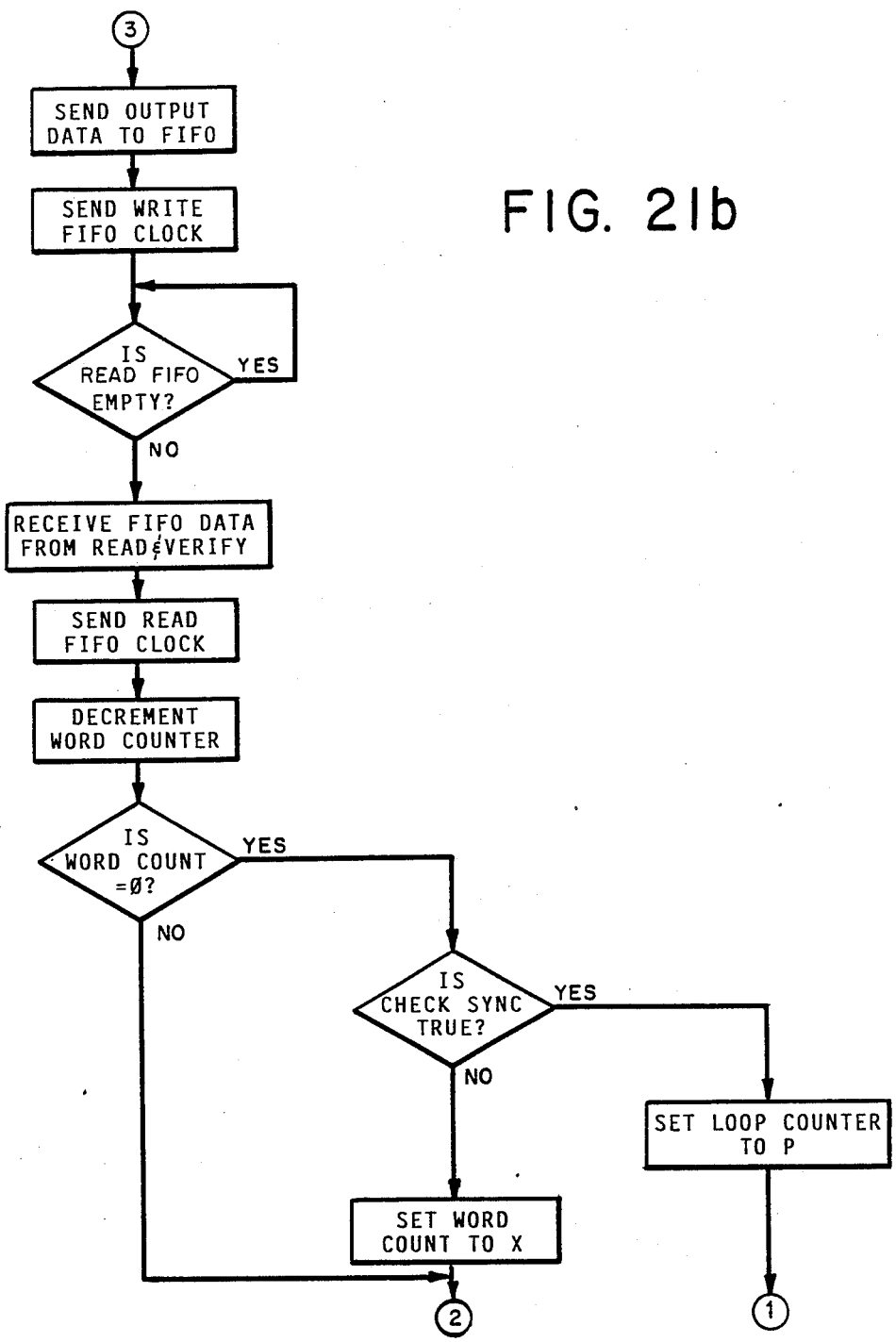

FIGS. 21a and 21b illustrate the operation of the microprocessor 500 in a presently preferred embodiment of the data storage and retrieval apparatus of the present invention. Initially, an operator depresses a button 56 on the case 50 of the data link device 20 shown in FIG. 5a to cause the microprocessor 500 in the data link device 20, to turn the oscillator 510 shown in FIG. 8 on. The microprocessor 500 in the data link device 20 next outputs a high FAST/SLOW control signal to set the RF gain counter 622 to the fast mode and to set the gain on the variable gain amplifier 592 to a maximum value to increase amplification of the phase error signal produced by the phase comparator 590 illustrated in FIG. 10. The microprocessor 500 next pulls the CLK_ENABLE signal on line 544 low to reset the data storage device 22 and various components in the data link device 20. Next, the microprocessor 500 outputs a high REST_RF_GAIN signal on line 566 to reset RF gain counter 622 outputs D/A0–D/A7 low to prevent initially transmitting signals having excessive amplitude to the data storage device 22. The microprocessor 500 then sets a loop counter variable in a software program to a value N, which in a presently preferred embodiment corresponds to a one millisecond period. At this point, the COMB_SIGNAL signal on line 536, which is transmitted to the data storage device 22 by the coil 54a of the data link device 20, consists of an unmodulated 49 MHz carrier signal. As the outputs D/A0–D/A7 of the RF gain counter 622 slowly increase, the amplitude of the carrier signal also slowly increases as illustrated in FIG. 18.

Next, the microprocessor 500 monitors the states of the PLL_LOCK and SERVO_STABLE signals on lines 572 and 570. The microprocessor 500 uses these signals to determine whether a data storage device 22 is receiving the unmodulated carrier signal and is generating CLK3 signals, and whether the frequency of those clock signals corresponds to the nominal 100 KHz frequency. If at any time the microprocessor 500 determines that either the PLL_LOCK or the SERVO_STABLE signal is high, it places the RF gain counter 622 in the slow mode and the variable amplifier 592 gain to minimum by outputting a low FAST/SLOW control signal. It also sets a software word count variable to a value X corresponding to the number of data words to be read from the data storage device 22. The microprocessor 500 continues to monitor the PLL_LOCK and SERVO_STABLE signals to determine when both are high. Each time the microprocessor 500 finds the state of the PLL_LOCK signal on line 572 low, or the state of the SERVO_STABLE signal on line 570 low, it decrements the value of the loop count in the software program and checks to see whether that loop count is now zero. If the value of the loop count becomes zero, indicating that the data link device 20 has been unsuccessful in establishing communications with a data storage device 22 for one millisecond, the microprocessor 500 turns the oscillator 510 off by generating low OSC_ON signal on line 526. The microprocessor 500 then sets a software sleep count variable to a value T, which in the presently preferred embodiment corresponds to a 99 millisecond wait period. The microprocessor 500 executes a program loop, decrementing the value of the software sleep count variable each time until the value equals zero. At that point, the microprocessor 500 checks the value of a "system run" software flag to determine whether or not to remain in the sleep state. If the flag is true, the microprocessor 500 again turns the oscillator 510 on by generating a high OSC_ON signal on line 526, and begins a new attempt to establish communications with a data storage device 22 in the manner previously described.

If, in attempting to establish communications, the microprocessor 500 senses that the PLL_LOCK and SERVO_STABLE signals are both high, indicating that the data link device 20 and data storage device 22 are currently synchronized and that the data storage device 22 is generating clock signals at the nominal 100 KHz frequency, it sets the value of the software loop count variable to a value M. The value M is selected to provide a delay period during which the PLL_LOCK and SERVO_STABLE signals are allowed to further stabilize. The microprocessor 500 executes a program loop, decrementing the loop count variable each time until it reaches 0. Following the delay period, the microprocessor 500 interrogates WRT_FIFO_FULL signal illustrated in FIG. 14 to determine whether the FIFO register 730 is filled with data. If the FIFO register 730 is not full, the microprocessor 500 loads the FIFO input lines WD0-WD7 with a data word, then sends a WRT_FIFO_CLK to clock the data word in. If the FIFO is full, the microprocessor 500 continues to monitor the WRT_FIFO_FULL signal until it goes low, indicating that the FIFO register 730 can now receive additional data.

The microprocessor 500 next interrogates the RD_FIFO_FULL signal illustrated in FIG. 14 to determine whether the FIFO's 720 and 722 have data. If the state of this signal is high, the microprocessor 500 reads the data words RD0-RD7 AND VD0-VD7 from the FIFO registers 720 and 722, and outputs a RD_FIFO_CLK signal to inform the FIFO's that the data words have been received. Each time the microprocessor 500 reads a data word from the FIFO's 720 and 722 it decrements the value of the software word counter variable, which in a presently preferred embodiment is initially set to 128 if the entire contents of the data storage devices are to be read. For so long as the value of the word count variable remains non-zero, the microprocessor 500 continues to write data words out to the FIFO 730 (if desired) and to read data words out of the FIFO's 720 and 722.

When the value of the word count variable equals 0, indicating that all of the desired data has been read, the microprocessor 500 checks software flag "check sync" to determine whether to again monitor the PLL_LOCK and SERVO_STABLE signals before beginning another read/write operation. If the flag is low, the microprocessor 500 resets the word count variable to a value X and proceeds to again write and read data words to and from the FIFO's 720, 722 and 730 as previously described. If the flag is high, the microprocessor 500 resets the value of the software variable loop counter to a value P and again monitors the state of the PLL_LOCK and SERVO_STABLE signals on lines 572, 570 respectively as previously described. It is notable that the value assigned the loop counter at this stage may differ from the value initially set since less time may be required to ensure the devices are synchronized and stable than was required at power-up. When the microprocessor 500 determines both signals are high, it then proceeds as previously described.

Although not shown in FIGS. 21a and 21b, it should be apparent to those skilled in the art that the microprocessor 500, upon determining that the value of the word count variable is zero, and that no transmission error has occurred, could generate a signal which would cause an indicator, such as an LED, mounted on the case 50 of the data link device 20 to be illuminated as an indication to the operator that communication between the data storage device 22 and the data link device 20 was successfully completed.

It will be understood that the electronic data storage, transmission, and retrieval apparatus and methods described in detail herein are merely illustrative of various aspects of the present invention and are in no way intended to be limiting. Various changes and modifications to the preferred embodiments described herein will be apparent to those skilled in the art. Such changes and modifications can be made without departing from the spirit and scope of the present invention. Accordingly, all such changes and modifications are intended to be covered by the following claims, including all equivalents thereof.

We claim:

1. An electronic data transmission apparatus comprising:
    data transmitting means and at least one data receiving means;
    said data transmitting means including: means for generating a combination signal having a power component and a data component corresponding to first data signals in said data transmitting means; and means for continuously transmitting said combination signal to at least one said data receiving means when brought into proximity therewith;
    each data receiving means including: means for receiving said combination signal; means for deriving operating power and said first data signals from said combination signal with a value corresponding to second data signals in said receiving means to communicate said second data signals to said data transmitting means while simultaneously continuing to receive said combination signal from said data transmitting means;
    said data transmitting means further including means for detecting the modulation of said combination signal by said data receiving means; and means for deriving said second data signals therefrom while simultaneously continuing to transmit said combination signal, whereby said data transmitting means and said data receiving means simultaneously communicate data bidirectionally.

2. An electronic data storage, transmission and retrieval apparatus comprising;
    data link means and at least one data storage means;
    said data link means including: means for generating a combination signal having a power component and a data component corresponding to first data signals in said data transmitting means; and means for continuously transmitting said combination signal to at least one said data storage means when brought into proximity therewith;
    each said data storage means including: means for receiving said combination signal; means for deriving operating power and said first data signals from said combination signal; means for storing said derived first data signals; means for modulating said combination signal with a value corresponding to stored second data signals to communicate said second data signals to said data link means while simultaneously continuing to receive said combination signal;
    said data link means further including means for detecting the modulation of said combination signal by said data storage means; and means for deriving said second data signals therefrom while simultaneously continuing to transmit said combination signal, whereby said data link means and said data storage means simultaneously communicate data bidirectionally.

3. An electronic data storage, transmission and retrieval apparatus comprising:
    data link means and at least one data storage means;
    said data link means including: means for storing first data signals; means for generating a combination signal having a power component and having a data component derived from said first data signals; and means for continuously transmitting said combination signal to at least one said data storage means when brought into proximity therewith;

each data storage means including: means for receiving said combination signal; means for deriving operating power and said first data signals from said combination signal; means for storing said derived first data signals; means for modulating said combination signal with a value corresponding to stored second data signals to communicate said second data signals to said data link means while simultaneously continuing to receive said combination signal;

said data link means further including means for detecting the modulation of said combination signal by said data storage means; and means for deriving said second data signals therefrom while simultaneously continuing to transmit said combination signal, whereby said data link means and said data storage means simultaneously communicate data bidirectionally.

4. An electronic data storage, transmission and retrieval apparatus comprising:

data link means and at least one data storage means;

said data link means including: means for storing first data signals; means for generating a combination signal having a power component and having a data component derived from said first data signals; and means for continuously transmitting said combination signal to at least one said data storage means when brought into proximity therewith;

each data storage means including: means for receiving said combination signal; means for deriving operating power and said first data signals from said combination signal; means for storing said derived first data signals; load means for presenting a variable load to said combination signal; means for varying the value of said load corresponding to the value of stored second data signals to modulate said combination signal and communicate said second data signals to said data link means while simultaneously continuing to receive said combination signal;

said data link means further including means for detecting the modulation of said combination signal by said data storage means; and means for deriving said second data signals therefrom while simultaneously continuing to transmit said combination signal, whereby said data link means and said data storage means simultaneously communicate data bidirectionally.

5. The electronic data apparatus of claim 4 wherein said means for continuously transmitting said combination signal to said data storage means is operable to effect transmission of said signal without physical electrical contact between said data link means and a said data storage means.

6. The electronic data apparatus of claim 4 wherein said data link means is embodied in a portable hand-held device.

7. The electronic data apparatus of claim 4 wherein each said data storage means is a miniature device.

8. The electronic data apparatus of claim 7 wherein each said data storage means includes a miniature integrated circuit chip.

9. The electronic data apparatus of claim 4 wherein said data link means is operable to generate combination signals having data components embodying codes, and wherein each data storage means includes decoding means for enabling operation of said means for storing data signals only upon receipt of a combination signal having a predetermined code.

10. The electronic data apparatus of claim 4 wherein said data link means is operable to generate combination signals having data components embodying codes, and wherein each data storage means includes decoding means for enabling operation of said means for modulating said combination signals only upon receipt of a combination signal having a predetermined code.

11. The electronic data apparatus of claim 4 wherein said data link means is operable to generate combination signals having data components embodying codes, and wherein each data storage means includes decoding means for enabling operation of said means for storing data signals and means for modulating said combination signals only upon receipt of a combination signal having a predetermined code.

12. The electronic data apparatus of claim 4 wherein each said data storage means is operable in a writing mode during which said first data signals derived from said combination signal are stored in said data storage means.

13. The electronic data apparatus of claim 4 wherein each said data storage means is operable in a reading mode during which said combination signal is modulated in accordance with said stored second data signals.

14. The electronic data apparatus of claim 4 wherein each said data storage means is operable in a writing mode during which said first data signals derived from said combination signal are stored in said data storage means and in a reading mode during which said combination signal is modulated with a value corresponding to said stored second data signals, said data link means including means for automatically verifying accurate storage of said first data signals in said data storage means in said writing mode.

15. The electronic data apparatus of claim 14 wherein said data link means is operable to generate combination signals having mode control codes, and wherein each data storage means includes mode control decoding means for selecting said reading and writing modes in accordance with said mode control codes.

16. The electronic data apparatus of claim 4 wherein said data link means further comprises:

means for detecting the level of operating power derived from said combination signal by said data storage means; and means for varying the amplitude of said combination signal to adjust said level to a selected value.

17. The electronic data apparatus of claim 16 wherein said means for detecting the level of operating power includes means for detecting a parameter of the modulation of said combination signal by said data storage means related to the power level in said data storage means, and wherein said means for varying the amplitude of said combination signal is responsive to said parameter.

18. An electronic data apparatus comprising:

means for receiving a combination signal having power and data components;

means for deriving operating power and first data signals from said combination signal; and means for modulating said combination signal with a value corresponding to second data signals in said apparatus to transmit said second data signals while simultaneously continuing to receive said combination signal.

19. The electronic data apparatus of claim 18 wherein said apparatus includes means for storing said first data signals.

20. The electronic data apparatus of claim 19 wherein said modulating means is operable to modulate said combination signal with a value corresponding to stored second data signals.

21. The electronic data apparatus of claim 18 wherein said modulating means is operable to modulate said combination signal by varying a load presented to said combination signal.

22. The electronic data apparatus of claim 18 wherein said apparatus is a miniature device.

23. A method of transmitting electronic data signals comprising the steps of:
providing a data transmitting means and at least one data receiving means;
generating in said data transmitting means a combination signal having a power component and a data component corresponding to first data signals in said data transmitting means;
continuously transmitting said combination signal from said data transmitting means to at least one said data receiving means when said data transmitting means is brought into proximity therewith;
receiving said combination signal in said receiving means;
deriving operating power and said first data signals from said received combination signal in said receiving means;
modulating said combination signal by said data receiving means with a value corresponding to second data signals therein to communicate said second data signals to said data transmitting means while simultaneously continuing to receive said combination signal in said data receiving means;
detecting the modulation of said combination signal by said data receiving means in said data transmitting means; and
deriving said second data signals therefrom while simultaneously continuing to transmit said combination signal to said data receiving means.

24. A method of storing, transmitting and retrieving electronic data signals comprising the steps of:
providing a data link means and at least one data storage means;
storing first data signals in said data link means;
generating in said data link means a combination signal having a power component and a data component derived from said first data signals;
continuously transmitting said combination signal from said data link means to at least one said data storage means when said data link means is brought into proximity therewith;
receiving said combination signal in said data storage means;
deriving operating power and said first data signals from said combination signal when received in said data storage means;
storing said derived first data signals in said data storage means;
modulating said combination signal by said data storage means with a value corresponding to stored second data signals in said data storage means to communicate said second data signals to said data link means;
detecting the modulation of said combination signal by said data storage means in said data link means; and
deriving said second data signals therefrom while simultaneously continuing to transmit said combination signal to said data storage means.

25. A method of storing and retrieving electronic data signals comprising the steps of:
providing a data link means and at least one data storage means;
storing first data signals in said data link means;
generating in said data link means a combination signal having a power component and a data component derived from said first data signals;
continuously transmitting said combination signal from said data link means to at least one said data storage means when said data link means is brought into proximity therewith;
receiving said combination signal in said data storage means;
deriving operating power and said first data signals from said combination signal when received in said data storage means;
storing said derived first data signals in said data storage means;
modulating said combination signal by said data storage means by varying the value of a load presented to said combination signal in correspondence with the value of stored second data signals in said data storage means to communicate said second data signals to said data link means;
detecting the modulation of said combination signal by said data storage means in said data link means; and
deriving said second data signals therefrom while simultaneously continuing to transmit said combination signal to said data storage means.

26. The method of claim 25 wherein the transmitting of said combination signal to said data storage means is effected without physical electrical contact between said data link means and a said data storage means.

27. The method of claim 25 and the additional steps of:
generating in said data link means combination signals having data components embodying codes; and
decoding said combination signals in said data storage means to enable storage of data signals only upon receipt of combination signals having a predetermined code.

28. The method of claim 25 and the additional steps of:
generating in said data link means combination signals having data components embodying codes; and
decoding said combination signals in said data storage means to enable modulation of said combination signals only upon receipt of combination signals having a predetermined code.

29. The method of claim 25 and the additional steps of:
generating in said data link means combination signals having data components embodying codes; and
decoding said combination signals in said data storage means to enable storage of data signals and modulation of said combination signals only upon receipt of combination signals having a predetermined code.

30. The method of claim 25 wherein said data storage means modulates said combination signal during a reading mode and stores data signals derived from said combination signal during a writing mode.

31. The method of claim 30 and the additional step of automatically verifying accurate storage of said derived data signals in said data storage means in said write mode.

32. The method of claim 31 and the additional steps of:
generating combination signals having mode control codes;
and decoding said combination signals for selecting said reading and writing modes in accordance with said mode control codes.

33. The method of claim 25 and the additional steps of:
sensing the level of operating power derived from said combination signal by said data storage means; and
varying the amplitude of said combination signal to adjust said level to a selected value.

34. The method of claim 33 wherein the step of sensing the level of operating power includes sensing a parameter of the modulation of said combination signal by said data storage means related to the power level in said data storage means, and wherein the step of varying the amplitude of said combination signal includes varying said amplitude in response to said parameter.

35. A method of communicating electronic data signals comprising:
receiving a combination signal having power and data components;
deriving operating power and first data signals from said combination signal; and
modulating said combination signal with a value corresponding to second data signals to transmit said second data signals while simultaneously continuing to receive said combination signal.

36. The method of claim 35 and the additional step of storing said derived first data signals.

37. The data transmission apparatus of claim 39 wherein:
said means for generating said second clock signals includes means for generating clock signals having a parameter related to the level of operating power derived from said combination signal; and
said means for generating said combination signal includes means responsive to said parameter to vary the amplitude of said combination signal to maintain said operating power at a selected level.

38. The method of claim 35 and the step of modulating said combination signal by varying a load presented to said combination signal.

39. An electronic data transmission apparatus comprising:
data transmitting means and at least one data receiving means;
said data transmitting means including: means for generating a combination signal having clock, moving a power component, and data components derived from first clock and data signals in said data transmitting means; and means for continuously transmitting said combination signal to said data receiving means when in proximity therewith;
said data receiving means including: means for deriving operating power and said first data signals from said combination signal; means for generating second clock signals; and means for modulating said combination signal with values corresponding to said second clock signals and second data signals in said data receiving means to communicate said second clock and data signals to said data transmitting means while simultaneously continuing to receive said combination signal;
said data transmitting means also including: means for detecting the modulation of said combination signal by said data receiving means; and means for deriving said second clock and data signals from said combination signal while simultaneously continuing to transmit said combination signal to said data receiving means;
said means for generating a combination signal including means responsive to said second clock signals to generate said clock component of said combination signal.

40. The electronic data transmission apparatus of claim 39 wherein said data receiving means includes storage means for storing said first data signals.

41. The data transmission apparatus of claim 39 wherein said data transmitting means includes means for storing said second data signals derived from said combination signal.

42. The data transmission apparatus of claim 39 wherein said data receiving means is a miniature device adapted for mounting to a transportable object.

43. The data transmission apparatus of claim 39 wherein said data transmitting means is embodied in a portable, hand-held device.

44. The data transmission apparatus of claim 39 wherein said data receiving means includes means for automatically verifying the accuracy of said first data signals derived from said combination signal.

45. The data transmission apparatus of claim 44 wherein said means for verifying includes means for modulating said combination signal with said first data signals to re-transmit said signals to said data transmitting means.

* * * * *

UNITED STATES PATENT AND TRADEMARK OFFICE
CERTIFICATE OF CORRECTION

PATENT NO. : 4,941,201

DATED : July 10, 1990

INVENTOR(S) : Charles L. Davis

It is certified that error appears in the above-identified patent and that said Letters Patent is hereby corrected as shown below:

In column 2, line 21, before "selected" please insert --and the ability to initialize or change the contents of--.

In column 5, line 68, please delete "attached" and substitute therefor --attach--.

In column 6, line 6, please delete ""vacutainer"," and substitute therefor --"vacutainer,"--.

In column 9, line 63, please delete "130" and substitute therefor --180--.

In column 10, line 35, before "currently-addressed" please insert --store data transmitted by the data link device 20 in--.

In column 10, line 58, before "as" please insert --a passive modulation technique hereinafter referred to--.

In column 11, line 14, please delete "DATA_OUT" and substitute therefor --/DATA_OUT--.

In column 11, line 41, please delete "130" and substitute therefor --180--.

UNITED STATES PATENT AND TRADEMARK OFFICE
CERTIFICATE OF CORRECTION

PATENT NO. : 4,941,201

DATED : July 10, 1990

INVENTOR(S) : Charles L. Davis

It is certified that error appears in the above-identified patent and that said Letters Patent is hereby corrected as shown below:

In column 15, line 40, after "manner" please insert --.--; and before "initialization" please insert --The--.

In column 18, line 26, please delete "ENAB" and substitute therefor --/ENAB--.

In column 18, line 33, please delete "WRT-PULSE" and substitute therefor --WRT_PULSE--.

In column 18, line 44, before "170" please insert --counter--.

In column 20, line 13, please delete ""S"" and substitute therefor --"8"--; and delete "LOCO" and substitute therefor --/LOCO--.

In column 20, line 65, after "152" please insert --.--.

In column 21, line 25, after "350" please insert --,--.

In column 21, line 36, please delete "line" and substitute therefor --link--.

In column 22, line 1, please delete "drive" and substitute therefor --derive--.

In column 22, line 21, please delete "art" and substitute therefor --part--.

UNITED STATES PATENT AND TRADEMARK OFFICE
CERTIFICATE OF CORRECTION

PATENT NO. : 4,941,201

DATED : July 10, 1990

INVENTOR(S) : Charles L. Davis

It is certified that error appears in the above-identified patent and that said Letters Patent is hereby corrected as shown below:

In column 24, line 38, please delete "PO RESET" and substitute therefor --PO_RESET--.

In column 25, lines 49 and 50, please delete "VER-DATA and READ-DATA" and substitute therefor --VER_DATA and READ_DATA--.

In column 27, line 14, please delete "modulated".

In column 33, lines 9-46, before each occurrence of "656" and "654" (where "decoder" does not appear) insert --decoder--.

In column 44, line 2, please delete "REST_RF_GAIN" and substitute therefor --RESET_RF_GAIN--.

UNITED STATES PATENT AND TRADEMARK OFFICE
CERTIFICATE OF CORRECTION

PATENT NO. : 4,941,201

DATED : July 10, 1990

INVENTOR(S) : Charles L. Davis

It is certified that error appears in the above-identified patent and that said Letters Patent is hereby corrected as shown below:

In column 46, line 18 (Claim 1, line 15), after "signal" please insert --; and means for modulating said combination signal--.

Signed and Sealed this

Seventeenth Day of November, 1992

Attest:

DOUGLAS B. COMER

*Attesting Officer*    Acting Commissioner of Patents and Trademarks